(12) United States Patent
Takatsuka et al.

(10) Patent No.: US 10,841,520 B2
(45) Date of Patent: Nov. 17, 2020

(54) SOLID-STATE IMAGING DEVICE AND ELECTRONIC DEVICE

(71) Applicant: Sony Semiconductor Solutions Corporation, Kanagawa (JP)

(72) Inventors: Takafumi Takatsuka, Kanagawa (JP); Yusaku Sugimori, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/500,612

(22) PCT Filed: Apr. 12, 2018

(86) PCT No.: PCT/JP2018/015349
§ 371 (c)(1),
(2) Date: Oct. 3, 2019

(87) PCT Pub. No.: WO2018/198787
PCT Pub. Date: Nov. 1, 2018

(65) Prior Publication Data
US 2020/0053309 A1    Feb. 13, 2020

(30) Foreign Application Priority Data

Apr. 26, 2017   (JP) ................................. 2017-087210

(51) Int. Cl.
*H04N 5/374*       (2011.01)
*H04N 5/3745*      (2011.01)

(52) U.S. Cl.
CPC .............................. *H04N 5/37455* (2013.01)

(58) Field of Classification Search
None
See application file for complete search history.

(56) References Cited

U.S. PATENT DOCUMENTS

2008/0237446 A1* 10/2008 Oshikubo ........... H01L 27/1463
                                                        250/208.1
2014/0327802 A1* 11/2014 Mabuchi .............. H04N 5/3559
                                                         348/308
2020/0043971 A1*  2/2020 Sugawa ............... H04N 5/3591

FOREIGN PATENT DOCUMENTS

| JP | 2014-039159 A | 2/2014 |
| JP | 2015-142114 A | 8/2015 |
| JP | 2017-055401 A | 3/2017 |

* cited by examiner

*Primary Examiner* — James M Hannett
(74) *Attorney, Agent, or Firm* — Michael Best & Friedrich LLP

(57) ABSTRACT

A solid-state imaging device and electronic device with improved charge transfer efficiency from a charge storage unit to a charge-voltage conversion unit via a transfer gate are disclosed. In one example, the solid-state imaging device is configured so that, before an A/D conversion operation for signal level acquisition, a switching unit switches a state to the LG state at least once and to the HG state at least once. A transfer unit is configured to transfer the charge stored in the charge storage unit to the charge-voltage conversion unit at least twice when the state is being switched to the LG state and when the state is being switched to the HG state. A charge-voltage conversion unit adds the charge that is transferred for the LG state and the HG state and convert the added charge into a voltage signal.

20 Claims, 40 Drawing Sheets

SOLID-STATE IMAGING DEVICE AND ELECTRONIC DEVICE

TECHNICAL FIELD

The present technology relates to a solid-state imaging device and an electronic device, and in particular relates to a solid-state imaging device and an electronic device for enabling improvement of transfer efficiency of a charge from a charge storage unit to a charge-voltage conversion unit via a transfer gate.

BACKGROUND ART

Conventionally, in solid-state imaging devices represented by complementary metal-oxide semiconductor (CMOS) image sensors, a configuration to connect or disconnect an additional capacitance to or from a floating diffusion (FD) as a charge-voltage conversion unit is known as a method of improving low illuminance characteristics while securing a saturation signal amount of each pixel (for example, see Patent Document 1).

In the case of connecting the additional capacitance to the FD, a charge amount storable in the charge-voltage conversion unit increases, and thus improvement of a dynamic range of a pixel value becomes possible. In this case, conversion efficiency of the charge-voltage conversion unit decreases and thus a state in which the additional capacitance is connected to the FD is referred to as a low gain (LG) state.

Meanwhile, in the case of disconnecting the additional capacitance from the FD, the conversion efficiency of the charge-voltage conversion unit becomes high and voltage amplitude after conversion becomes large even with a small charge amount. Therefore, sensitivity in the low illuminance can be improved. The state in which the additional capacitance is disconnected from the FD is referred to as a high gain (HG) state.

In the configuration described in Patent Document 1, the state is fixed to the LG state in a case where pixels are driven with low conversion efficiency, and the state is fixed to the HG state in a case where the pixels are driven with high conversion efficiency.

CITATION LIST

Patent Document

Patent Document 1: Japanese Patent Application Laid-Open No. 2015-142114

SUMMARY OF THE INVENTION

Problems to be Solved by the Invention

The LG state is at a disadvantage compared to the HG state in terms of the transfer efficiency of the charge from the charge storage unit to the charge-voltage conversion unit, between the LG state and the HG state having a difference in the conversion efficiency of pixels.

The present technology has been made in view of the foregoing and enables improvement of the transfer efficiency of the charge from the charge storage unit to the charge-voltage conversion unit via transfer gate.

Solutions to Problems

A solid-state imaging device according to a first aspect of the present technology includes a charge storage unit configured to store a charge generated by photoelectric conversion; a charge-voltage conversion unit configured to convert the charge transferred from the charge storage unit into a voltage signal; a transfer unit configured to transfer the charge stored in the charge storage unit to the charge-voltage conversion unit; and a switching unit configured to increase or decrease a capacitance of the charge-voltage conversion unit to switch a state to a low gain (LG) state or a high gain (HG) state, in which, before an A/D conversion operation for signal level acquisition, the switching unit is configured to switch the state to the LG state at least once and switch the state to the HG state at least once, the transfer unit is configured to transfer the charge stored in the charge storage unit to the charge-voltage conversion unit at least twice of when the state is being switched to the LG state and when the state is being switched to the HG state, and the charge-voltage conversion unit is configured to add the charge transferred when the state is being switched to the LG state and the charge transferred when the state is being switched to the HG state and convert the added charge into the voltage signal.

In the first aspect of the present technology, before the A/D conversion operation for signal level acquisition, the state is switched to the LG state at least once and to the HG state at least once, the charge stored in the charge storage unit is transferred to the charge-voltage conversion unit at least twice of when the state is being switched to the LG state and when the state is being switched to the HG state, and the charge transferred when the state is being switched to the LG state and the charge transferred when the state is being switched to the HG state are added and the added charge is converted into the voltage signal.

A solid-state imaging device according to a second aspect of the present technology includes: a sharing number of charge storage units configured to store charges generated by photoelectric conversion; a charge-voltage conversion unit configured to convert the charges transferred from the sharing number of charge storage units into a voltage signal; a sharing number of transfer units configured to transfer the respective charges stored in the sharing number of charge storage units to the charge-voltage conversion unit; and a switching unit configured to increase or decrease a capacitance of the charge-voltage conversion unit to switch a state to a low gain (LG) state or a high gain (HG) state, in which, when resetting the sharing number of charge storage units, the switching unit is configured to switch the state to the LG state, the sharing number of transfer units are configured to simultaneously transfer the charges stored in the corresponding charge storage units to the charge-voltage conversion unit, and when reading the charges from the sharing number of charge storage units, the switching unit is configured to switch the state to the HG state, and the sharing number of transfer units are configured to sequentially transfer the charges stored in the corresponding charge storage units to the charge-voltage conversion unit.

In the second aspect of the present technology, when resetting the sharing number of charge storage units, the state is switched to the LG state, and the charges stored in the corresponding charge storage units are simultaneously transferred to the charge-voltage conversion unit by the sharing number of transfer units. Furthermore, when reading the charges from the sharing number of charge storage units, the state is switched to the HG state, and the charges stored in the corresponding charge storage units are sequentially transferred to the charge-voltage conversion unit by the sharing number of transfer units.

A solid-state imaging device according to a third aspect of the present technology includes: a sharing number of charge storage units configured to store charges generated by photoelectric conversion; a charge-voltage conversion unit configured to convert the charges transferred from the sharing number of charge storage units into a voltage signal; and a sharing number of transfer units configured to transfer the respective charges stored in the sharing number of charge storage units to the charge-voltage conversion unit, in which the sharing number of transfer units are configured to sequentially transfer the charges stored in the corresponding charge storage units to the charge-voltage conversion unit when resetting the sharing number of charge storage units, and sequentially transfer the charges stored in the corresponding charge storage units to the charge-voltage conversion unit when reading the charges from the sharing number of charge storage units.

In the third aspect of the present technology, when resetting the sharing number of charge storage units, the charges stored in the corresponding charge storage units are sequentially transferred to the charge-voltage conversion unit by the sharing number of transfer units. Furthermore, when reading the charges from the sharing number of charge storage units, the charges stored in the corresponding charge storage units are sequentially transferred to the charge-voltage conversion unit.

Effects of the Invention

According to the first to third aspects of the present technology, the transfer efficiency of the charge from the charge storage unit to the charge-voltage conversion unit via the transfer unit can be improved.

Note that effects described here are not necessarily limited, and any of effects described in the present disclosure may be exhibited.

MODE FOR CARRYING OUT THE INVENTION

Hereinafter, best modes for implementing the present technology (hereinafter referred to as embodiments) will be described in detail with reference to the drawings. Note that the description will be given in the following order.

<Configuration Example of Pixel Unit in Solid-State Imaging Device According to Embodiment of the Present Technology>

Figure 1:
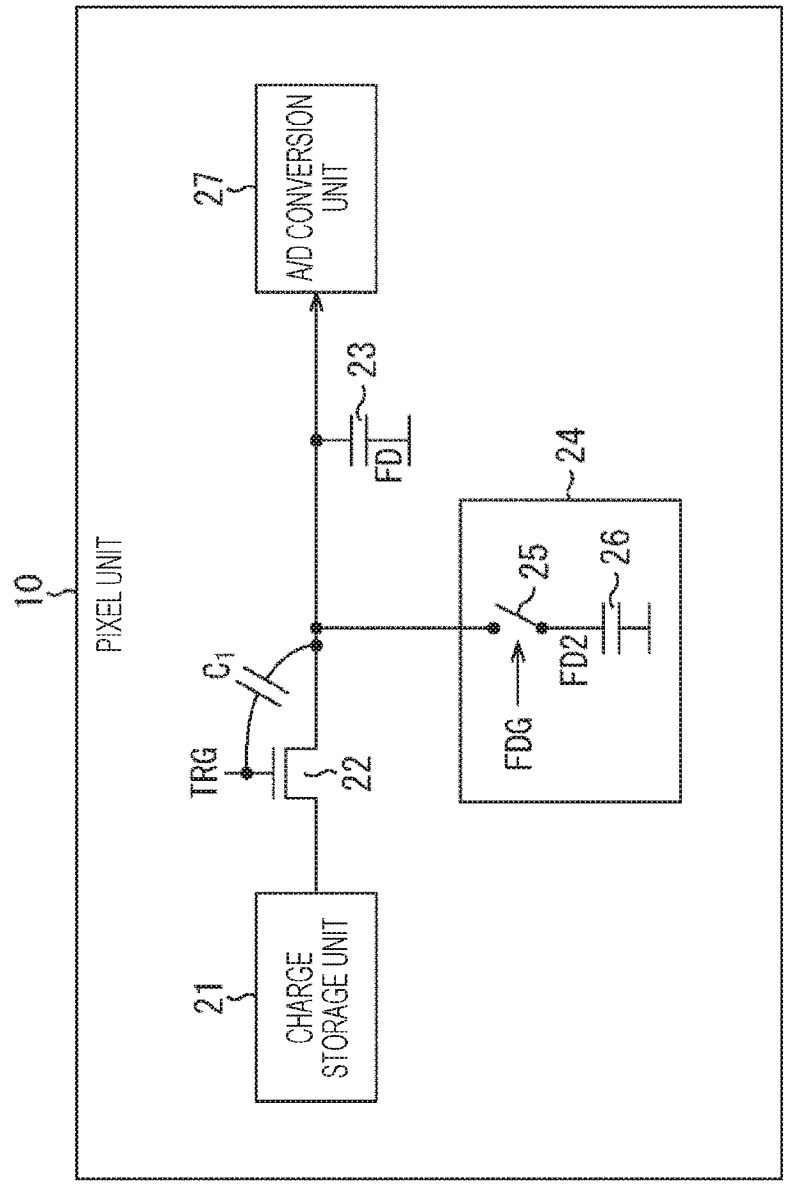
FIG. 1 is an equivalent circuit diagram illustrating a configuration example of a pixel unit of a solid-state imaging device to which the present technology is applied.

FIG. 1 is an equivalent circuit diagram illustrating a configuration example of a pixel unit in a solid-state imaging device that is an embodiment of the present technology.

A pixel unit 10 includes a charge storage unit 21, a transfer transistor 22, an FD 23 as a charge-voltage conversion unit, an FD capacitance switching unit 24, and an A/D conversion unit 27.

The charge storage unit 21 corresponds to a PD that converts incident light into a charge by photoelectric conversion and holds the charge, or a memory unit that temporarily holds the charge generated by the PD. The transfer transistor 22 transfers the charge stored in the charge storage unit 21 to the FD 23 at a subsequent stage when a gate (hereinafter referred to as TRG) of the transfer transistor 22 is turned on. As the transfer transistor 22, a vertical transistor can be adopted, for example.

Figure 7:
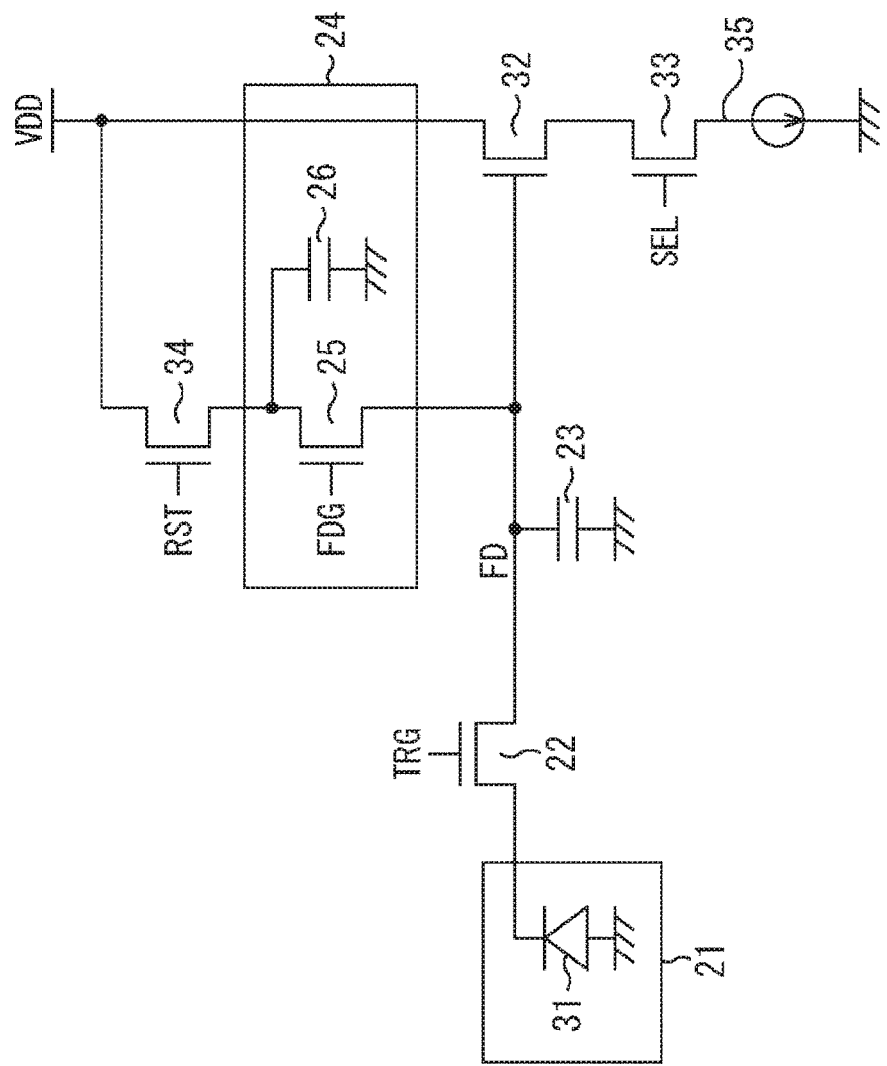
FIG. 7 is an equivalent circuit diagram illustrating a first specific example of the pixel unit.

The FD 23 holds the charge transferred via the TRG. Furthermore, the FD 23 converts, as the charge-voltage conversion unit, the held charge into a voltage signal and outputs the voltage signal to the A/D conversion unit 27 at the subsequent stage. Note that, in practice, an amplifier transistor 32, a selection transistor 33, and a vertical signal line 35 (all are illustrated in FIG. 7) are provided between the FD 23 and the A/D conversion unit 27.

The FD capacitance switching unit 24 includes an FD transistor 25 and an additional capacitance 26. Hereinafter, the FD transistor 25 is also referred to as FDG, and the additional capacitance 26 is also referred to as FD 2. Note that the FD capacitance switching unit 24 and the FD transistor 25 correspond to a switching unit and a connection transistor in the first aspect of the present technology.

The FD capacitance switching unit 24 can connect the FD 2 to the FD 23 by turning on the FDG. In this case, the charge-voltage conversion unit enters an LG state.

Furthermore, the FD capacitance switching unit 24 can disconnect the FD 2 from the FD 23 by turning off the FDG. In this case, the charge-voltage conversion unit enters an HG state.

Here, transfer efficiency from the charge storage unit 21 to the charge-voltage conversion unit in the LG state and the HG state will be described.

Hereinafter, a capacitance of the FD 23 is $C_{FD}$, a capacitance of the additional capacitance 26 (FD 2) is $C_{FD2}$, a capacitance between the transfer transistor 22 and the FD 23 is $C_1$, and a voltage change amount of the TRG is $\Delta TRG$.

Figure 2:
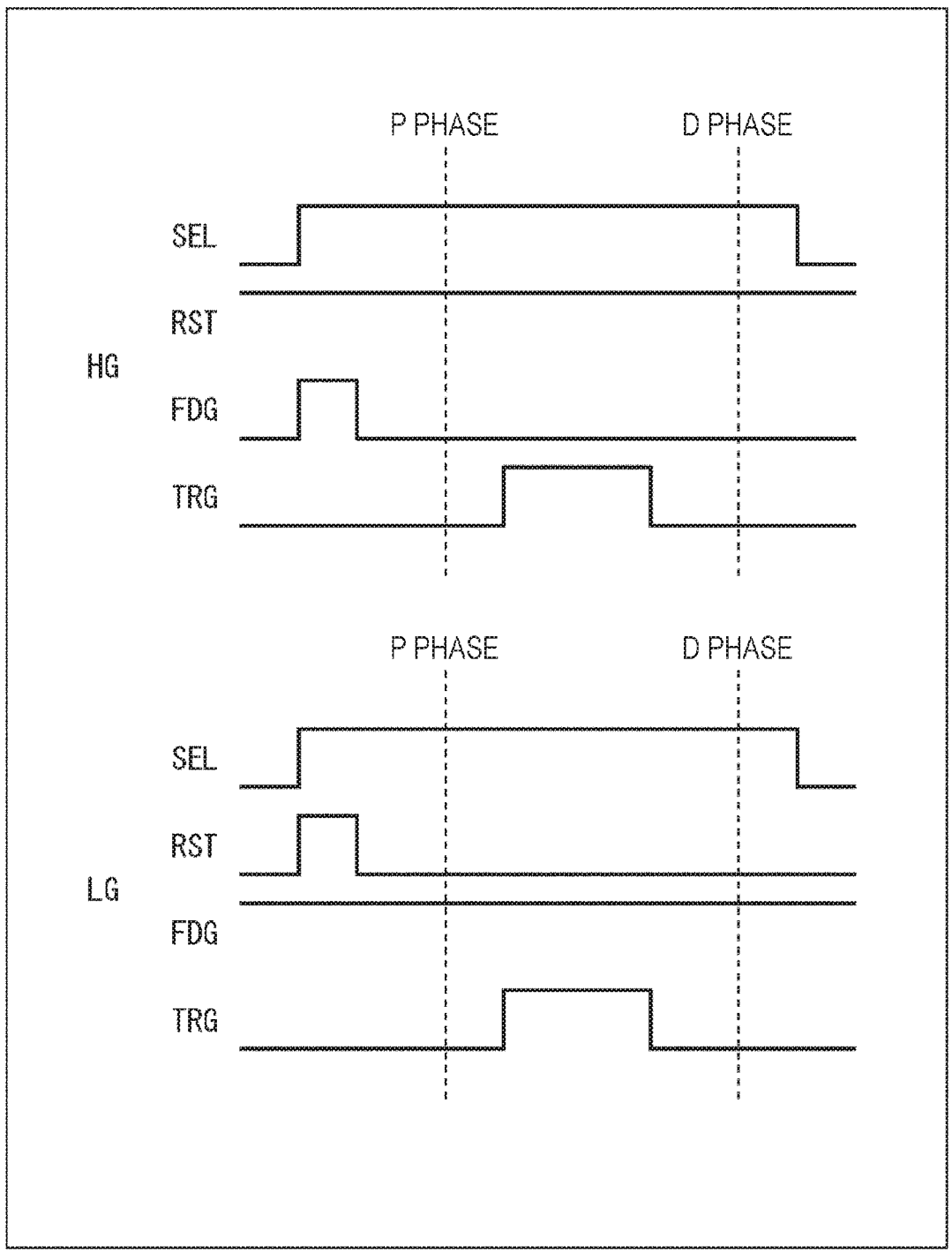
FIG. 2 is a diagram illustrating conventional drive timing.
Figure 3:
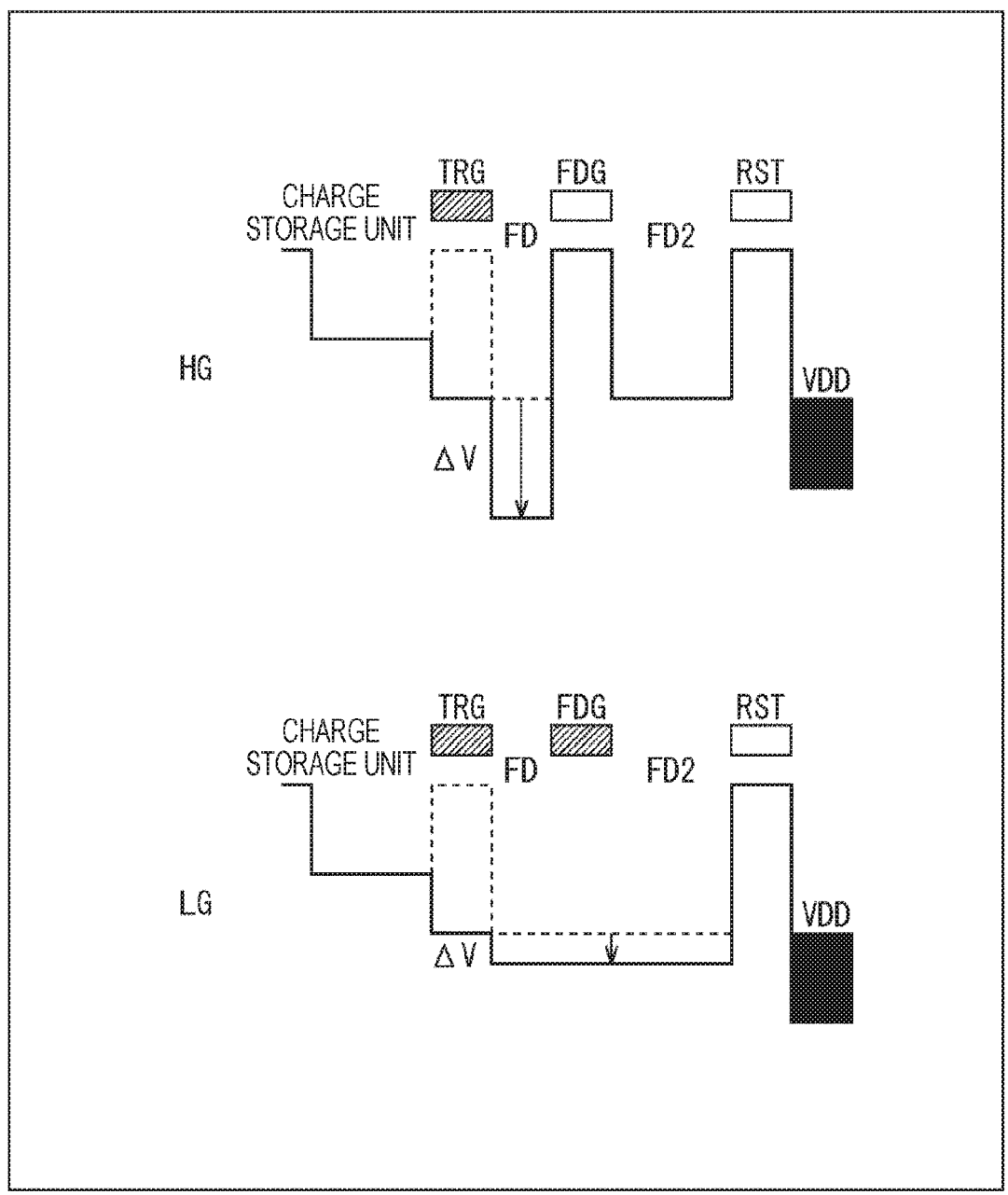
FIG. 3 is a diagram illustrating potentials corresponding to the drive sequence in FIG. 2.

FIG. 2 illustrates conventional drive timing of the pixel unit 10. In other words, FIG. 2 illustrates drive timing of a case of fixing the pixel unit 10 to the LG state to drive the pixel unit 10 with low conversion efficiency and of a case of fixing the pixel unit 10 to the HG state to drive the pixel unit 10 with high conversion efficiency. FIG. 3 illustrates potentials of the charge storage unit 21, the TRG, the FD 23, the FDG, and the FD 2 corresponding to the drive timing illustrated in FIG. 2.

As illustrated in the upper side in FIG. 2, in the case of fixing the pixel unit 10 to the HG state to drive the pixel unit 10 with high conversion efficiency, the FDG is off at the time of charge transfer when the TRG is on, and thus a total capacitance of the charge storage unit is $C_{FD}$. Therefore, a boost voltage $\Delta V$ of the FD 23 is as described in the following expression (1).

$$\Delta V = \Delta TRG \times C_1 / C_{FD} \qquad (1)$$

Meanwhile, as illustrated in the lower side in FIG. 2, in the case of fixing the pixel unit 10 to the LG state to drive the pixel unit 10 with low conversion efficiency, the FDG is on on a steady basis including the charge transfer time when the TRG is on, and thus the total capacitance of the charge storage unit is $(C_{FD}+C_{FD2})$. Therefore, the boost voltage $\Delta V$ of the FD 23 is as described in the following expression (2).

$$\Delta V = \Delta TRG \times C_1 / (C_{FD}+C_{FD2}) \qquad (2)$$

As is clear from the expressions (1) and (2) and FIG. 3, since the LG state has a smaller boost voltage $\Delta V$ of the FD 23 than the HG state, a transfer gradient from the charge storage unit 21 to the FD 23 becomes small, and a transfer residue of the charge stored in the charge storage unit 21 may occur. Therefore, it is found that the transfer efficiency of the charge from the charge storage unit 21 to the FD 23 in the LG state is at a disadvantage compared to the HG state.

Moreover, this situation becomes serious in a case where reduction of power consumption in the solid-state imaging device is required. In other words, to reduce the power consumption, the solid-state imaging device needs to operate with a low pixel voltage. However, if the pixel voltage is lowered, a reset voltage of the FD is also lowered. Thus, the transfer gradient from the charge storage unit 21 to the FD 23 becomes smaller and the transfer efficiency becomes worse.

Therefore, the pixel unit 10 to which the present technology is applied is not fixed to the LG state in the case of being driven with low conversion efficiency, and uses the HG state, thereby improving the transfer efficiency of the charge from the charge storage unit 21 to the FD 23.

<First Drive Sequence to which Present Technology is Applied>

Figure 4:
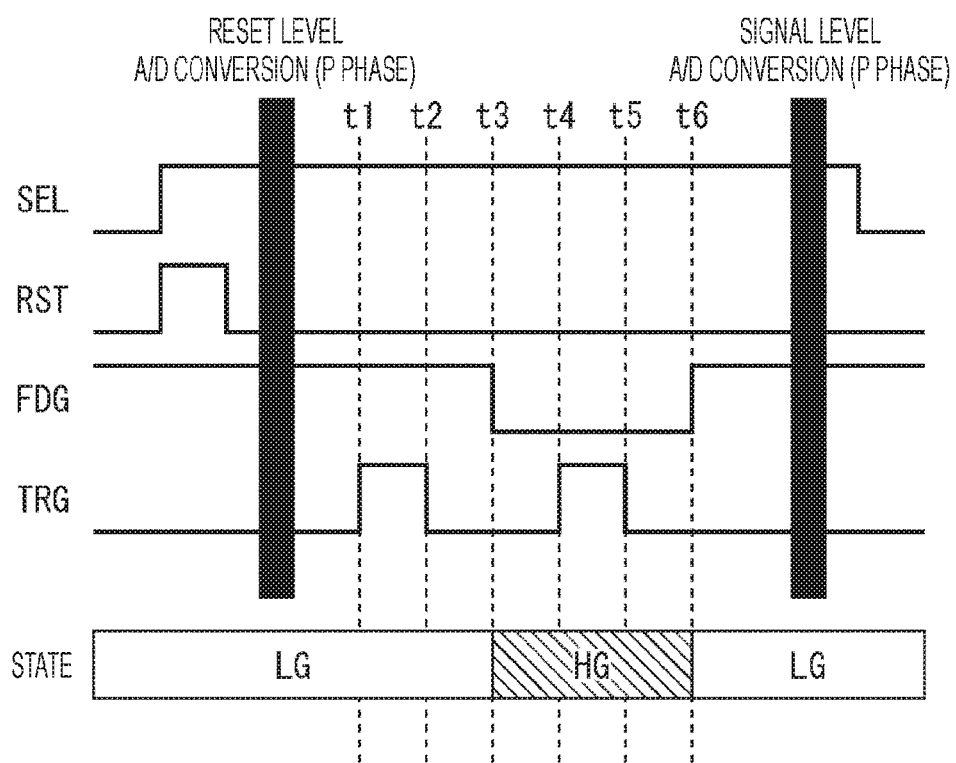
FIG. 4 is a diagram illustrating a first drive sequence to which the present technology is applied.
Figure 5:
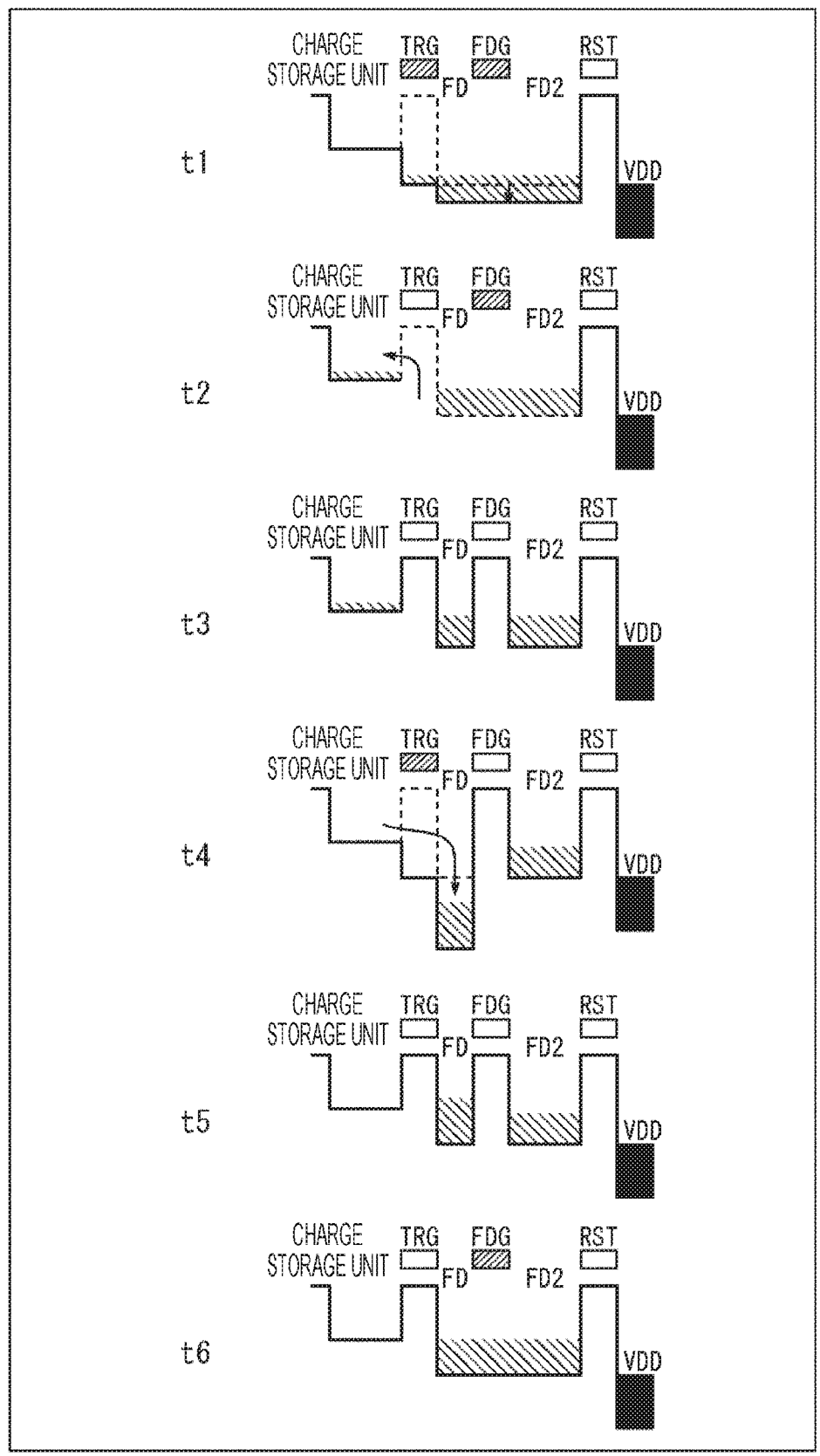
FIG. 5 is a diagram illustrating a potential corresponding to FIG. 4.

FIG. 4 illustrates a first drive sequence to which the present technology is applied in the case of driving and operating the pixel unit 10 with low conversion efficiency. FIG. 5 illustrates potentials corresponding to timing t1 to t6 in the drive timing illustrated in FIG. 4.

First, to perform an A/D conversion operation for reset level acquisition, the FDG is turned on to set the LG state, the TRG is turned off, the selection transistor (SEL) 33 is turned on, and a reset transistor (RST) 34 (FIG. 7) is turned on and off to output reset levels of the FD 23 and the FD 2 to the subsequent stage.

The TRG is turned on at the timing t1 and the TRG is turned off at the timing t2 after the A/D conversion operation for reset level acquisition and before an A/D conversion operation for signal level acquisition. In this period, the charge stored in the charge storage unit 21 is transferred to the FD 23 and the FD 2 via the TRG. Note that, since this transfer is in the LG state, the transfer gradient is small and the charge cannot be sufficiently transferred to FD 23 and the FD 2, and thus a charge transfer residue occurs in the charge storage unit 21.

Next, the FDG is turned off to set the HG state at the timing t3, the TRG is turned on again at the timing t4, and the TRG is turned off at the timing t5. In this period, the charge remaining in the charge storage unit 21 is transferred to the FD 23 via the TRG. Since this transfer is in the HG state, the transfer gradient is large and the charge can be sufficiently transferred to the FD 23.

Next, the FDG is turned on to set the LG state at the timing t6. In other words, the FD 23 and the FD 2 are connected and the charges respectively held in the FD 23 and the FD 2 are added. Thereafter, the added charge is read out to the subsequent stage, and the A/D conversion operation for signal level acquisition is performed.

As described above, in the first drive sequence, the charge transfer from the charge storage unit 21 to the charge-voltage conversion unit (FD 23 and FD 2) in the LG state and the charge transfer from the charge storage unit 21 to the charge-voltage conversion unit (FD 23) in the HG state are performed before the A/D conversion operation for signal level acquisition. Therefore, the transfer efficiency of the charge from the charge storage unit 21 to the charge-voltage conversion unit can be improved in the case of driving the pixel unit 10 at low conversion efficiency.

Furthermore, in the first drive sequence, both the A/D conversion operation for reset level acquisition and the A/D conversion operation for signal level acquisition are performed in the LG state. Therefore, the signal amount in the LG state can be correctly acquired by taking a difference between data obtained in the A/D conversion operation for reset level acquisition and data obtained in the A/D conversion operation for signal level acquisition in the subsequent stage of the pixel unit 10.

Moreover, the first drive sequence has a smaller number of A/D conversions than a drive sequence of performing A/D conversion after performing charge transfer from the charge storage unit 21 to the charge-voltage conversion unit (FD 23 and the FD 2) in the LG state and performing A/D conversion after performing charge transfer from the charge storage unit 21 to the charge-voltage conversion unit (FD 23) in the HG state, and adding both the charges in a subsequent stage. Therefore, the first drive sequence is superior to the above-described drive timing in terms of frame rate and power consumption.

Note that, in the first drive sequence, before the A/D conversion operation for signal level acquisition, the charge transfer from the charge storage unit 21 to the charge-voltage conversion unit (FD 23 and FD 2) in the LG state and the charge transfer from the charge storage unit 21 to the charge-voltage conversion unit (FD 23) in the HG state are performed once each before the A/D conversion operation for signal level acquisition. However, these operations may be performed once or more.

<Modifications of Configuration Example of Pixel Unit 10>

Figure 6:
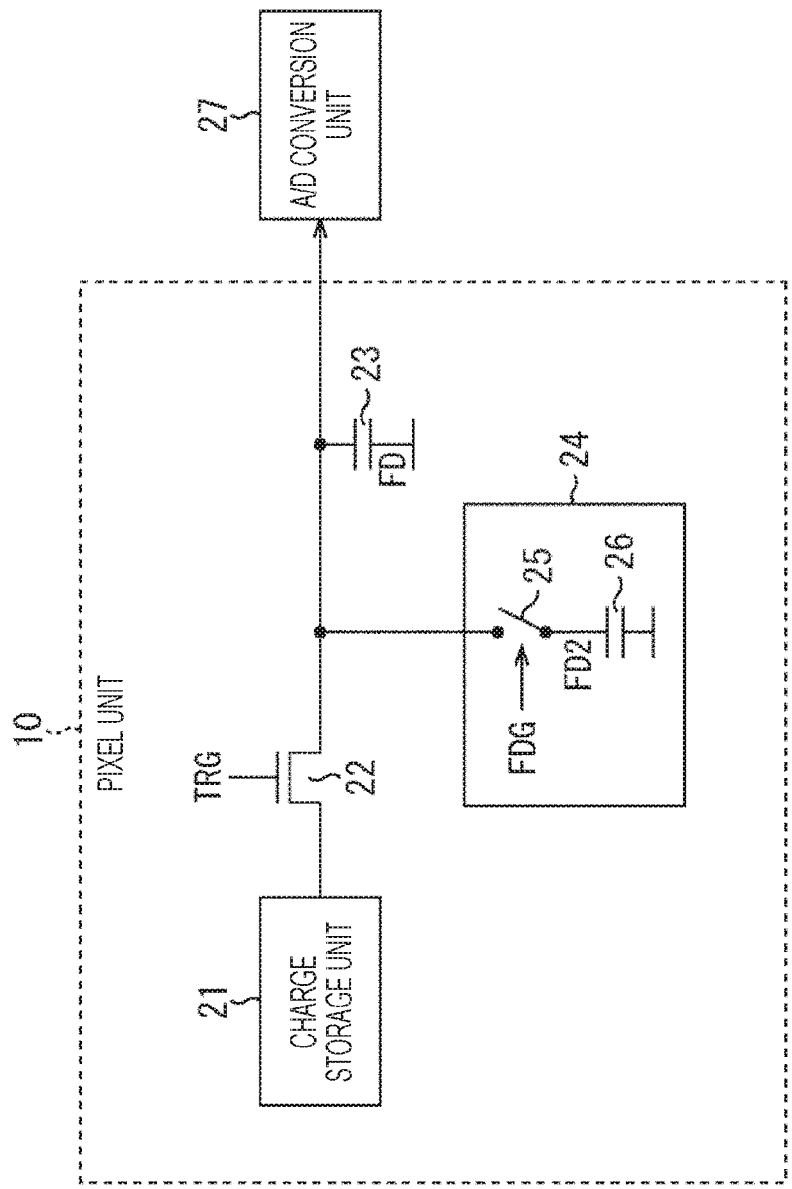
FIG. 6 is an equivalent circuit diagram illustrating a modification of the configuration example of the pixel unit illustrated in FIG. 1.

Next, FIG. 6 illustrates a modification of the configuration example of the pixel unit 10 illustrated in FIG. 1. Although the A/D conversion unit 27 is provided in the pixel unit 10 in the configuration example illustrated in FIG. 1, the A/D conversion unit 27 may be provided outside the pixel unit 10 as in the modification illustrated in FIG. 6. In this case, the A/D conversion unit 27 may be shared by a plurality of the pixel units 10.

<Specific Configuration Examples (Specific Examples) of Pixel Unit 10>

Next, a specific configuration example (specific example) of the modification of the pixel unit 10 illustrated in FIG. 6 will be described.

FIG. 7 is an equivalent circuit diagram illustrating a first specific example of the pixel unit 10. The first specific example has a configuration in which the charge storage unit 21 includes a photodiode (PD) 31 and the FD capacitance switching unit 24 is arranged in series with the reset transistor 34.

In other words, in the first specific example, a source of the transfer transistor 22 is connected to a cathode of the PD 31 as the charge storage unit 21, and a drain of the transfer transistor 22 is connected to the FD 23.

The FD 23 is connected to a gate of the amplifier transistor 32. A drain of the amplifier transistor 2 is connected to VDD (negative power supply voltage), and a source of the amplifier transistor 2 is connected to a drain of the selection transistor 33. A source of the selection transistor 33 is connected to the vertical signal line 35.

A drain of the reset transistor 34 is connected to the VDD, and a source of the reset transistor 34 is connected to one end of the FD capacitance switching unit 24. The other end of the FD capacitance switching unit 24 is connected to the FD 23.

Figure 8:
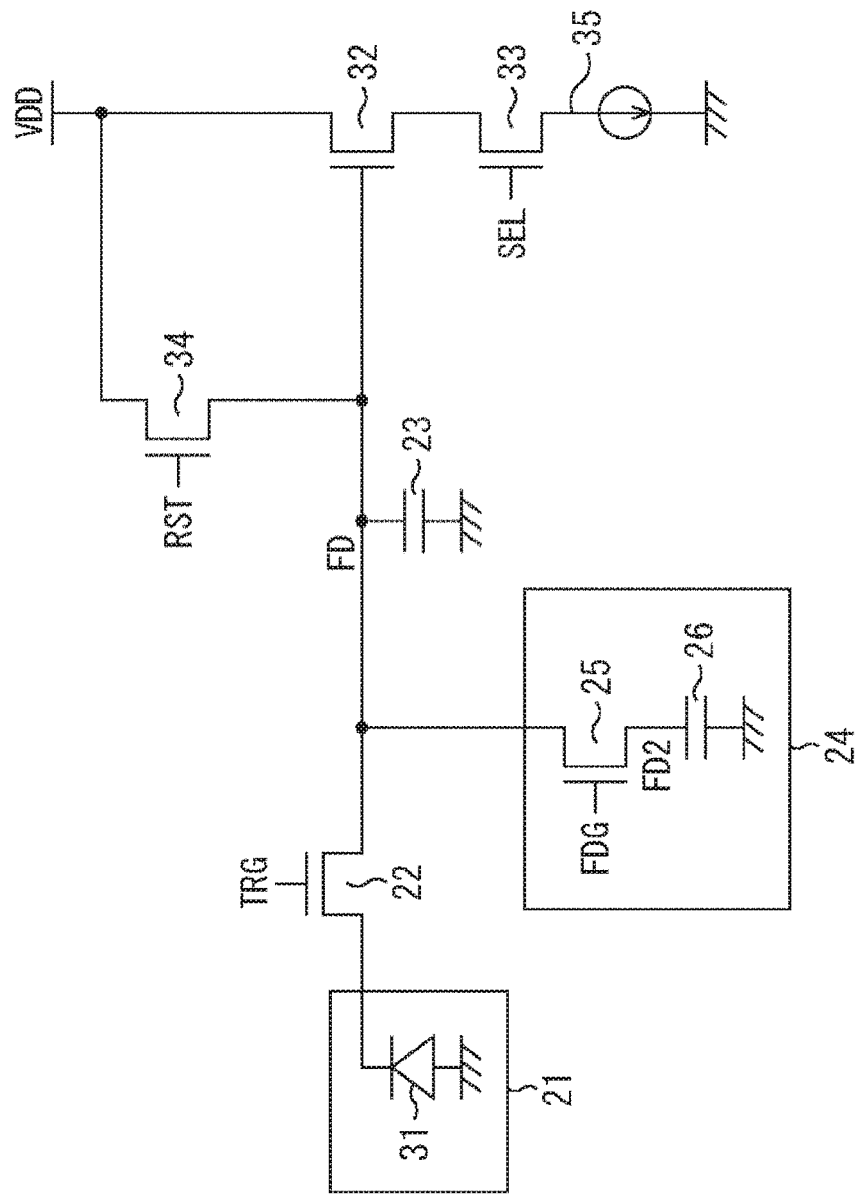
FIG. 8 is an equivalent circuit diagram illustrating a second specific example of the pixel unit.

Next, FIG. 8 is an equivalent circuit diagram illustrating a second specific example of the pixel unit 10. The second specific example has a configuration in which the charge storage unit 21 includes the PD 31 and the FD capacitance switching unit 24 is arranged in parallel with the reset transistor 34. Note that, among configuration elements of the second specific example, description of those common to the first specific example is appropriately omitted.

In other words, in the second specific example, the drain of the reset transistor 34 is connected to the VDD, and the source of the reset transistor 34 is connected to the FD 23. One end of the FD capacitance switching unit 24 is connected to the FD 23.

Figure 9:
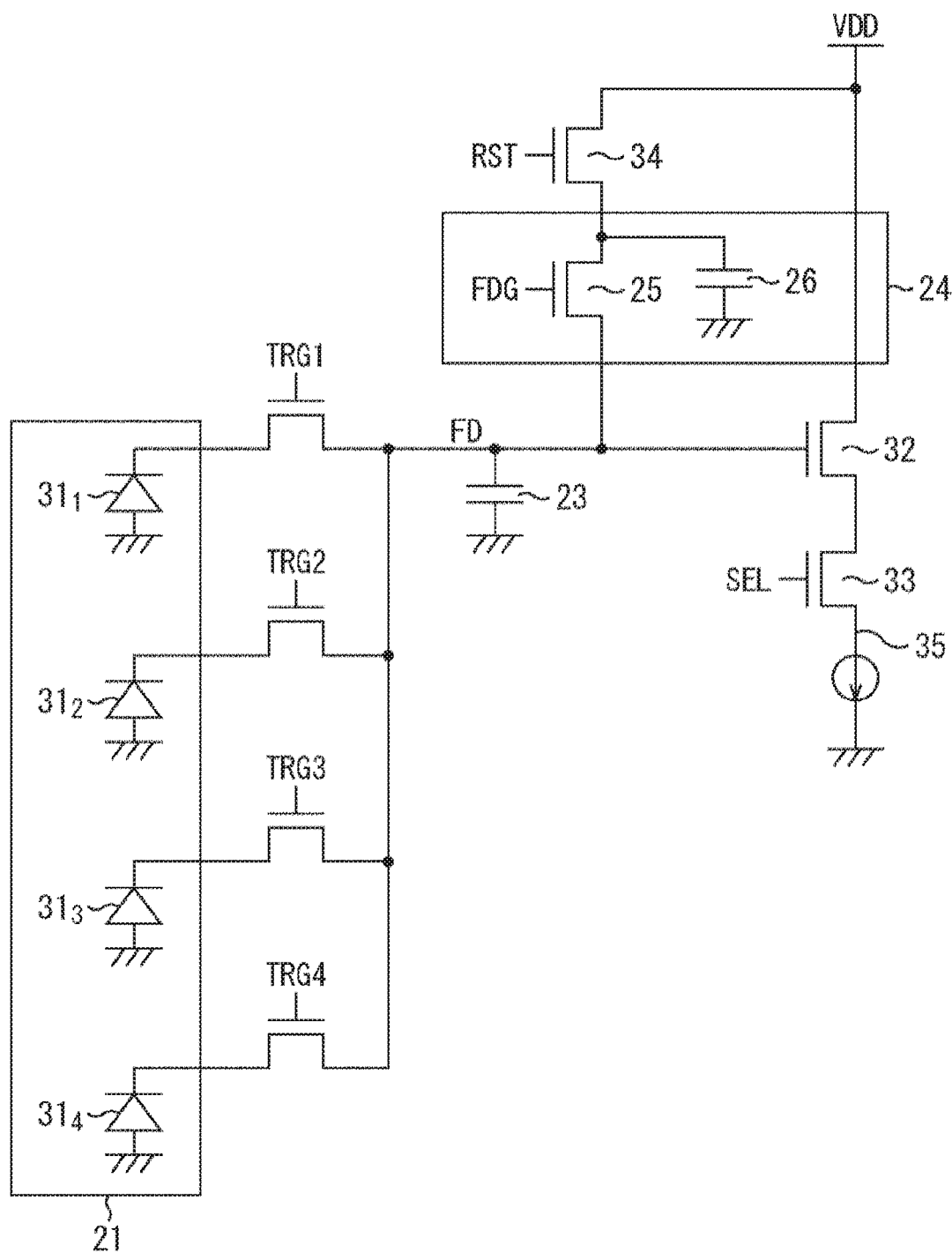
FIG. 9 is an equivalent circuit diagram illustrating a third specific example of the pixel unit.

Next, FIG. 9 is an equivalent circuit diagram illustrating a third specific example of the pixel unit 10. The third specific example has a configuration in which the FD 23 and the like are shared by a plurality of pixels. In the case of FIG. 9, the number of pixels sharing the FD 23 and the like (hereinafter referred to as sharing number) is four but the sharing number is not limited to four and is arbitrary. In the third specific example, the charge storage unit 21 includes a plurality of the PDs 31 (PDs $31_1$ to $31_4$ in the case of FIG. 9). The PDs 31 are respectively provided with corresponding transfer transistors 22.

In other words, in the third specific example, sources of the plurality of transfer transistors $22_1$ to $22_4$ respectively corresponding to the plurality of PDs $31_1$ to $31_4$ are connected to cathodes of the corresponding PDs 31, and drains of the plurality of transfer transistors $22_1$ to $22_4$ are connected to the FD 23. Since the other configuration elements are similar to the configuration elements in the first specific example, description of the other configuration elements is omitted.

Figure 10:
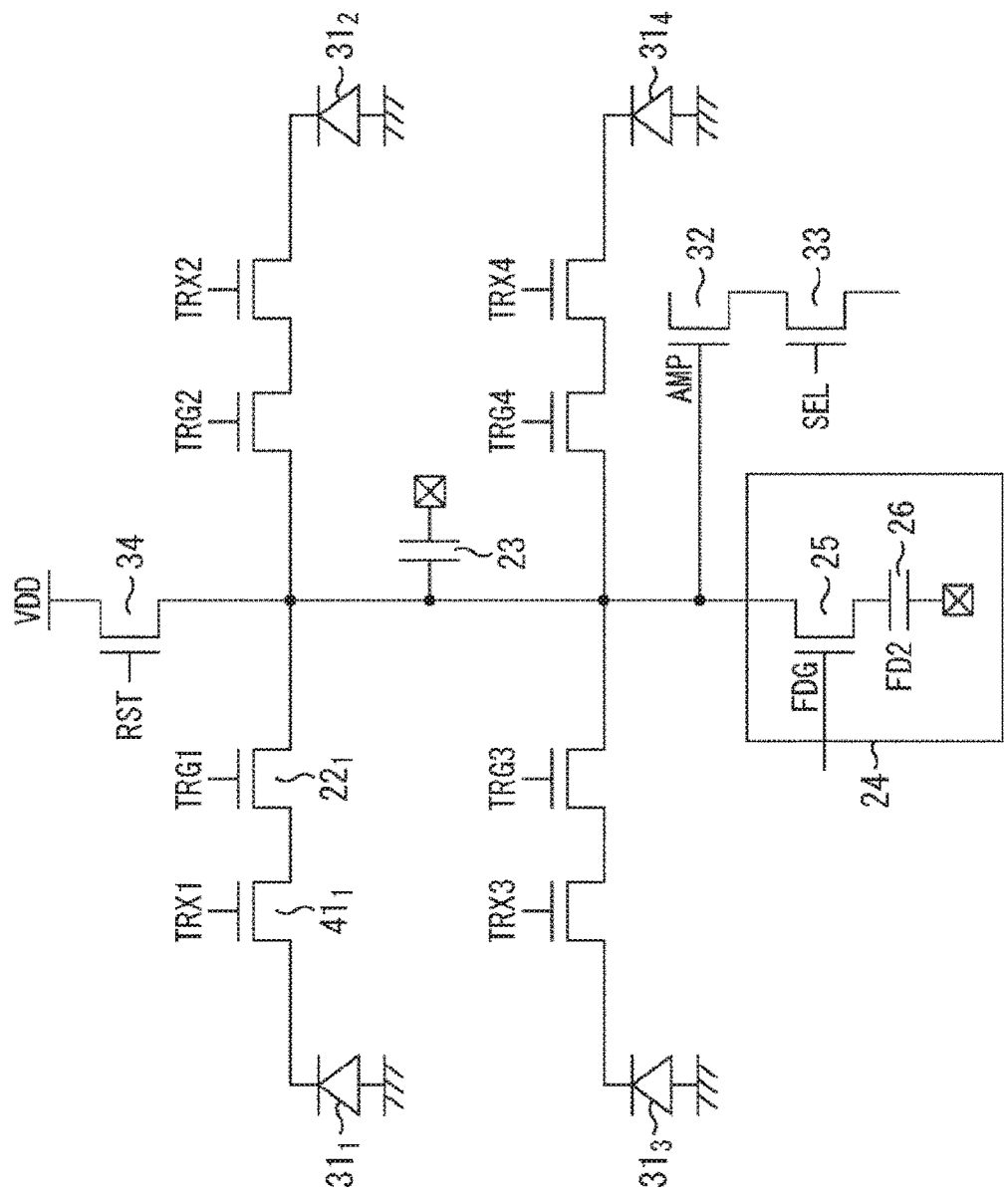
FIG. 10 is an equivalent circuit diagram illustrating a fourth specific example of the pixel unit.

Next, FIG. 10 is an equivalent circuit diagram illustrating a fourth specific example of the pixel unit 10. Similarly to the third specific example, the fourth specific example has a configuration in which the FD 23 and the like are shared by a plurality of pixels. In the case of FIG. 10, the sharing number is four but the sharing number is not limited to four and is arbitrary.

Moreover, in the fourth specific example, memory units $41_1$ to $41_4$ as the charge storage unit 21 and memory transfer gates $42_1$ to $42_4$ (TRX1 to TRX4) are provided between the PD$31_1$ to $31_4$ and the transfer transistors $22_1$ to $22_4$ respectively corresponding to the PD$31_1$ to $31_4$.

In other words, in the fourth specific example, the cathodes of the PDs 31 are connected to the respectively corresponding memory units 41. Sources of the memory transfer transistors 42 are connected to the corresponding memory units 41, and drains of the memory transfer transistors 42 are connected to sources of the corresponding transfer transistors 22. Drains of the transfer transistors 22 are connected to the FD 23. Since the other configuration elements are substantially similar to the configuration elements in the second specific example, description of the other configuration elements is omitted.

In the fourth specific example, since the memory units 41 are provided to the PDs 31, a global shutter in which shutter timings of the PDs 31 are matched can be achieved.

Figure 11:
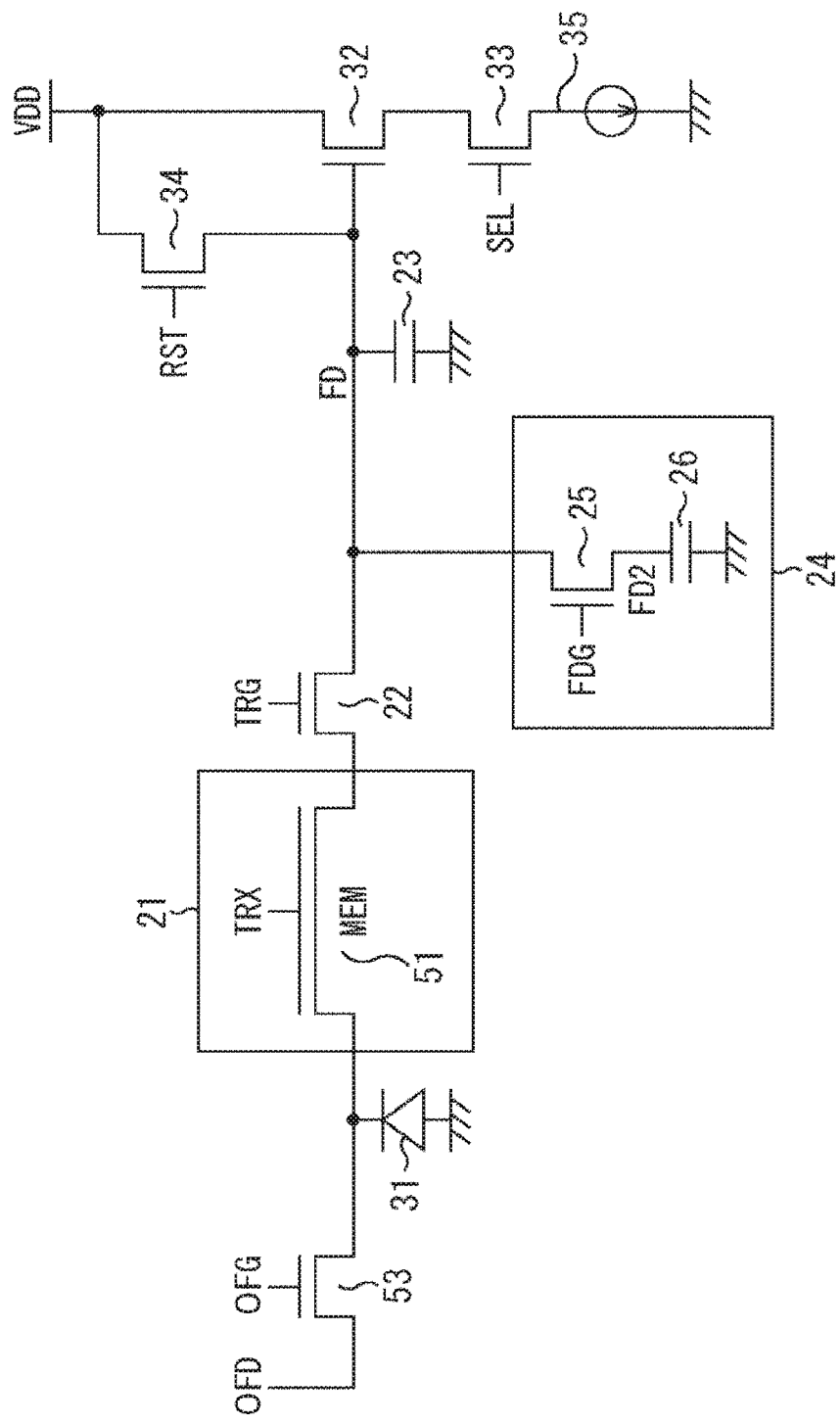
FIG. 11 is an equivalent circuit diagram illustrating a fifth specific example of the pixel unit.

Next, FIG. 11 is an equivalent circuit diagram illustrating a fifth specific example of the pixel unit 10. The fifth specific example includes a memory unit 51 as the charge storage unit 21 and a transfer gate (TRX) 52 for the memory unit 51 between the PD 31 and the transfer transistor 22.

In other words, in the fifth specific example, the cathode of the PD 31 is connected to the memory unit 51. Furthermore, the cathode of the PD 31 is connected to an overflow drain (OFD) via an overflow gate (OFG) 53. A source of the transfer gate 52 is connected to the memory unit 51, and a drain of the transfer gate 52 is connected to the source of the corresponding transfer transistor 22. The drains of the transfer transistors 22 are connected to the FD 23. Since the other configuration elements are substantially similar to the configuration elements in the second specific example, description of the other configuration elements is omitted.

Figure 12:
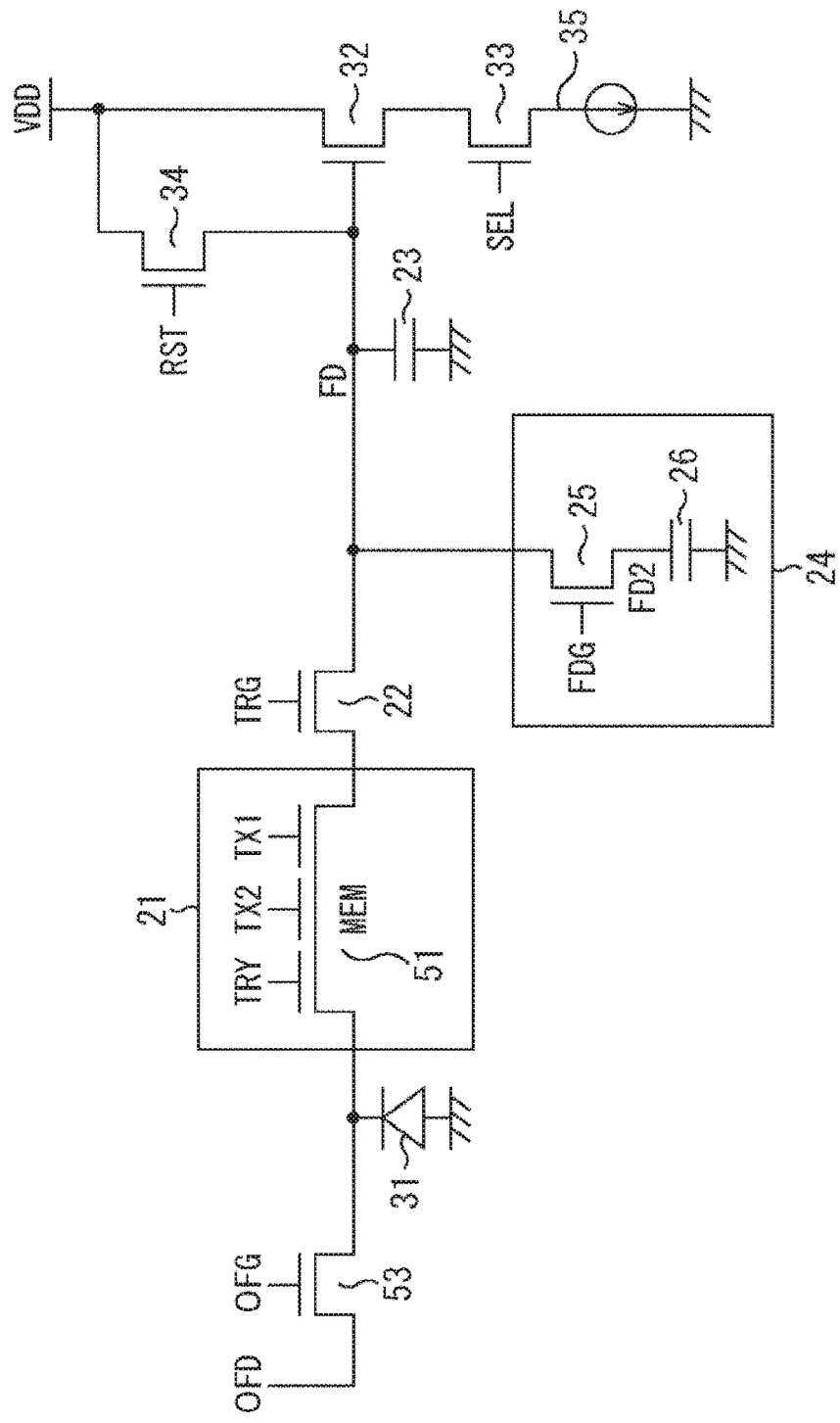
FIG. 12 is an equivalent circuit diagram illustrating a sixth specific example of the pixel unit.

Next, FIG. 12 is an equivalent circuit diagram illustrating a sixth specific example of the pixel unit 10. The sixth specific example is obtained by multistaging the transfer gate 52 for the memory unit 51 in the fifth specific example. Since the other configuration elements are substantially similar to the configuration elements in the fifth specific example, description of the other configuration elements is omitted.

Figure 13:
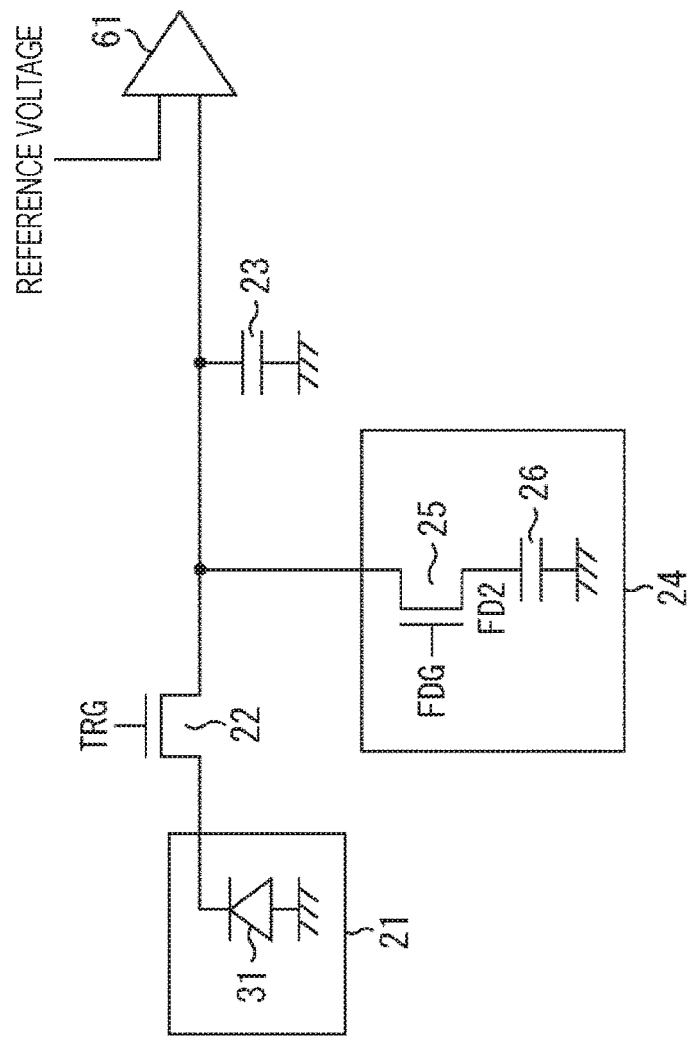
FIG. 13 is an equivalent circuit diagram illustrating a seventh specific example of the pixel unit.

Next, FIG. 13 is an equivalent circuit diagram illustrating a seventh specific example of the pixel unit 10. The seventh specific example has a configuration in which the amplifier transistor 32, the selection transistor 33, and the reset transistor 34 are omitted from the second specific example, and an output of the FD 23 is wired to be directly supplied to a comparator 61 in the A/D conversion unit 27 in the subsequent stage. Since the other configuration elements are substantially similar to the configuration elements in the fifth specific example, description of the other configuration elements is omitted.

Figure 14:
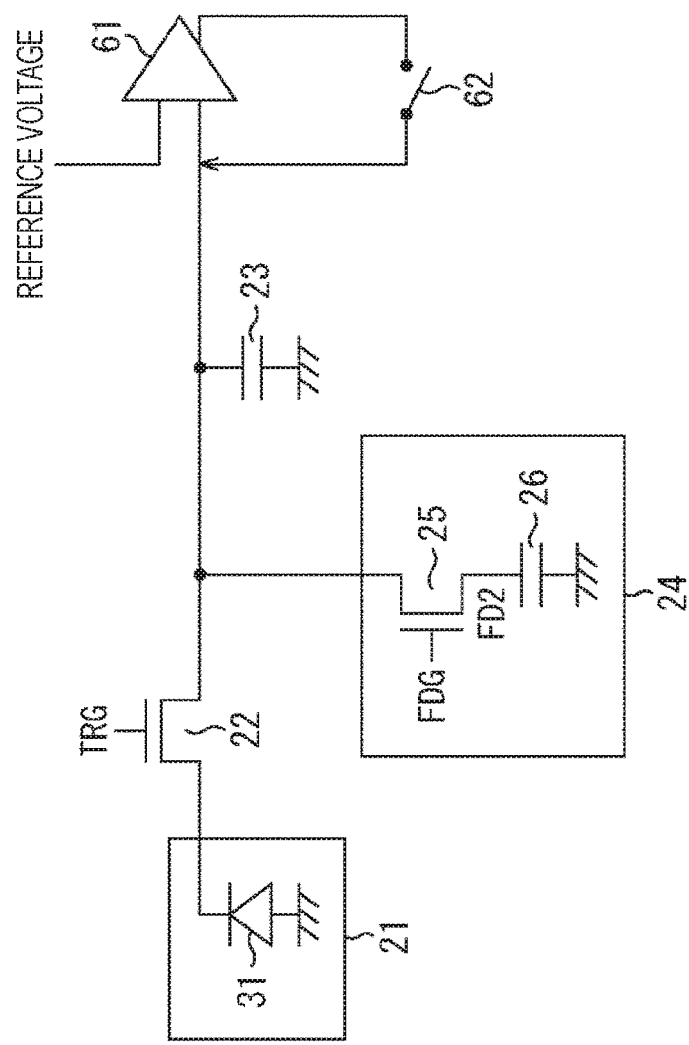
FIG. 14 is an equivalent circuit diagram illustrating an eighth specific example of the pixel unit.

Next, FIG. 14 is an equivalent circuit diagram illustrating an eighth specific example of the pixel unit 10. The eighth specific example has a configuration in which the output of the FD 23 is wired to be directly supplied to the comparator 61 in the A/D conversion unit 27 in the subsequent stage, similarly to the seventh specific example. Moreover, in the eighth specific example, a switch 62 for feeding back an output of the comparator 61 to the FD 23 is provided. Since the other configuration elements are substantially similar to the configuration elements in the seventh specific example, description of the other configuration elements is omitted.

In other words, in the eighth specific example, the reset level of the FD 23 can also serve as an initialization level (auto-zero level) of the comparator 61. In this case, a potential dropped from a power supply voltage by a threshold value of a transistor in the comparator 61 becomes the reset level of the FD 23. In other words, since the transfer gradient from the charge storage unit 21 to the FD 23 in the LG state becomes small, improvement effect of the transfer efficiency by the above-described first drive sequence can be further obtained.

<Configuration Example of Solid-State Imaging Device as Embodiment of Present Technology>

Figure 15:
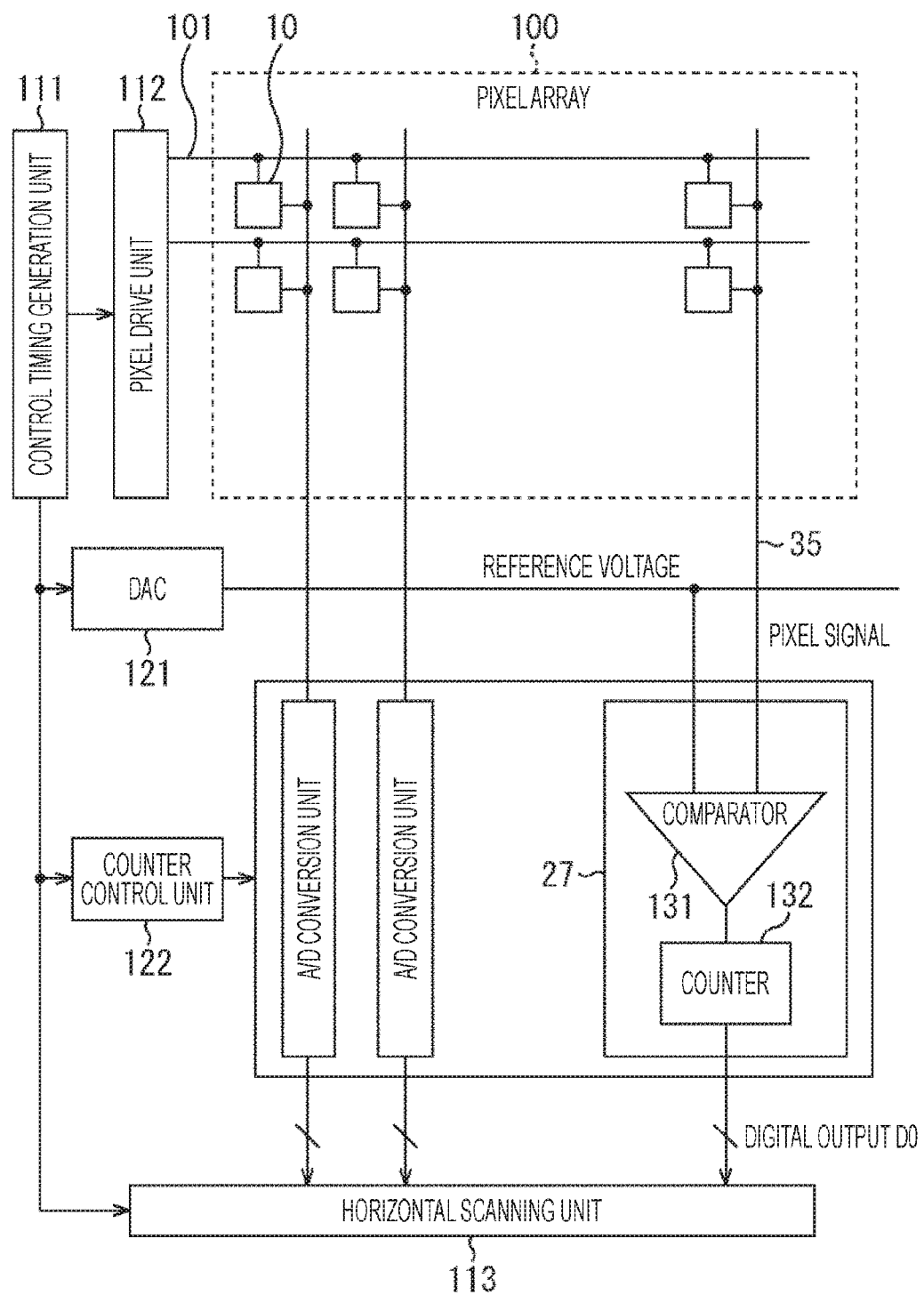
FIG. 15 is a block diagram illustrating a configuration example of a solid-state imaging device to which the present technology is applied.

Next, FIG. 15 illustrates a configuration example of the solid-state imaging device that is an embodiment of the present technology, including the above-described pixel unit 10. Note that the configuration example illustrated in FIG. 15 corresponds to the modification of the pixel unit 10 illustrated in FIG. 6 (the configuration in which the A/D conversion unit 27 is arranged outside the pixel unit 10), and the A/D conversion unit 27 is provided outside the pixel unit 10 for each column. However, the A/D conversion unit 27 may be provided in each pixel unit 10.

The solid-state imaging device includes a pixel array 100, a control timing generation unit 111, a pixel drive unit 112, a horizontal drive unit 113, a digital analog converter (DAC) 121, a counter control unit 122, and an A/D conversion unit 27 provided for each row of the pixel units.

The pixel array 100 is configured such that the pixel units 10 illustrated in FIG. 6 are arranged in a matrix manner.

Further, in the pixel array 100, a pixel drive line 112 is formed for each row in a right-left direction in FIG. 15 (a pixel array direction of a pixel row) and the vertical signal line 35 is formed for each column in an up-down direction in FIG. 15 (a pixel array direction of a pixel column) with respect to the pixel array in the matrix manner.

The pixel drive unit 112 includes a shift register, an address decoder, and the like, and supplies drive pulses for driving the pixel units 10 of the pixel array 100 at the same time, in units of rows, in units of pixels, or the like, to the pixel units 10 via control wiring 101.

A pixel signal (voltage signal) output from each pixel unit 10 of the pixel row selectively scanned by the pixel drive unit 112 is supplied to the A/D conversion unit 27 via the vertical signal line 35. The A/D conversion unit 27 performs, for each pixel column of the pixel array 100, predetermined signal processing for the pixel signal supplied from each pixel unit 10 of the selected row via the vertical signal line 35 to perform A/D conversion, and supplies the A/D converted pixel signal to the horizontal scanning unit 113.

The horizontal scanning unit 113 is configured by a shift register, an address decoder, and the like, and sequentially selects a unit circuit corresponding to the pixel column of the A/D conversion unit 27. By the selective scanning of the horizontal scanning unit 113, the pixel signals AD-converted by the A/D conversion unit 27 are sequentially output to the subsequent stage.

The A/D conversion unit 27 includes a comparator 131 and a counter 132, and performs A/D conversion for the pixel signal from the pixel unit 10 supplied via the vertical signal line 35.

The DAC 121 supplies a reference voltage to the comparator 131 of each A/D conversion unit 27. The counter control unit 122 controls the counters 132 of each A/D conversion units 27.

In the A/D conversion unit 27, sweep of the reference voltage is started in the comparator 131, and at the same time, a counting operation of the counter 132 is started. Then, at timing when the reference voltage falls below the pixel signal (voltage signal), an output signal of the comparator 131 is inverted from a high level to a low level, and the counting operation of the counter 132 is stopped at this falling edge. A count value is supplied to the horizontal scanning unit 113 as a result of A/D conversion of the pixel signal by 10 bits.

<Second Drive Sequence to Which Present Technology is Applied>

Figure 16:
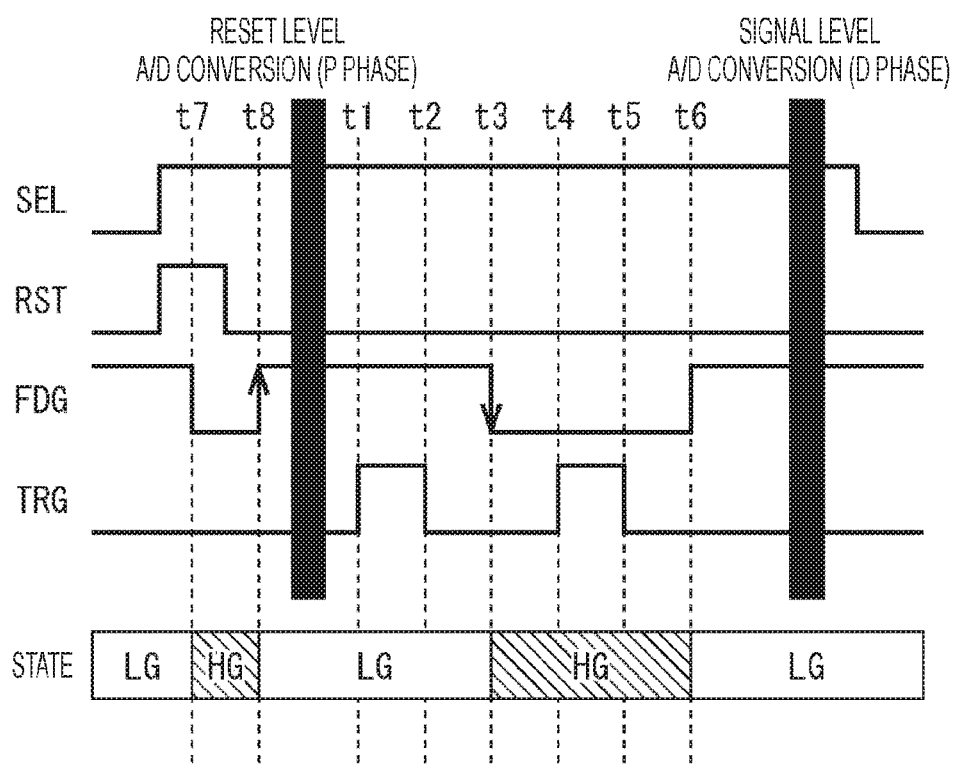
FIG. 16 is a diagram illustrating a second drive sequence to which the present technology is applied.

FIG. 16 illustrates a second drive sequence to which the present technology is applied in a case of driving and operating the pixel unit 10 with low conversion efficiency. This second drive sequence can be applied instead of the first drive sequence illustrated in FIG. 4.

Note that the drive at timing t1 to t6 in the second drive sequence illustrated in FIG. 16 is the same as the drive at the timing t1 to t6 in the first drive sequence. In other words, the second drive sequence is obtained by adding timing t7 and t8 at which the FDG is turned off and on before the timing t1 to the first drive sequence.

In the first drive sequence, the LG state transitions to the HG state at the timing t3. Therefore, the FD 23 is stepped down due to a parasitic capacitance $C_2$ (FIG. 18) between the FDG and the FD 23, and a transfer margin is decreased.

In contrast, in the second transfer sequence, to eliminate the decrease in the transfer margin, the FDG is turned off to transition from the LG state to the HG state at the timing t7 at which the reset transistor 34 is on before the A/D conversion operation for reset level acquisition. Moreover, the FDG is turned on to transition from the HG state to the LG state at the timing t8 after the reset transistor 34 is turned off. As a result, the FD 23 is boosted by a voltage change amount caused by the parasitic capacitance $C_2$ between the FDG and the FD 23, and the stepped down component at the timing t3 can be canceled, and the transfer margin can be secured.

<Third Drive Sequence to which Present Technology Applied>

Figure 17:
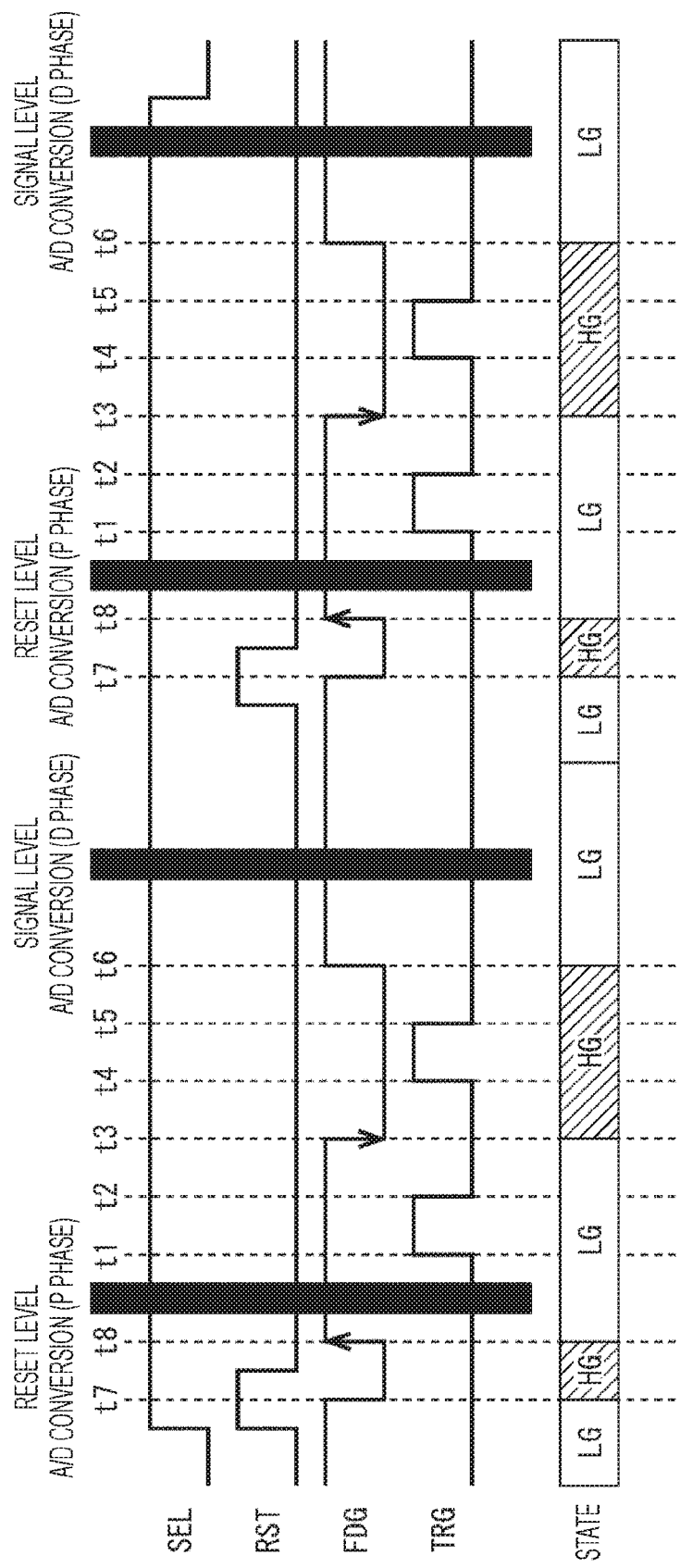
FIG. 17 is a diagram illustrating a third drive sequence to which the present technology is applied.

FIG. 17 illustrates a third drive sequence to which the present technology is applied in a case of driving and operating the pixel unit 10 with low conversion efficiency. This third drive sequence is obtained by repeating the second drive sequence twice, and can be applied instead of the first or second drive sequence.

In the case of the third drive sequence, an effect of noise reduction by multiple sampling can be obtained in addition to an effect similar to the effect of the second drive sequence.

<Countermeasures Against Speed Reduction that May Occur in Second Drive Sequence>

By the way, the second drive sequence illustrated in FIG. 16 is superior to the first drive sequence in terms of transfer margin. However, since the number of times of on and off of the FDG is larger than the first drive sequence, speed reduction is concerned.

Figure 18:
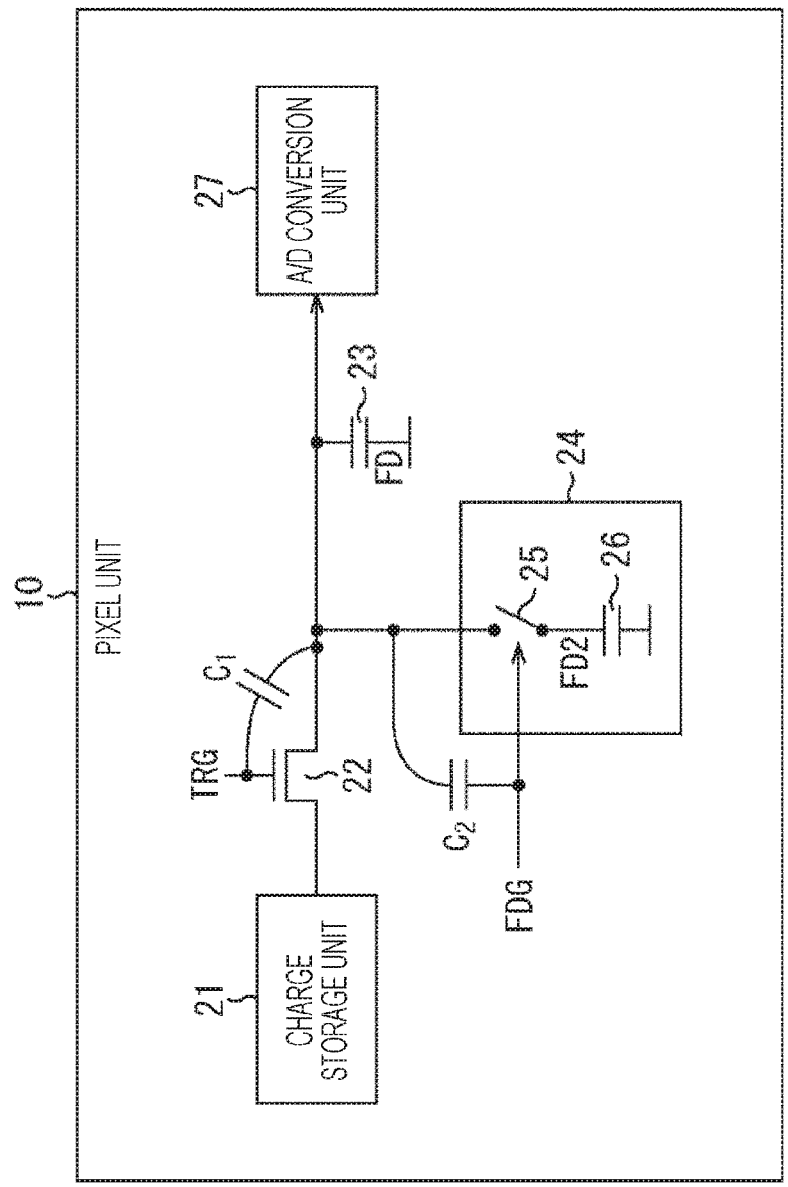
FIG. 18 is a diagram for describing a first countermeasure against speed reduction that may occur in the second drive sequence.

FIG. 18 is a diagram for describing a first countermeasure against the speed reduction that may occur in the second drive sequence.

To suppress the speed reduction that may occur in the second drive sequence, a parasitic capacitance $C_1$ between the TRG and the FD 23 is only required to be configured to become larger than the parasitic capacitance $C_2$ between the FDG and the FD 23.

Specifically, a WL product (in other words, a gate area) of the transfer transistor 22 forming the TRG is only required to be made larger than a WL product of the transistor forming the FDG. Here, W is the channel width of the transistor, and L is the channel length.

Figure 19:
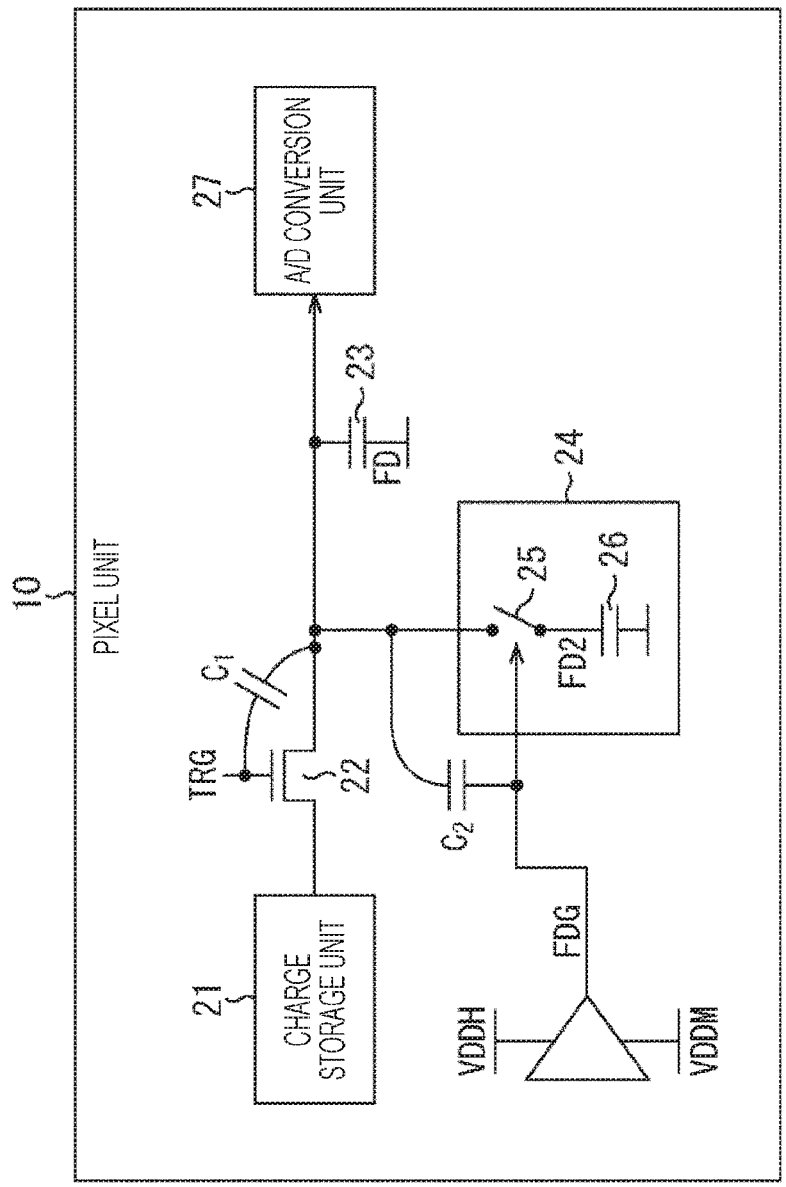
FIG. 19 is a diagram for describing a second countermeasure against speed reduction that may occur in the second drive sequence.

FIG. 19 is a diagram for describing a second countermeasure against a speed reduction that may occur in the second drive sequence.

To suppress the speed reduction that may occur in the second drive sequence, the voltage supplied to turn off the FDG at the timing t3 may be set to an intermediate voltage level (VDDM) that is higher than an L level of the VDD and lower than an H level (VDDL) of the VDD to make voltage change in the FDG at the timing t3 small.

<Problem of Global Shutter According to Fourth Specific Example of Pixel Unit 10>

Next, problems in a case where the fourth specific example of the pixel unit 10 illustrated in FIG. 10, in other words, the configuration in which the plurality of pixels shares the FD 23 and the subsequent configuration elements realizes a global shutter in which shutter timings of pixels are matched, will be described. Hereinafter, the plurality of pixels sharing the FD 23 and the subsequent configuration elements will be referred to as a sharing pixel unit.

In the case of executing the global shutter in the sharing pixel unit, the memory units $41_1$ to $41_4$ of the pixels are simultaneously reset. Then, a method of simultaneously resetting the memory units $41_1$ to $41_4$ in two steps is known.

Figure 20:
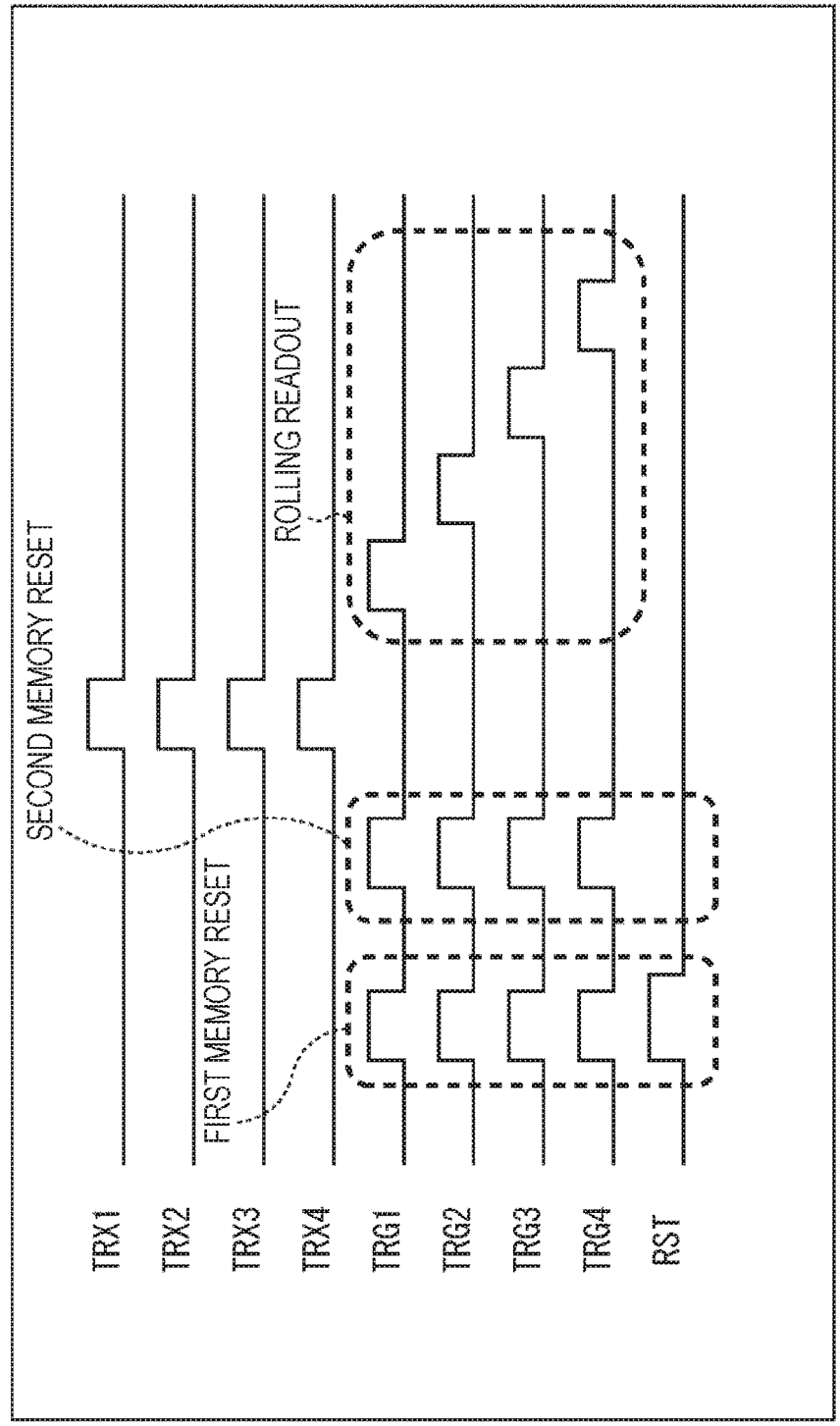
FIG. 20 is a diagram illustrating an example of a conventional drive sequence that can be assumed in a sharing pixel unit.

FIG. 20 illustrates an example of a conventional drive sequence including two memory resets, which can be assumed for the sharing pixel unit. However, in this drive sequence, it is assumed that FDG is always off.

In this drive sequence, as the first memory reset, the TRG1 to TRG4 are simultaneously turned on and off and the reset transistor 34 is turned on and off to connect the memory units 41 to the VDD via the corresponding transfer transistors 22 and the reset transistor 34 to reset the memory units 41. At this time, the FD 23 is also reset.

Next, as the second memory reset, the TRG1 to TRG4 are simultaneously turned on to boost the FD 23 in the state where the reset transistor 34 is off to completely transfer the charges remaining in the memory units 41 to the FD 23.

Next, after the TRG1 to TRG4 are simultaneously turned off, the memory transfer transistors 42 (TRX1 to TRX4) are simultaneously turned on to transfer the charges of the PDs 31 to the corresponding memory units 41. Thereafter, the TRG1 to TRG4 are sequentially turned on and off to sequentially transfer the charges of the memory units $41_1$ to $41_4$ to the FD 23 (rolling readout is performed).

Figure 21:
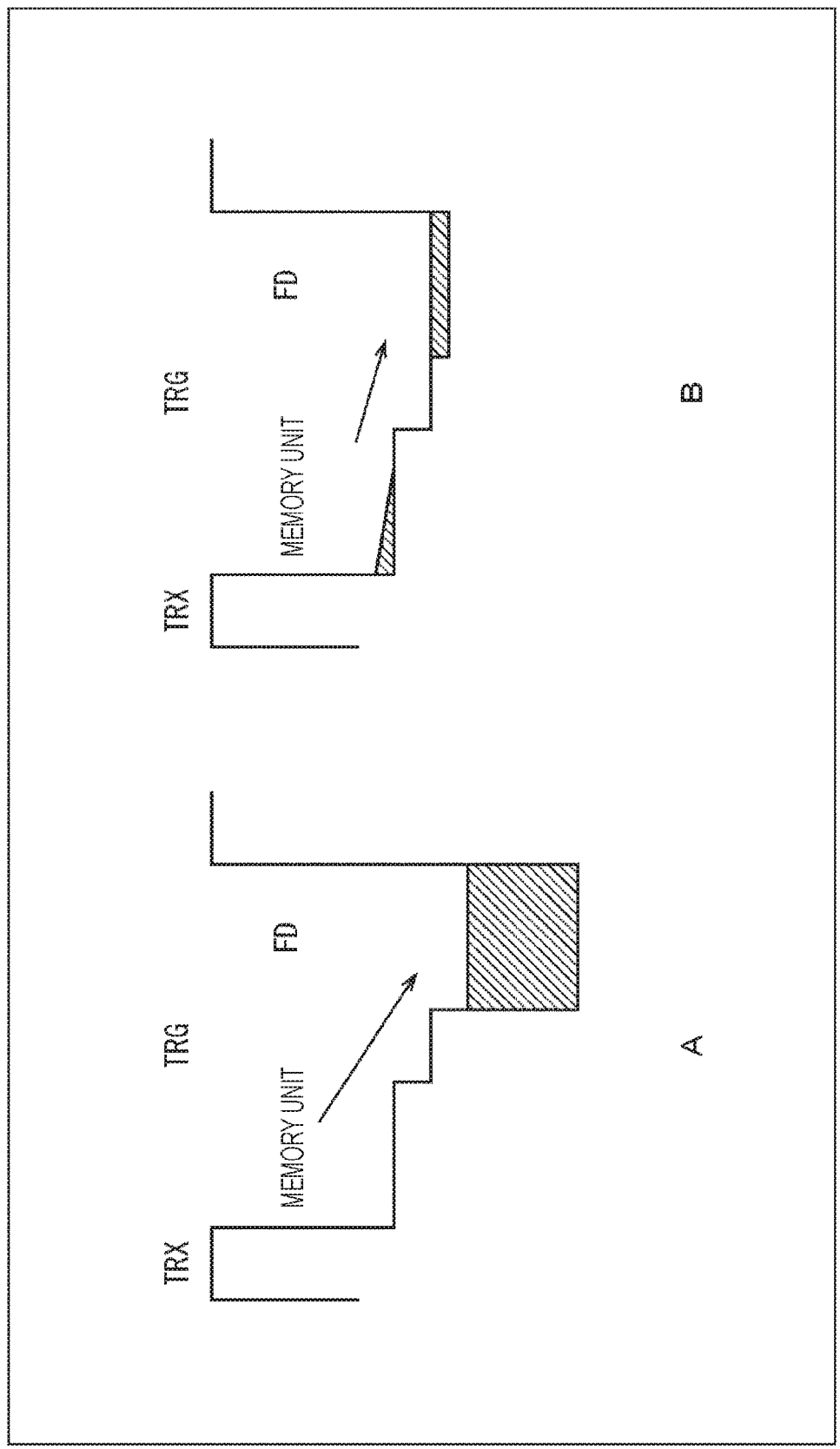
FIG. 21 is a diagram illustrating a potential corresponding to the drive sequence in FIG. 20.

FIG. 21 illustrates potentials in the drive sequence illustrated in FIG. 20. Note that A in FIG. 21 illustrates a potential at the time of the second memory reset, and B in FIG. 21 illustrates a potential at the time of the rolling readout.

At the time of the second memory reset illustrated in A of FIG. 21, the sharing number (four in this case) of TRGs are simultaneously turned on, and thus the boost voltage ΔV of the FD 23 becomes as illustrated in the following expression (3).

$$\Delta V = \Delta TRG \times C_1 \times \text{the sharing number}/C_{FD} \qquad (3)$$

In contrast, at the time of the rolling readout illustrated in B in FIG. 21, the sharing number of TRGs are sequentially turned on and only one TRG is influential. Therefore, the boost voltage ΔV of the FD 23 becomes as illustrated in the following expression (4).

$$\Delta V = \Delta TRG \times C_1/C_{FD} \qquad (4)$$

As is clear from the expressions (3) and (4) and FIG. 21, the boost voltage ΔV of the FD 23 is different between the second memory reset time and the rolling readout time. Therefore, at the time of the second memory reset, charges up to an unreadable range at the time of the rolling readout can be read, and conversely at the time of the rolling readout, the charges within the readable range at the time of the second memory reset cannot be read. It is a problem that such difference in transfer performance may become a factor of darkening or the like. The measures against this problem will be described below.

<First Countermeasure Against Problem Illustrated in FIG. 21>

Figure 22:
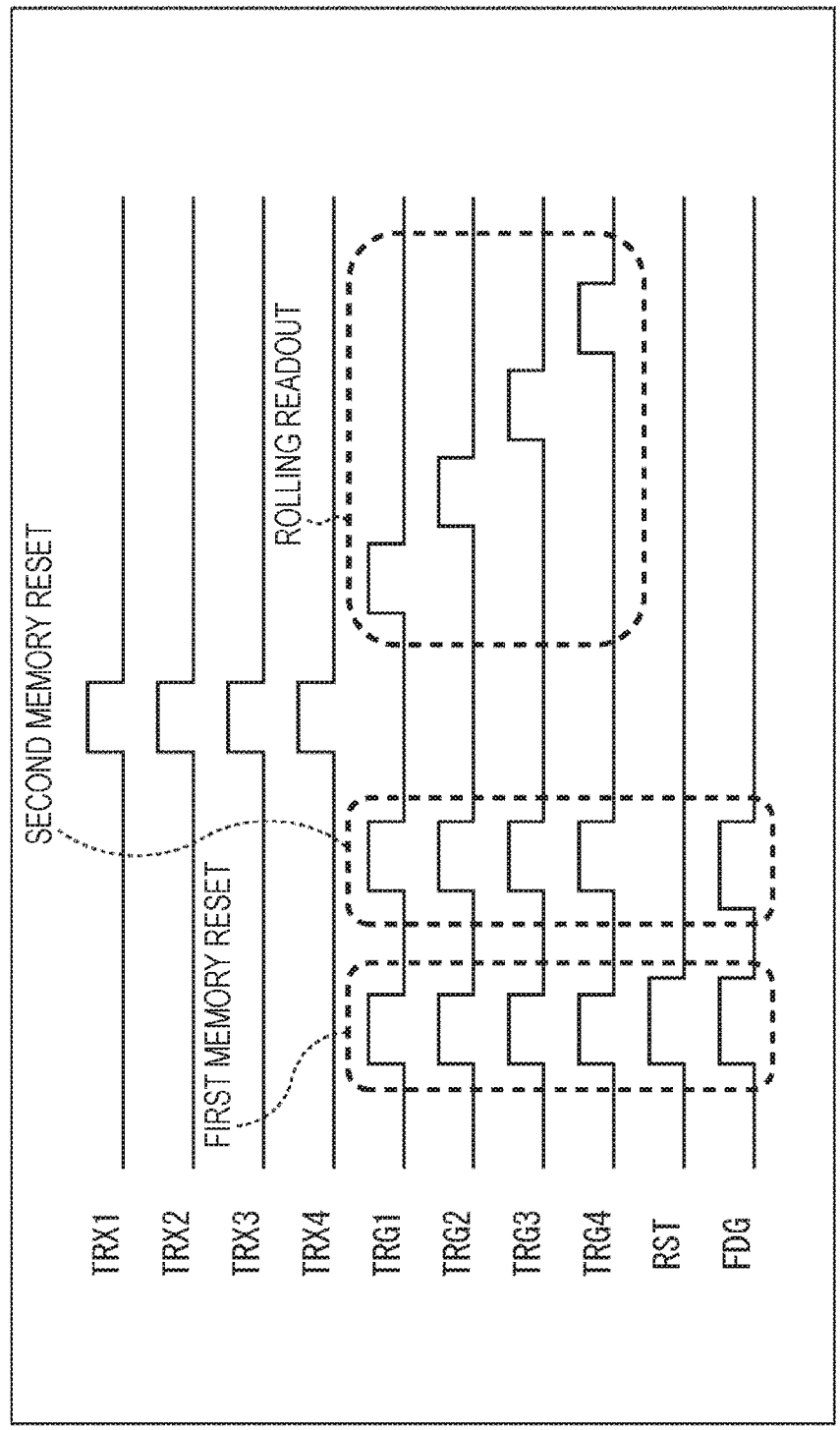
FIG. 22 is a diagram illustrating a drive sequence according to the fourth specific example of the pixel unit.

FIG. 22 illustrates the drive sequence according to the fourth specific example of the pixel unit 10, as a first countermeasure against the problem illustrated in FIG. 21.

In this drive sequence, as the first memory reset, the TRG1 to TRG4 are simultaneously turned on and off and the reset transistor 34 and the FDG are turned on and off to connect the memory units 41 to the VDD via the corresponding transfer transistors 22 and the reset transistor 34 to reset the memory units 41. At this time, the FD 23 and the FD 2 are also reset.

Next, as the second memory reset, the TRG1 to TRG4 and the FDG are simultaneously turned on to boost the FD 23 and the FD 2 in the state where the reset transistor 34 is off to completely transfer the charges remaining in the memory units 41 to the FD 23.

Next, after the TRG1 to TRG4 and the FDG are simultaneously turned off, the memory transfer transistors 42 (TRX1 to TRX4) are simultaneously turned on to transfer the charges of the PDs 31 to the corresponding memory units 41. Thereafter, the TRG1 to TRG4 are sequentially turned on and off to sequentially transfer the charges of the memory units $41_1$ to $41_4$ to the FD 23 (rolling readout is performed).

In this drive sequence, at the time of the second memory reset, the sharing number (four in this case) of the TRG 1 to TRG4 are simultaneously turned on, and thus the boost voltage $\Delta V$ of the FD 23 becomes as illustrated in the following expression (5).

$$\Delta V = \Delta TRG \times C_1 \times \text{the sharing number}/(C_{FD}+C_{FD2}) \quad (5)$$

In contrast, at the time of the rolling readout, the sharing number of the TRG1 to TRG4 are sequentially turned on and only one TRG is influential. Therefore, the boost voltage $\Delta V$ of the FD 23 becomes as illustrated in the following expression (6).

$$\Delta V = \Delta TRG \times C_1/C_{FD} \quad (6)$$

Here, as illustrated in the following expression (7), the $C_{FD2}$ that is the capacitance of the FD 2 is set to be (the sharing number−1) times the capacitance $C_{FD}$ of FD 23.

$$C_{FD2} = C_{FD} \times (\text{the sharing number}-1) \quad (7)$$

In this case, the expression (5) becomes as illustrated in the following expression (8).

$$\Delta V = \Delta TRG \times C_1 \times \text{the sharing number}/(C_{FD}+C_{FD2}) \quad (5)$$

$$= \Delta TRG \times C_1 \times \text{the sharing number}/(C_{FD}+C_{FD} \times (\text{the sharing number}-1))$$

$$= \Delta TRG \times C_1 \times \text{the sharing number}/(\text{the sharing number} \times C_{FD})$$

$$= \Delta TRG \times C_1/C_{FD} \quad (8)$$

As is clear from the comparison of the expressions (6) and (8), the boost voltage $\Delta V$ of the FD 23 can be matched with that at the rolling readout time by connecting the FD 23 and the FD 2 with the FDG being turned on at the time of the second memory reset.

Figure 23:
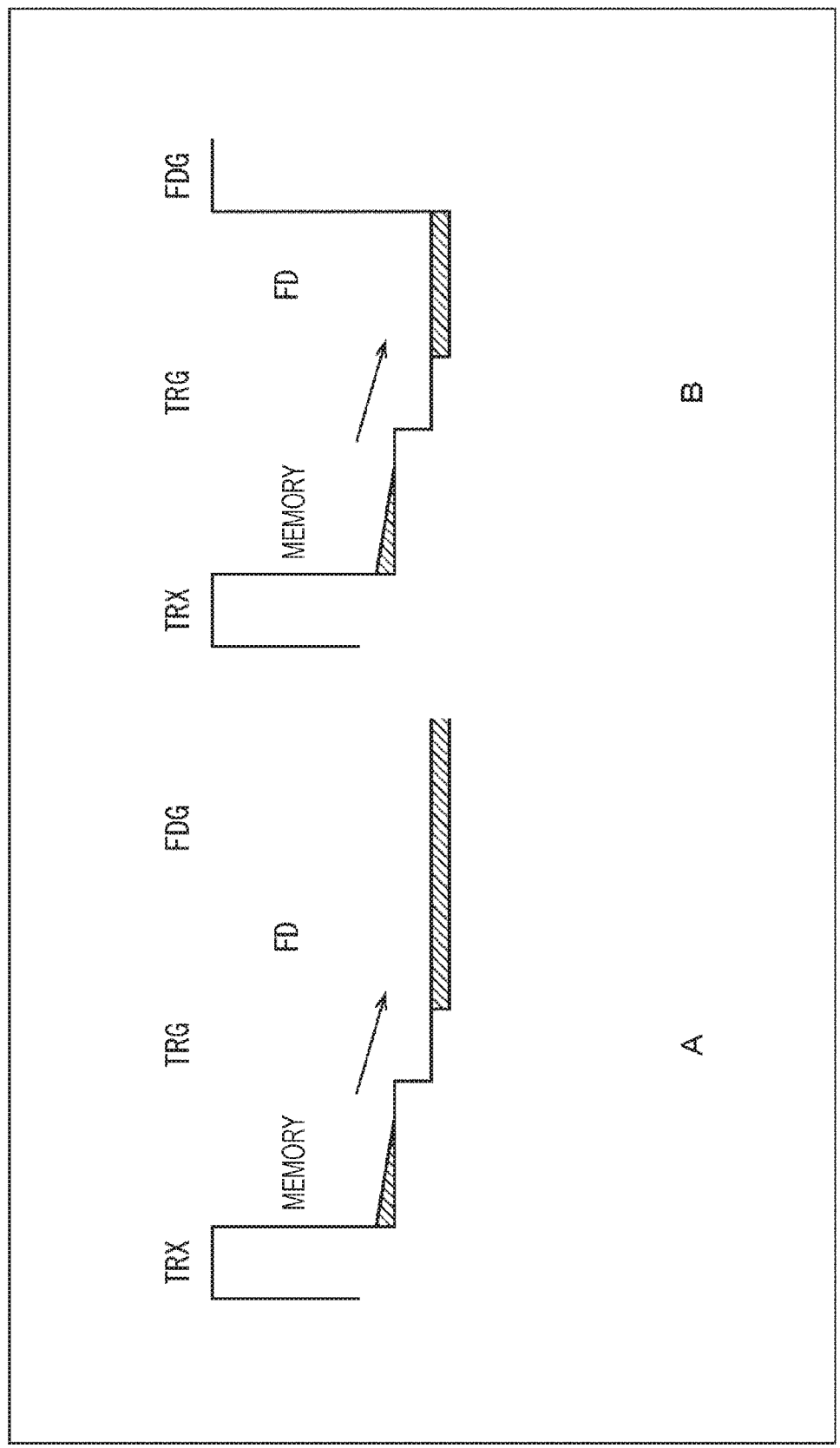
FIG. 23 is a diagram illustrating a potential corresponding to the drive sequence in FIG. 22.
Figure 29:
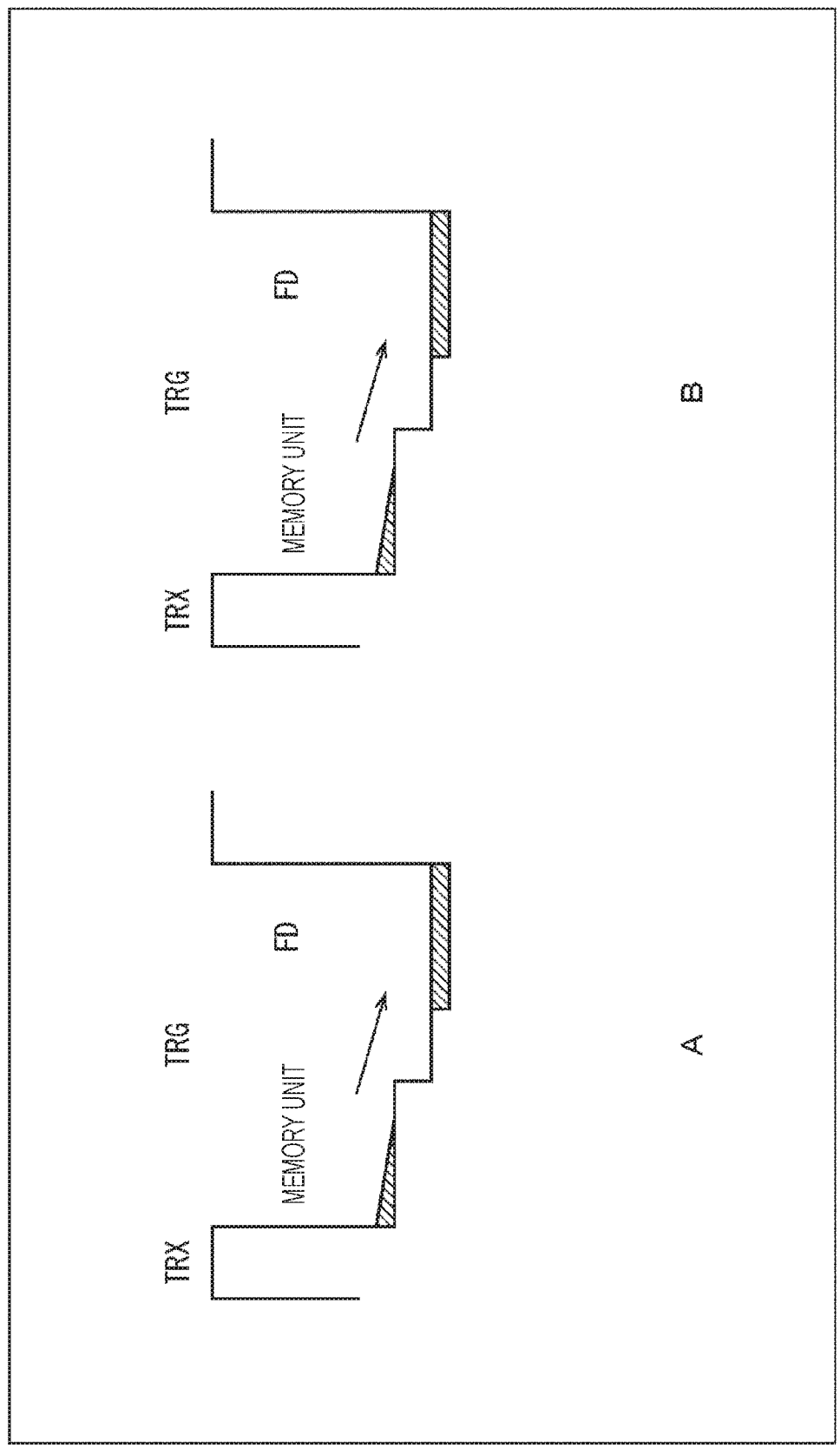
FIG. 29 is a diagram illustrating a potential corresponding to the first drive sequence in FIG. 28.

FIG. 23 illustrates potentials in the drive sequence illustrated in FIG. 21, corresponding to the case of $C_{FD2}=C_{FD} \times$ (the sharing number−1) In other words, A in FIG. 29 illustrates a potential at the time of second memory reset, and B in FIG. 29 illustrates a potential at the time of rolling readout.

As is clear from FIG. 23, the boost voltages $\Delta V$ of the FD 23 are matched between the second memory reset time and the rolling readout time in the case of $C_{FD2}=C_{FD} \times$ (the sharing number−1). Therefore, since the difference in the transfer capability between the second memory reset time and the rolling readout time is eliminated, occurrence of darkening and the like can be suppressed.

Furthermore, since the difference in the transfer capability between the second memory reset time and the rolling readout time is eliminated, measures such as changing the shape of the potential using a separate power supply become unnecessary, for example. Moreover, for example, designing the potentials to eliminate the difference in the transfer capability between the second memory reset time and the rolling readout time, or the like, becomes unnecessary.

<Modification of Fourth Specific Example of Pixel Unit 10>

Figure 24:
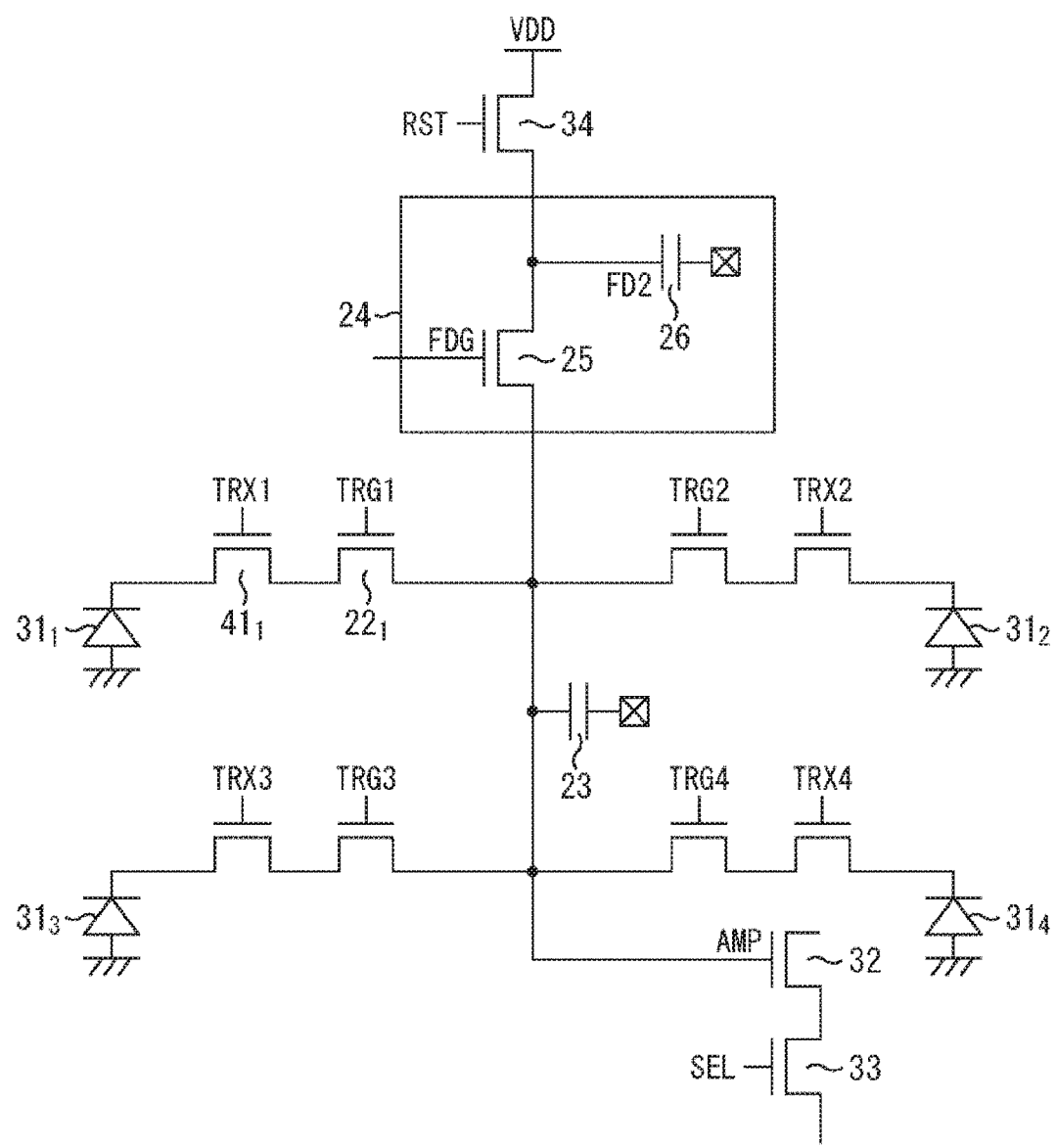
FIG. 24 is an equivalent circuit diagram illustrating a first modification of the fourth specific example of the pixel unit.

FIG. 24 illustrates a first modification of the fourth specific example of the pixel unit 10 illustrated in FIG. 10.

This first modification is a modification in which the position of the FD capacitance switching unit 24 is connected in series with the reset transistor 34, similarly to the first specific example of the pixel unit 10 illustrated in FIG. 7. Since the other configuration elements are common to the configuration elements in the fourth specific example, description of the other configuration elements is omitted.

Figure 25:
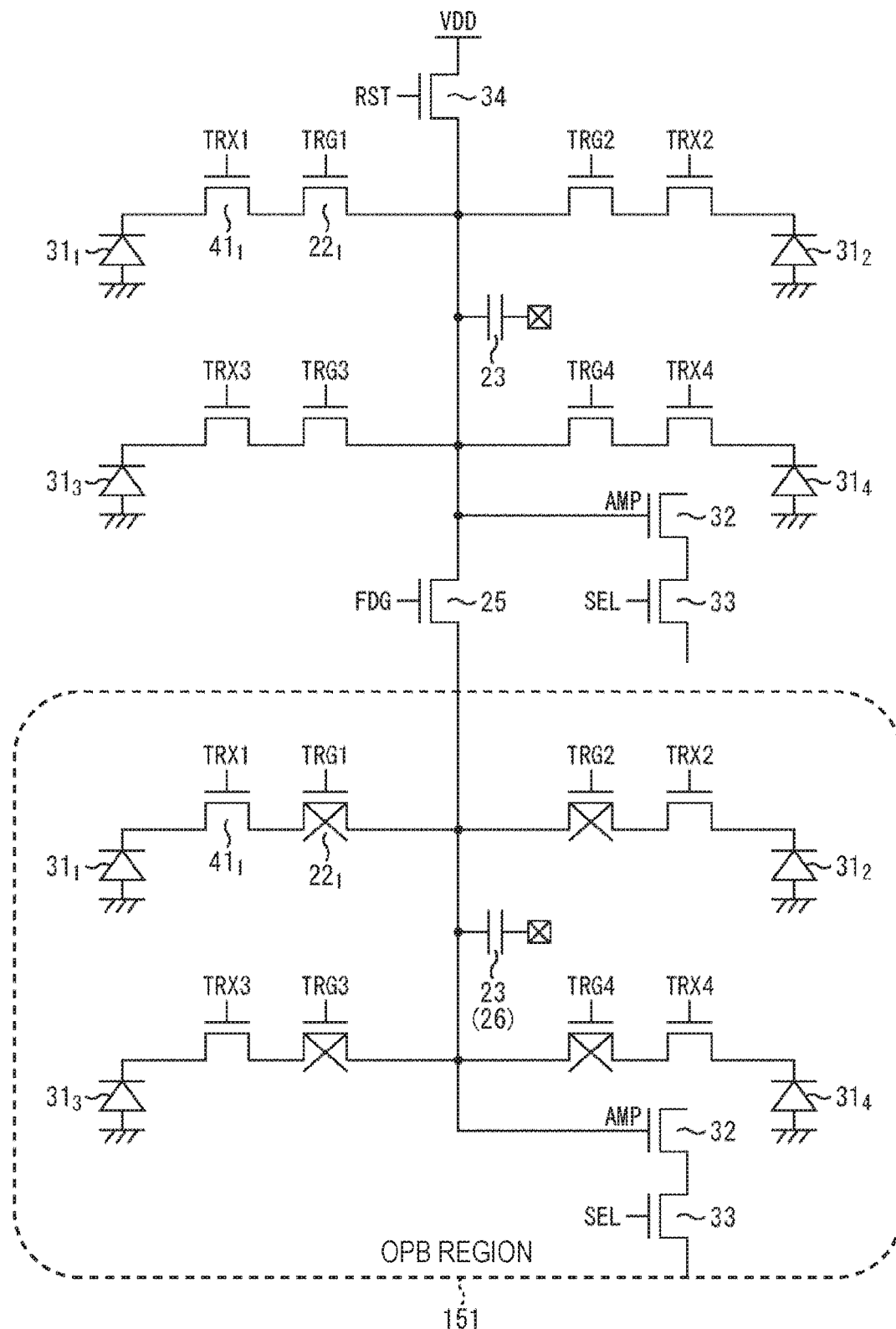
FIG. 25 is an equivalent circuit diagram illustrating a second modification of the fourth specific example of the pixel unit.
Figure 26:
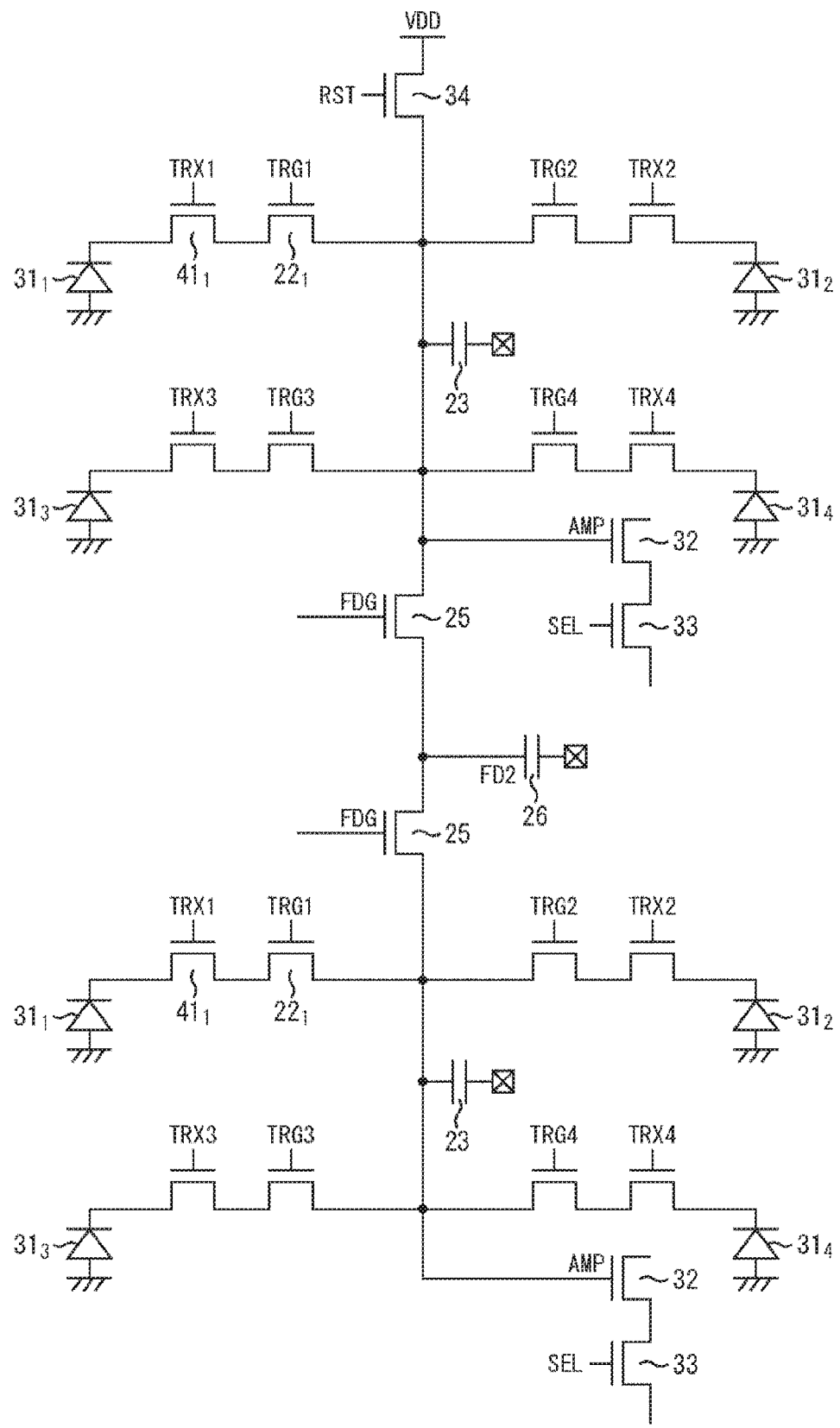
FIG. 26 is an equivalent circuit diagram illustrating a third modification of the fourth specific example of the pixel unit.

Next, FIG. 25 illustrates a second modification of the fourth specific example of the pixel unit 10 illustrated in FIG. 10.

The second modification is a modification using an FD 23 in another sharing pixel unit in which the TRGs are not driven, belonging to an optical black (OPB) region 151, instead of providing the additional capacitance 26 (FD 2) inside the sharing pixel unit. In other words, the FD 23 of another sharing pixel unit belonging to the OPB region 151 is connectable to the FD 23 of the sharing pixel unit via the FDG. Since the other configuration elements are common to the configuration elements in the fourth specific example, description of the other configuration elements is omitted.

In the second modification, the boost voltage $\Delta V$ of the FD 23 at the time of the second memory reset in the case of turning on the FDG to connect the FD 2 to the FD 23 becomes as illustrated in the following expression (9).

$$\Delta V = \Delta TRG \times C_1 \times \text{the sharing number}/2 \times C_{FD} \quad (9)$$

Meanwhile, the boost voltage $\Delta V$ of the FD 23 at the time of the rolling readout in the second modification remains as in the expression (6). As is clear from the comparison of the expressions (6) and (9), the boost voltage $\Delta V$ of the FD 23 at the time of the second memory reset has a difference from the boost voltage $\Delta V$ of the FD 23 at the time of the rolling readout. However, in the case of the expression (9), the difference in the transfer capability from the rolling readout time is smaller than the difference in the case of the expression (5). Therefore, an effect to suppress occurrence of darkening and the like to some extent can be expected. Note that this effect will diminish as the sharing number increases.

Next, FIG. 25 illustrates a third modification of the fourth specific example of the pixel unit 10 illustrated in FIG. 10.

The third modification is a modification in which the additional capacitance 26 (FD 2) is shared in a plurality of (two in the case of FIG. 25) adjacent sharing pixel units. Since the other configuration elements are common to the configuration elements in the fourth specific example, description of the other configuration elements is omitted.

In the third modification, a similar effect to the effect described with reference to FIG. 23 can be exhibited by the plurality of sharing pixel units, which shares the additional capacitance 26 (FD 2), executing the second memory reset of the drive sequence illustrated in FIG. 22 at different timings.

<Second Countermeasure Against Problem Illustrated in FIG. 21>

As described above, the problem illustrated in FIG. 21 can be solved by operating the fourth specific example of the pixel unit 10 with the drive sequence illustrated in FIG. 22 as the first countermeasure.

Note that the problem illustrated in FIG. 21 can be solved by operating, with a drive sequence to be described below, a configuration in which the FD capacitance switching unit 24 is removed from the fourth specific example of the pixel unit 10.

Figure 27:
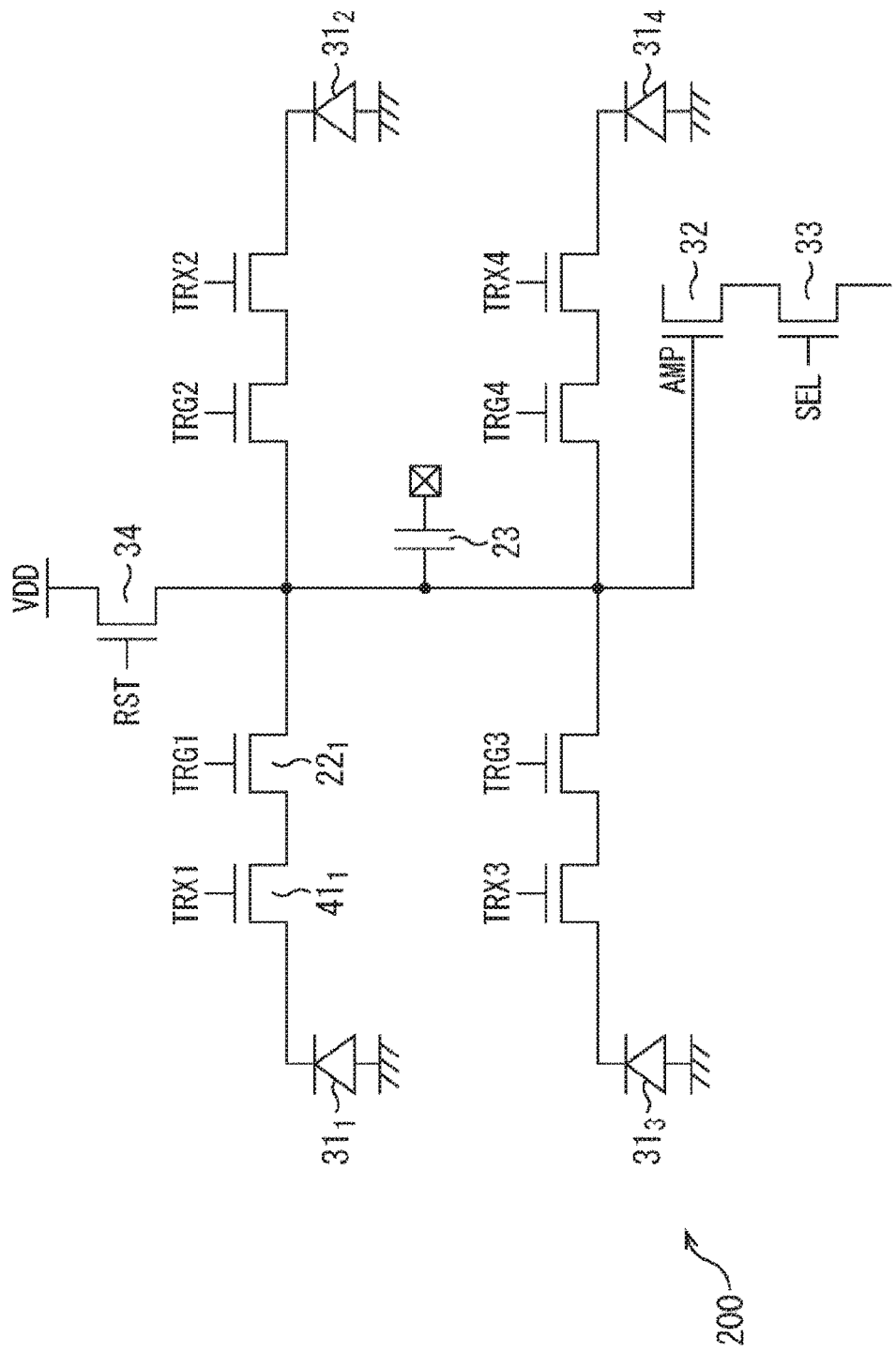
FIG. 27 is an equivalent circuit diagram obtained by removing an additional capacitance from the fourth specific example of the pixel unit.

FIG. 27 illustrates a configuration example in which the FD capacitance switching unit 24 is removed from the fourth specific example of the pixel unit 10. Hereinafter, this configuration example is referred to as a sharing pixel unit 200. Since the sharing pixel unit 200 is similarly configured to the fourth specific example of the pixel unit 10 except that the FD capacitance switching unit 24 is removed, description of the sharing pixel unit 200 is omitted.

Figure 28:
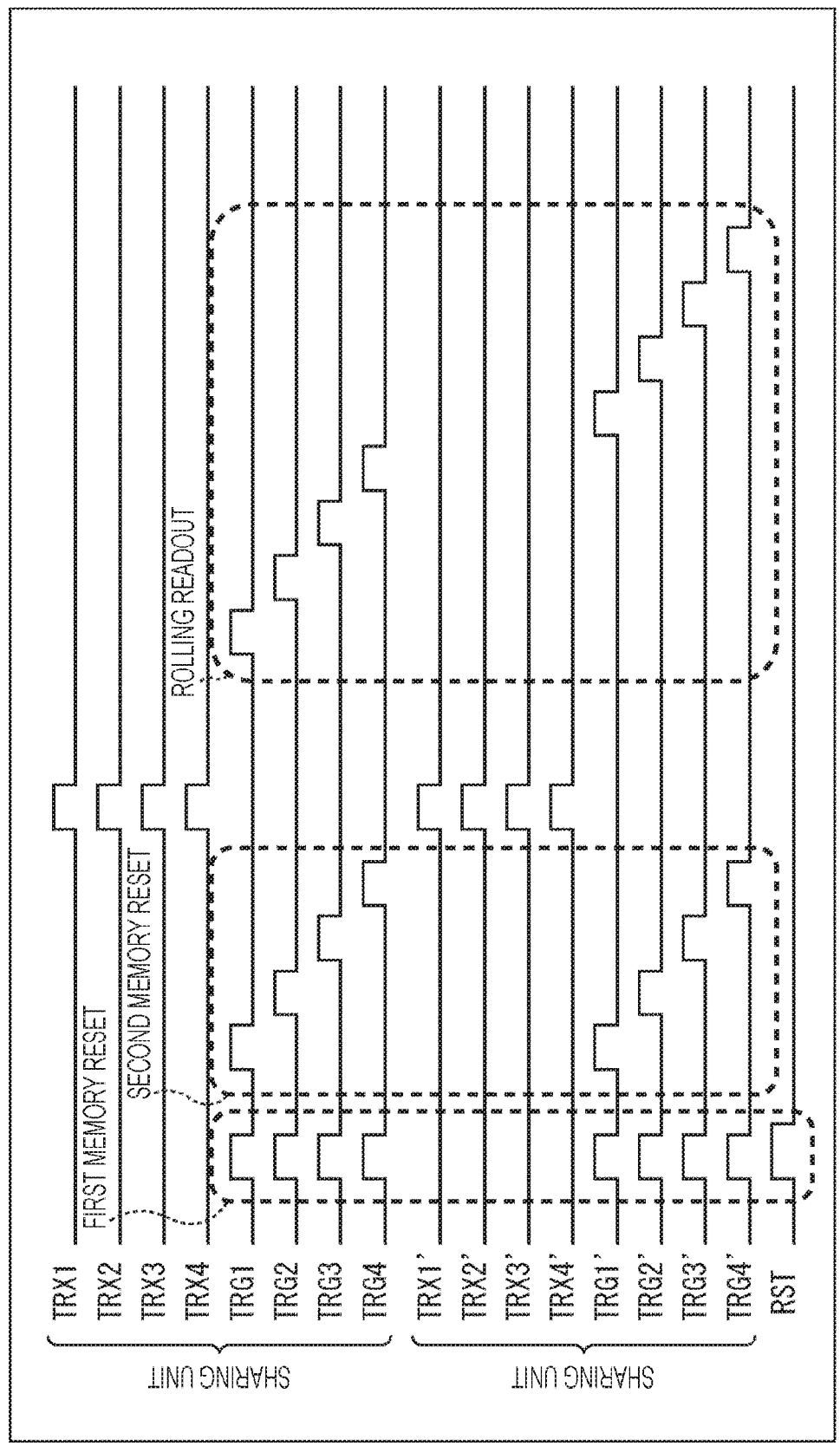
FIG. 28 is a diagram illustrating a first drive sequence by a sharing pixel unit in FIG. 27.

FIG. 28 illustrates a first drive sequence by the sharing pixel unit 200. In this first drive sequence, the memory resets are executed in two steps. The first memory reset is simultaneously performed by four pixels. The second memory reset is sequentially performed by the four pixels, which is the same as the rolling readout.

In other words, in the first drive sequence, as the first memory reset, the TRG1 to TRG4 are simultaneously turned on and off and the reset transistor 34 is turned on and off to connect the memory units 41 to the VDD via the corresponding transfer transistors 22 and the reset transistor 34 to reset the memory units 41. At this time, the FD 23 is also reset.

Next, as the second memory reset, the TRG1 to TRG4 are turned on and off in the order of the TRG1, TRG2, TRG3, and TRG4 to boost the FD 23 in the state where the reset transistor 34 is off to transfer the charges remaining in the memory units 41 to the FD 23. Next, the memory transfer transistors 42 (TRX1 to TRX4) are simultaneously turned on to transfer the charge of the PDs 31 to the corresponding memory units 41. Thereafter, the TRG1 to TRG4 are turned on and off in the order of the TRG1, TRG2, TRG3, and TRG4 to sequentially transfer the charges of the memory units $41_1$ to $41_4$ to the FD 23 (the rolling readout is performed).

FIG. 29 illustrates potentials in the first drive sequence illustrated in FIG. 28. In other words, A in FIG. 29 illustrates a potential at the time of second memory reset, and B in FIG. 29 illustrates a potential at the time of rolling readout.

As is clear from FIG. 29, the boost voltages ΔV of the FD 23 are matched between the second memory reset time and the rolling readout time in the sharing pixel unit 200. Therefore, since the difference in the transfer capability between the second memory reset time and the rolling readout time is eliminated, occurrence of darkening and the like can be suppressed.

Furthermore, since the difference in the transfer capability between the second memory reset time and the rolling readout time is eliminated, measures such as changing the shape of the potential using a separate power supply become unnecessary, for example. Moreover, for example, designing the potentials to eliminate the difference in the transfer capability between the second memory reset time and the rolling readout time, or the like, becomes unnecessary.

Figure 30:
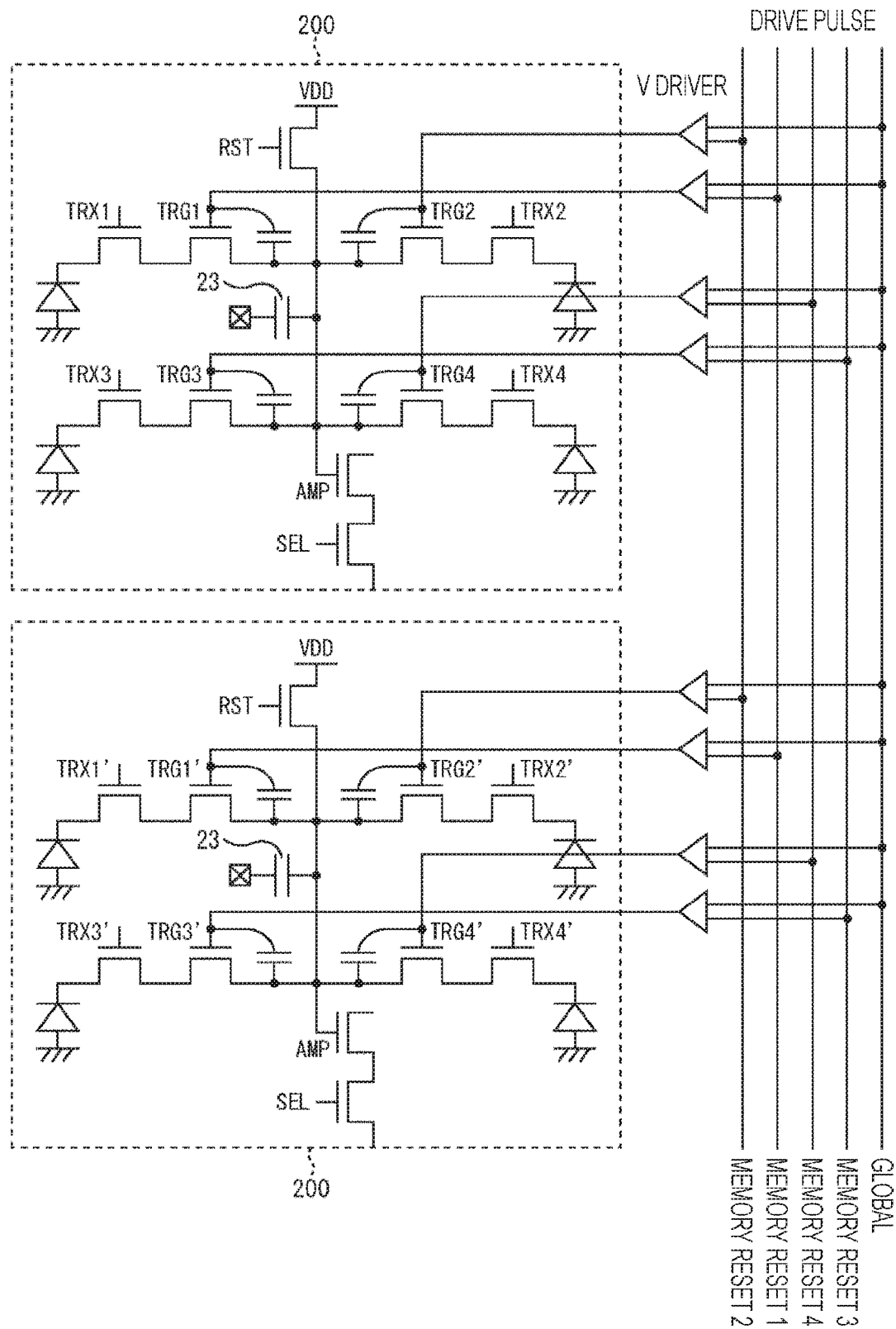
FIG. 30 is a diagram illustrating a configuration example of control wiring for executing the first drive sequence in FIG. 28.

Next, FIG. 30 illustrates drive pulses for driving the TRG1 to TRG4, of drive pulses for operating the sharing pixel unit 200 illustrated in FIG. 27 with the first drive sequence illustrated in FIG. 28, and a configuration example of control wiring for transmitting the drive pulses. Note that the control wiring is provided inside the pixel drive unit 112 illustrated in FIG. 15.

In the case of simultaneously driving the TRG1 to TRG4 in the configuration example of the control wiring illustrated in FIG. 30, the drive pulse is supplied from control wiring $112_G$ and is supplied to the TRG1 to TRG4 via the control wiring 101. In the case of driving the TRG1, the drive pulse is supplied from control wiring $112_1$ and is supplied to the TRG1 via the control wiring 101. In the case of driving the TRG2, the drive pulse is supplied from control wiring $112_2$ and is supplied to the TRG2 via the control wiring 101. Driving the TRG3 and TRG4 is similarly performed.

Figure 31:
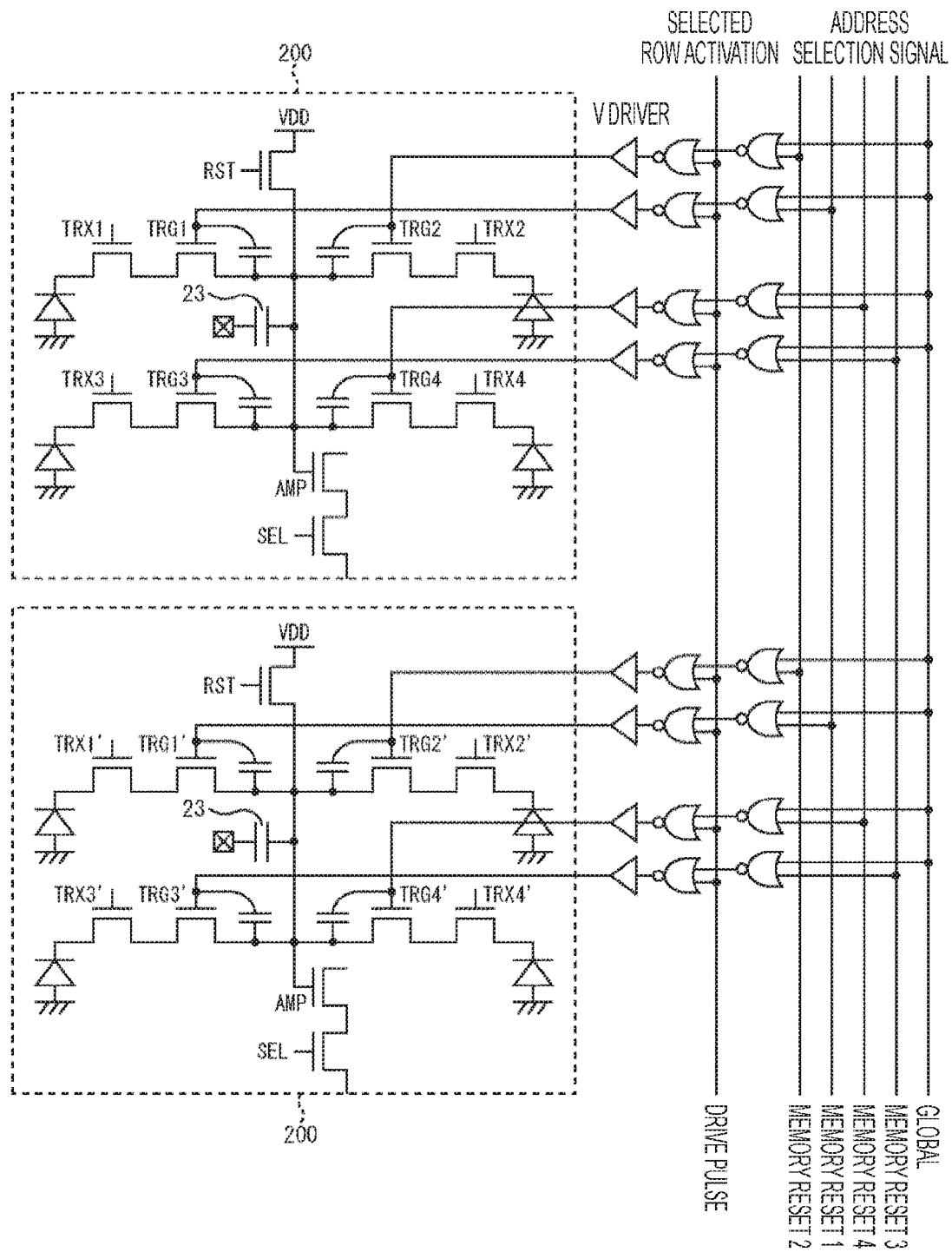
FIG. 31 is a diagram illustrating another configuration example of control wiring for executing the first drive sequence in FIG. 28.

Next, FIG. 31 illustrates drive pulses for driving the TRG1 to TRG4, of drive pulses for operating the sharing pixel unit 200 illustrated in FIG. 27 with the first drive sequence illustrated in FIG. 28, and another configuration example of control wiring for transmitting the drive pulses. Note that the control wiring is provided inside the pixel drive unit 112 illustrated in FIG. 15.

In the case of simultaneously driving the TRG1 to TRG4 in the configuration example of the control wiring illustrated in FIG. 31, an address selection signal for selecting all the TRG1 to TRG4 is supplied from the control wiring $112_G$, and the drive pulse is supplied via control wiring $112_0$. Thus, the drive pulses are supplied to the TRG1 to TRG4 via the control wiring 101. In the case of driving the TRG1, the address selection signal for selecting the TRG1 is supplied from the control wiring $112_1$ and the drive pulse is supplied via the control wiring $112_0$. Thus, the drive pulse is supplied to the TRG1 via the control wiring 101. In the case of driving the TRG2, the address selection signal for selecting the TRG2 is supplied from the control wiring $112_2$ and the drive pulse is supplied via the control wiring $112_0$. Thus, the drive pulse is supplied to the TRG2 via the control wiring 101. Driving the TRG3 and TRG4 is similarly performed.

Figure 32:
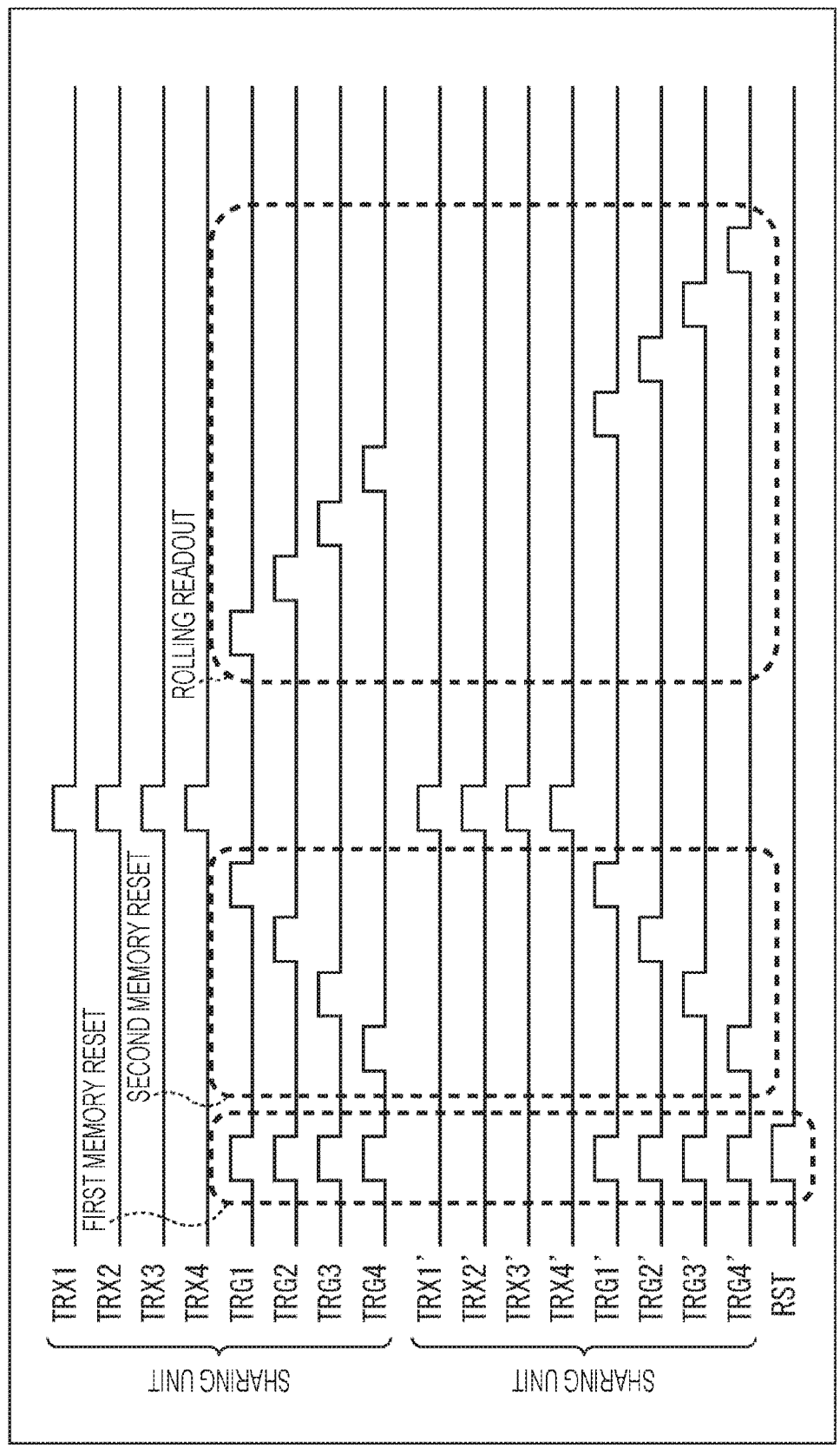
FIG. 32 is a diagram illustrating a second drive sequence by the sharing pixel unit in FIG. 27.

Next, FIG. 32 illustrates a second drive sequence by the sharing pixel unit 200. Even in this second drive sequence, the memory resets are executed in two steps. The first memory reset is simultaneously performed by four pixels. The second memory reset is sequentially performed by the four pixels, which is different from the rolling readout.

In other words, in the second drive sequence, as the first memory reset, the TRG1 to TRG4 are simultaneously turned on and off and the reset transistor 34 is turned on and off to connect the memory units 41 to the VDD via the corresponding transfer transistors 22 and the reset transistor 34 to reset the memory units 41. At this time, the FD 23 is also reset.

Next, as the second memory reset, the TRG1 to TRG4 are turned on and off in the order of the TRG4, TRG3, TRG2, and TRG1 to boost the FD 23 in the state where the reset transistor 34 is off to transfer the charges remaining in the memory units 41 to the FD 23. Next, the memory transfer transistors 42 (TRX1 to TRX4) are simultaneously turned on to transfer the charge of the PDs 31 to the corresponding memory units 41. Thereafter, the TRG1 to TRG4 are turned on and off in the order of the TRG1, TRG2, TRG3, and TRG4 to sequentially transfer the charges of the memory units $41_1$ to $41_4$ to the FD 23 (the rolling readout is performed).

Note that the order of turning on and off the TRG1 to TRG4 at the time of the second memory reset and the order of turning on and off the TRG1 to TRG4 at the time of the rolling readout are reverse to each other. The orders are not limited to the first or second drive sequence and can be arbitrarily set as long as a plurality of TRGs is turned on and off one by one instead of in the simultaneous manner.

Figure 33:
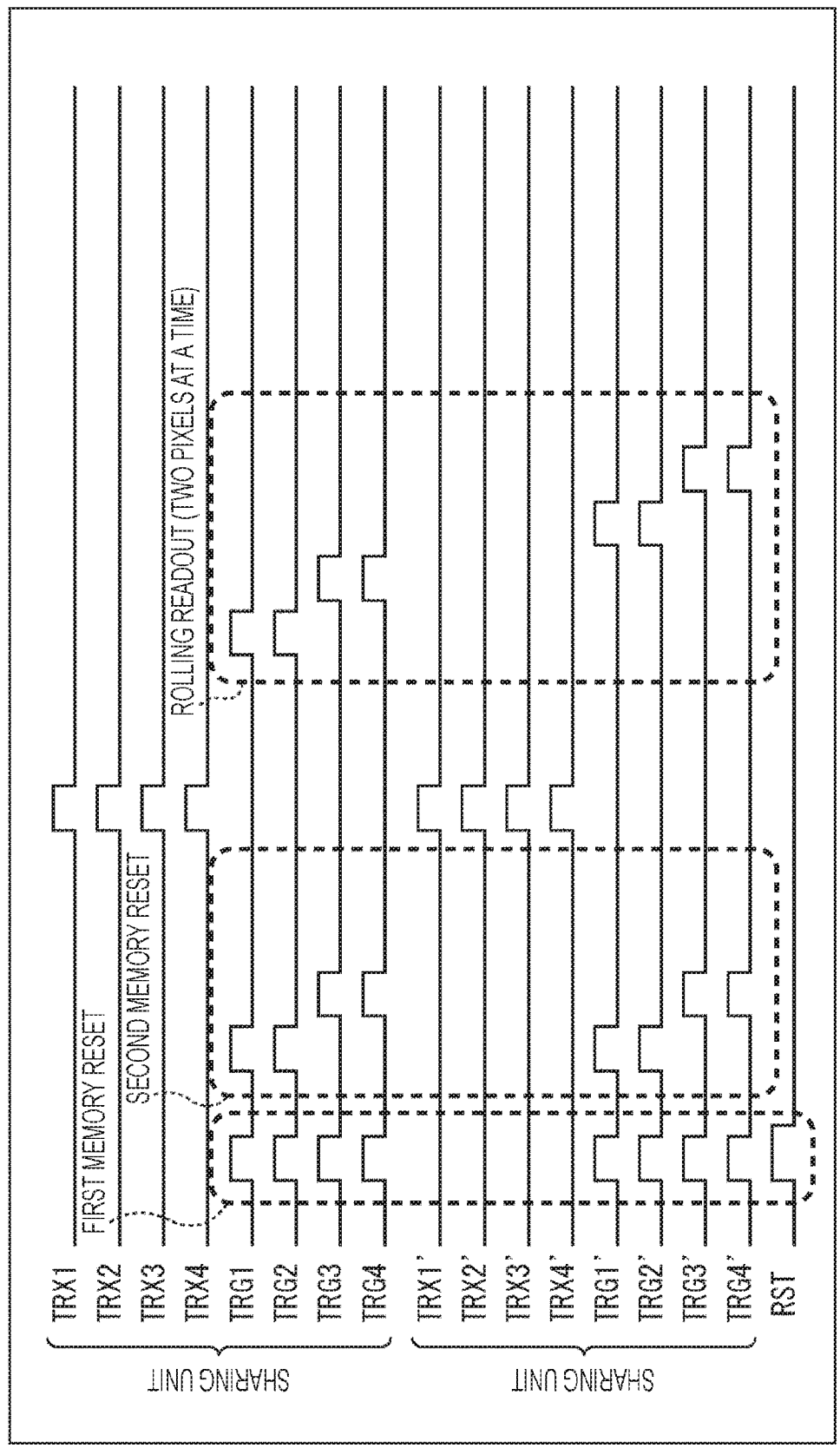
FIG. 33 is a diagram illustrating a third drive sequence by the sharing pixel unit in FIG. 27.

Next, FIG. 33 illustrates a third drive sequence by the sharing pixel unit 200. Even in this third drive sequence, the memory resets are executed in two steps. The first memory reset is simultaneously performed by four pixels. The second memory reset and the rolling readout are simultaneously performed by two pixels of the four pixels at a time.

In other words, in the third drive sequence, as the first memory reset, the TRG1 to TRG4 are simultaneously turned on and off and the reset transistor 34 is turned on and off to connect the memory units 41 to the VDD via the corresponding transfer transistors 22 and the reset transistor 34 to reset the memory units 41. At this time, the FD 23 is also reset.

Next, as the second memory reset, the TRG1 and TRG2 are simultaneously turned on and off to boost the FD 23 in the state where the reset transistor 34 is off to transfer the charges remaining in the memory units $41_1$ and $41_2$ to the FD 23. Next, the TRG3 and TRG4 are simultaneously turned on and off to boost the FD 23 to transfer the charges remaining in the memory units $41_3$ and $41_4$ to the FD 23.

Next, the memory transfer transistors 42 (TRX1 to TRX4) are simultaneously turned on to transfer the charge of the PDs 31 to the corresponding memory units 41. Thereafter, the TRG1 and TRG2 are simultaneously turned on and off to transfer the charges of the memory units $41_1$ and $41_2$ to the FD 23. Next, the TRG3 and TRG4 are simultaneously turned on and off to transfer the charges of the memory units $41_3$ and $41_4$ to the FD 23 (the rolling readout is performed for two pixels at a time).

Note that the combination and order are not limited to the above-described examples and can be arbitrarily set as long as the number of pixels that simultaneously transfer the charges at the time of the second memory reset and the number of pixels that simultaneously transfer the charges at the time of the rolling readout are matched.

Figure 34:
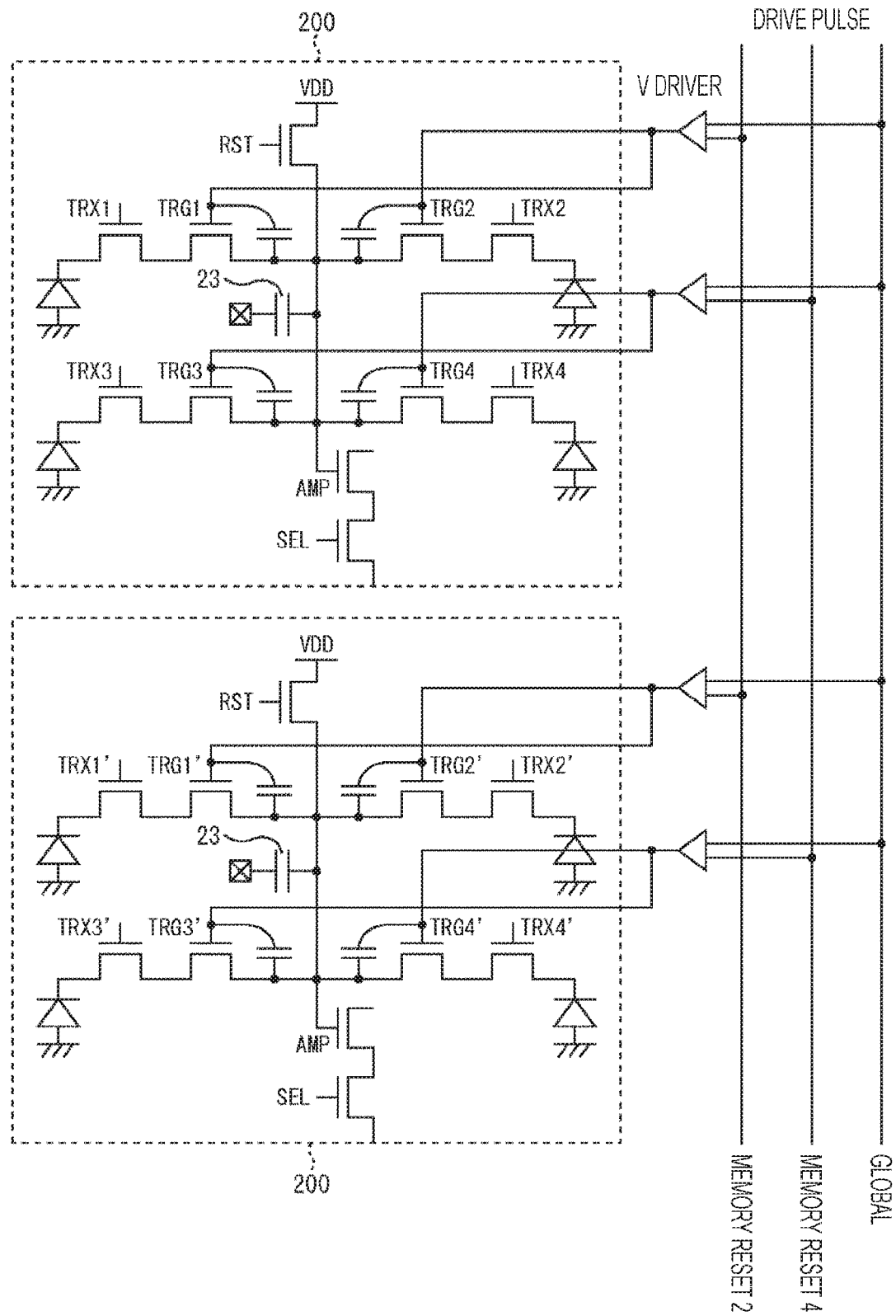
FIG. 34 is a diagram illustrating a configuration example of control wiring for executing the third drive sequence in FIG. 33.

Next, FIG. 34 illustrates drive pulses for driving the TRG1 to TRG4, of control wiring for operating the sharing pixel unit 200 illustrated in FIG. 27 with the third drive sequence, and a configuration example of control wiring for transmitting the drive pulses. Note that the control wiring is provided inside the pixel drive unit 112 illustrated in FIG. 15.

In the case of simultaneously driving the TRG1 to TRG4 in the configuration example of the control wiring illustrated in FIG. 34, the drive pulse is supplied from control wiring $112_G$ and is supplied to the TRG1 to TRG4 via the control wiring 101. In the case of simultaneously driving the TRG1 and TRG2, the drive pulse is supplied from control wiring $112_2$ and is supplied to the TRG1 and TRG2 via the control wiring 101.

Furthermore, in the case of simultaneously driving the TRG3 and TRG4, the drive pulse is supplied from control wiring $112_4$ and is supplied to the TRG3 and TRG4 via the control wiring 101.

Note that although the third drive sequence is executable even with the configuration example of the control wiring illustrated in FIG. 30 or 31, the number of control wirings can be reduced in the configuration example of the control wiring illustrated in FIG. 34, as compared with the configuration example of the control wiring illustrated in FIG. 30 or 31.

<Use Examples of Solid-State Imaging Device According to Embodiment of Present Technology>

Figure 35:
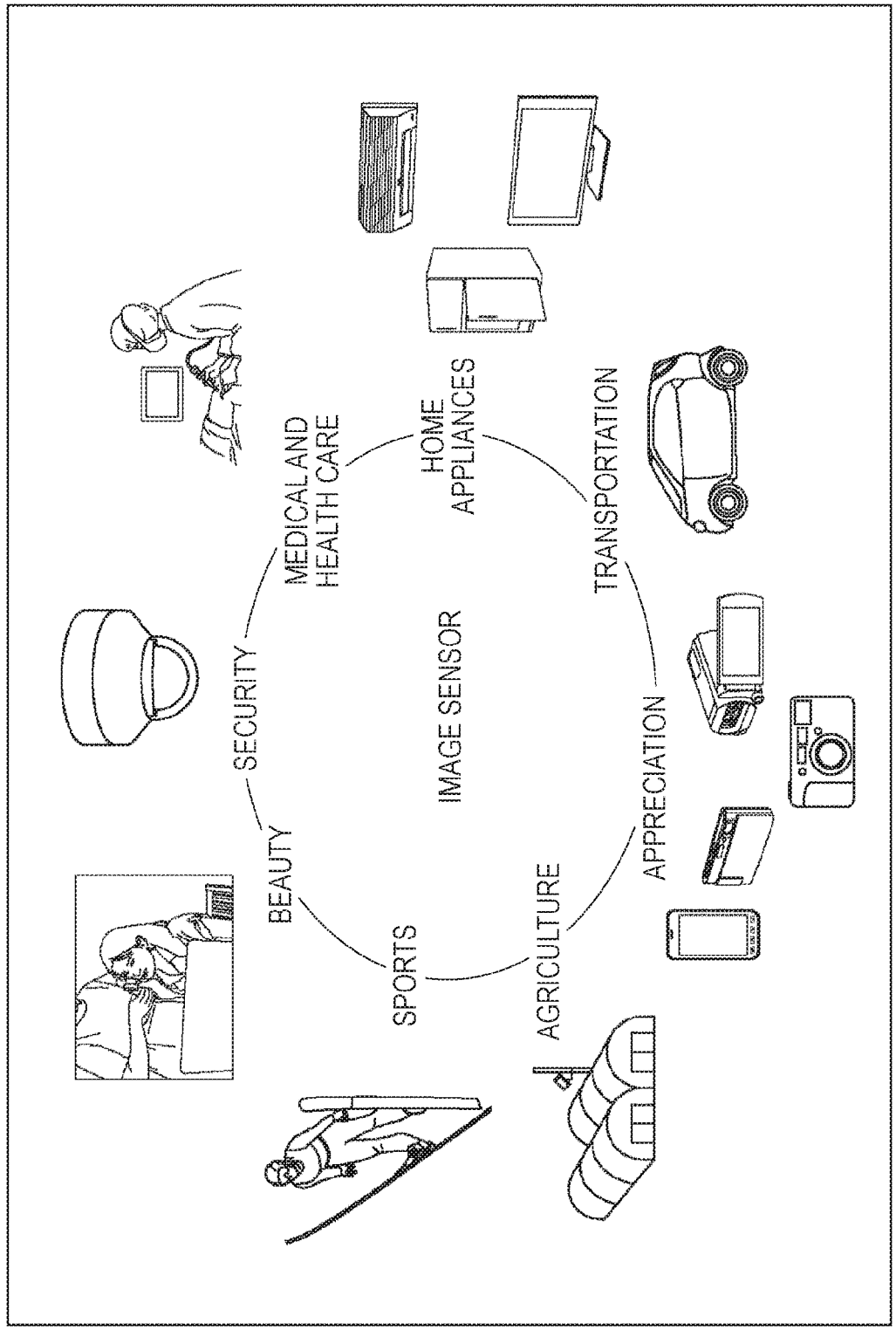
FIG. 35 is a diagram illustrating use examples of electronic devices to which the present technology is applied.

Next, FIG. 35 is a diagram illustrating use examples using the above-described solid-state imaging device.

The above-described solid-state imaging device can be used in various cases for sensing light such as visible light, infrared light, ultraviolet light, and X-ray, as described below, for example.

Devices that capture images provided for appreciation, such as digital cameras, and portable devices with a camera function Devices provided for transportation, such as in-vehicle sensors that capture the front, rear, peripheries, an interior of the vehicle, etc. for safe driving such as automatic stop, recognition of a state of a driver, or the like, monitoring cameras that monitor traveling vehicles and roads, distance measuring sensors that measure a distance between vehicles, and the like Devices provided for home appliances such as TVs, refrigerators, air conditioners, etc. to capture gestures of users and perform device operations according to the gestures Devices provided for medical and healthcare, such as endoscopes, devices that perform angiography by receiving infrared light, and the like Devices provided for security, such as monitoring cameras for crime prevention and cameras for person authentication use Devices for beauty, such as skin measuring instruments that captures skin and microscopes that captures scalp Devices provided for sports or the like, such as action cameras and wearable cameras for sport use Devices provided for agriculture, such as cameras for monitoring the condition of fields and crops <Application Example to In-Vivo Information Acquisition System>

The technology according to the present disclosure (present technology) can be applied to various products. For example, the technology according to the present disclosure may be applied to an endoscope surgery system.

Figure 36:
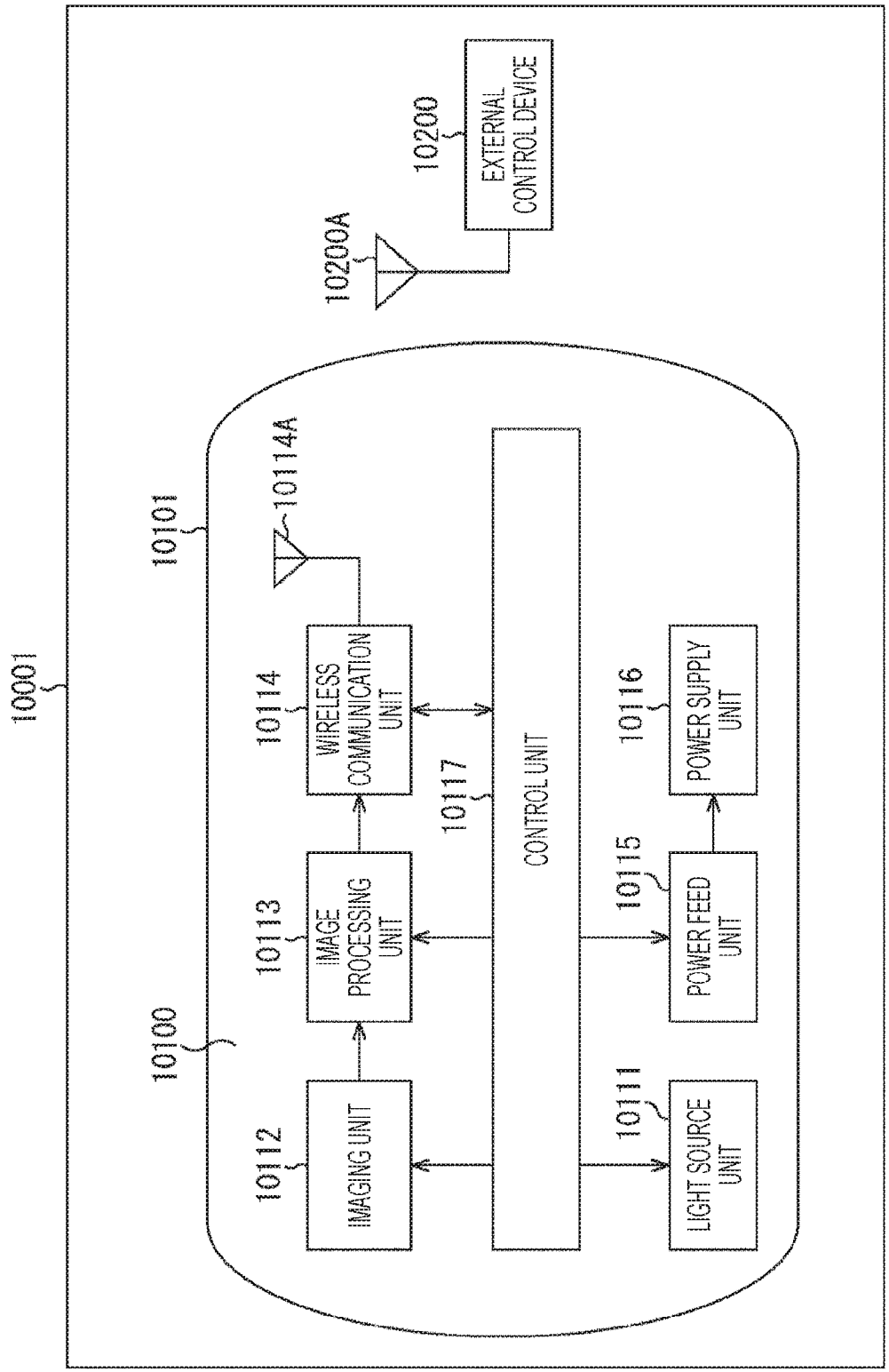
FIG. 36 is a block diagram illustrating an example of a schematic configuration of an in-vivo information acquisition system.

FIG. 36 is a block diagram illustrating an example of a schematic configuration of an in-vivo information acquisition system for patients using a capsule endoscope, to which the technology (present technology) according to the present disclosure is applicable.

An in-vivo information acquisition system 10001 includes a capsule endoscope 10100 and an external control device 10200.

The capsule endoscope 10100 is swallowed by a patient at the time of examination. The capsule endoscope 10100 has an imaging function and a wireless communication function, and sequentially captures images of inside of organs (hereinafter also referred to as in-vivo images) at predetermined intervals while moving inside the organs such as stomach and intestine by peristaltic movement or the like until the patient naturally discharges the capsule endoscope 10100, and sequentially wirelessly transmits information of the in-vivo images to the external control device 10200 outside the body.

The external control device 10200 comprehensively controls the operation of the in-vivo information acquisition system 10001. Furthermore, the external control device 10200 receives information regarding the in-vivo image transmitted from the capsule endoscope 10100, and transmits image data for displaying the in-vivo image to the display device (not illustrated) on the basis of the information regarding the received in-vivo image.

As described above, the in-vivo information acquisition system 10001 can acquire the in-vivo images obtained by imaging the inside of the patient's body from time to time during a period from when the capsule endoscope 10100 is swallowed to when the capsule endoscope 10100 is discharged.

The configurations and functions of the capsule endoscope 10100 and the external control device 10200 will be described in more detail.

The capsule endoscope 10100 has a capsule-shaped housing 10101, and a light source unit 10111, an imaging unit 10112, an image processing unit 10113, a wireless communication unit 10114, a power feed unit 10115, a power supply unit 10116, and a control unit 10117 are housed inside the housing 10101.

The light source unit 10111 includes, for example, a light source such as a light emitting diode (LED), and irradiates an imaging field of the imaging unit 10112 with light.

The imaging unit 10112 includes an optical system including an imaging element and a plurality of lenses provided in front of the imaging element. Reflected light (hereinafter referred to as observation light) of the light radiated on a body tissue that is an observation target is collected by the optical system and enters the imaging element. The imaging unit 10112 photoelectrically converts the observation light having entered the imaging element to generate an image signal corresponding to the observation light. The image signal generated by the imaging unit 10112 is provided to the image processing unit 10113.

The image processing unit 10113 includes processors such as a central processing unit (CPU) and a graphics processing unit (GPU), and performs various types of signal processing for the image signal generated by the imaging unit 10112. The image processing unit 10113 provides the image signal to which the signal processing has been applied to the wireless communication unit 10114 as raw data.

The wireless communication unit 10114 performs predetermined processing such as modulation processing for the image signal to which the signal processing has been applied by the image processing unit 10113 and transmits the image signal to the external control device 10200 via an antenna 10114A. Furthermore, the wireless communication unit 10114 receives a control signal related to drive control of the capsule endoscope 10100 from the external control device 10200 via the antenna 10114A. The wireless communication unit 10114 provides the control signal received from the external control device 10200 to the control unit 10117.

The power feed unit 10115 includes an antenna coil for power reception, a power regeneration circuit for regenerating power from a current generated in the antenna coil, a booster circuit, and the like. The power feed unit 10115 generates power using a principle of so-called non-contact charging.

The power supply unit 10116 includes a secondary battery, and stores the power generated by the power feed unit 10115. In FIG. 36, illustration of arrows or the like indicating a supply destination of the power from the power supply unit 10116 is omitted to avoid complication of the drawing. However, the power stored in the power supply unit 10116 is supplied to the light source unit 10111, the imaging unit 10112, the image processing unit 10113, the wireless communication unit 10114, and the control unit 10117, and can be used to drive these units.

The control unit 10117 includes a processor such as a CPU and appropriately controls drive of the light source unit 10111, the imaging unit 10112, the image processing unit 10113, the wireless communication unit 10114, and the power feed unit 10115 with control signals transmitted from the external control device 10200.

The external control device 10200 includes a processor such as a CPU and a GPU, a microcomputer in which a processor and a memory element such as a memory are mixed, a control board, or the like. The external control device 10200 controls the operation of the capsule endoscope 10100 by transmitting a control signal to the control unit 10117 of the capsule endoscope 10100 via an antenna 10200A. In the capsule endoscope 10100, for example, an irradiation condition of light with respect to the observation target in the light source unit 10111 can be changed according to the control signal from the external control device 10200. Furthermore, imaging conditions (for example, a frame rate in the imaging unit 10112, an exposure value, and the like) can be changed according to the control signal from the external control device 10200. Furthermore, the content of the processing in the image processing unit 10113, and conditions for transmitting an image signal by the wireless communication unit 10114 (for example, a transmission interval, the number of transmitted images, and the like) may be changed according to the control signal from the external control device 10200.

Furthermore, the external control device 10200 applies various types of image processing to the image signal transmitted from the capsule endoscope 10100 to generate image data for displaying the captured in-vivo image on the display device. As the image processing, various types of signal processing can be performed, such as development processing (demosaicing processing), high image quality processing (band enhancement processing, super resolution processing, noise reduction (NR) processing, and/or camera shake correction processing, for example), and/or enlargement processing (electronic zoom processing), for example. The external control device 10200 controls drive of the display device and displays in-vivo images captured on the basis of the generated image data. Alternatively, the external control device 10200 may cause a recording device (not illustrated) to record the generated image data or cause a printing device (not illustrated) to print out the generated image data.

An example of an in-vivo information acquisition system to which the technology according to the present disclosure is applicable has been described. The technology according to the present disclosure is applicable to the imaging unit 10112 of the above-described configurations.

<Application Example to Endoscope Surgery System>

The technology according to the present disclosure (present technology) can be applied to various products. For example, the technology according to the present disclosure may be applied to an endoscope surgery system.

Figure 37:
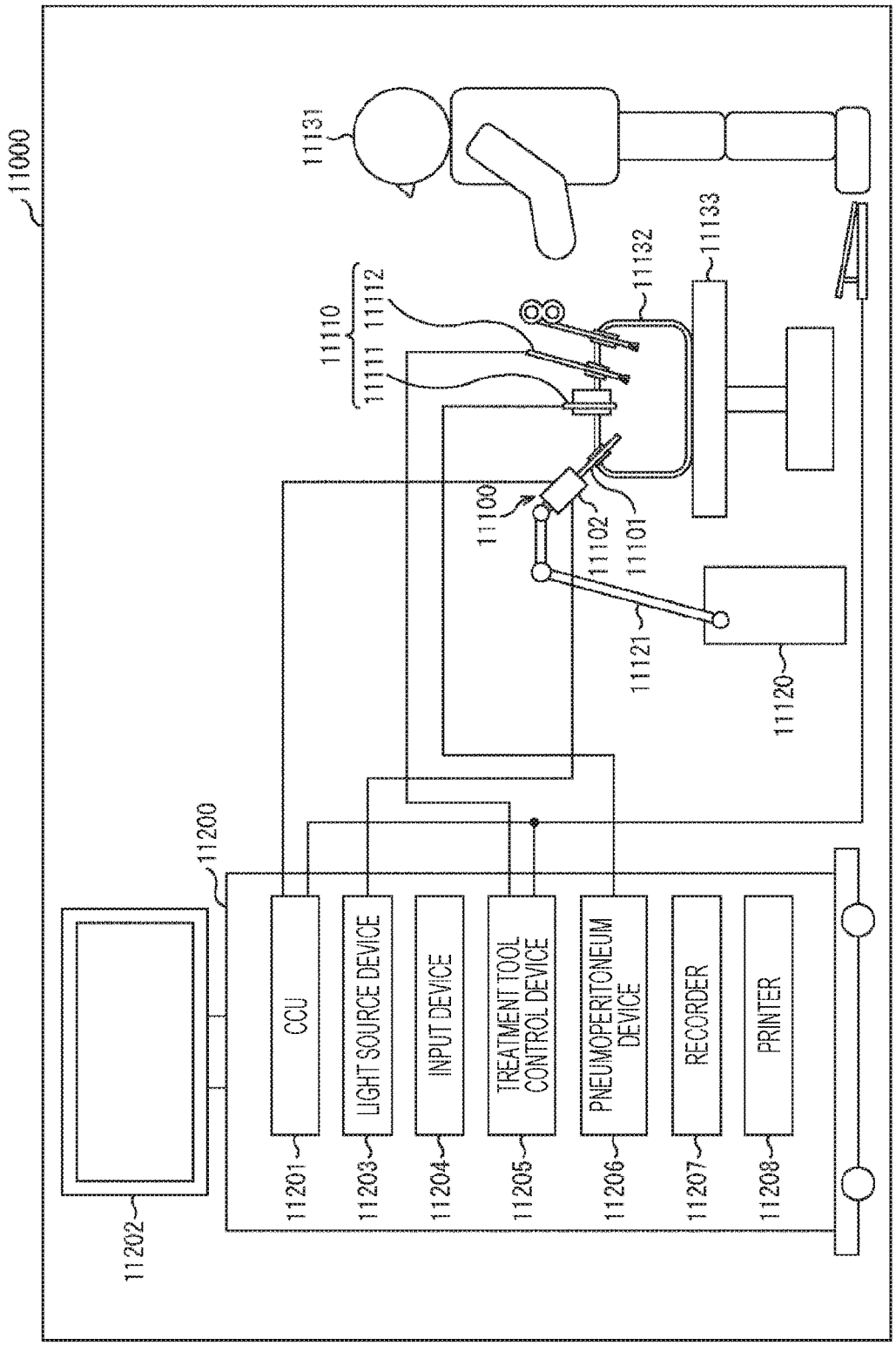
FIG. 37 is a diagram illustrating an example of a schematic configuration of an endoscope surgery system.

FIG. 37 is a diagram illustrating an example of a schematic configuration of an endoscope surgery system to which the technology according to the present disclosure (present technology) is applicable.

FIG. 37 illustrates a state in which an operator (surgeon) 11131 is performing an operation on a patient 11132 on a patient bed 11133, using the endoscope surgery system 11000. As illustrated in FIG. 37, the endoscope surgery system 11000 includes an endoscope 11100, other surgical instruments 11110 such as a pneumoperitoneum tube 11111 and an energy treatment tool 11112, a support arm device 11120 that supports the endoscope 11100, and a cart 11200 on which various devices for endoscope surgery are mounted.

The endoscope 11100 includes a lens-barrel 11101 and a camera head 11102. A region having a predetermined length from a distal end of the lens-barrel 11101 is inserted into a body cavity of the patient 11132. The camera head 11102 is connected to a proximal end of the lens-barrel 11101. FIG. 37 illustrates the endoscope 11100 configured as so-called a hard endoscope including the hard lens-barrel 11101. However, the endoscope 11100 may be configured as so-called a soft endoscope including a soft lens-barrel.

An opening portion in which an object lens is fit is provided in the distal end of the lens-barrel 11101. A light source device 11203 is connected to the endoscope 11100, and light generated by the light source device 11203 is guided to the distal end of the lens-barrel 11101 by a light guide extending inside the lens-barrel 11101 and an observation target in the body cavity of the patient 11132 is irradiated with the light through the object lens. Note that the endoscope 11100 may be a forward-viewing endoscope, may be an oblique-viewing endoscope, or may be a side-viewing endoscope.

An optical system and an imaging element are provided inside the camera head 11102, and reflected light (observation light) from the observation target is condensed to the imaging element by the optical system. The observation light is photoelectrically converted by the imaging element, and an electrical signal corresponding to the observation light, that is, an image signal corresponding to an observed image is generated. The image signal is transmitted to a camera control unit (CCU) 11201 as raw data.

The CCU 11201 includes a central processing unit (CPU), a graphics processing unit (GPU), and the like, and generally controls an operation of the endoscope 11100 and a display device 11202. Moreover, the CCU 11201 receives the image signal from the camera head 11102, and applies various types of image processing for displaying an image based on the image signal, such as developing processing (demosaicing processing) or the like, to the image signal.

The display device 11202 displays the image based on the image signal to which the image processing has been applied by the CCU 11201, by control of the CCU 11201.

The light source device 11203 includes a light source such as a light emitting diode (LED) for example, and supplies irradiation light to the endoscope 11100 in capturing an operation portion or the like.

An input device 11204 is an input interface for the endoscope surgery system 11000. A user can input various types of information and instructions to the endoscope surgery system 11000 through the input device 11204. For example, the user inputs an instruction to change imaging conditions (a type of irradiation light, a magnification, a focal length, and the like) by the endoscope 11100, and the like.

A treatment tool control device 11205 controls drive of the energy treatment tool 11112, for cauterizing or incising a tissue, sealing a blood vessel, and the like. A pneumoperitoneum device 11206 sends a gas into the body cavity of the patient 11132 through the pneumoperitoneum tube 11111 to expand the body cavity for the purpose of securing a field of vision by the endoscope 11100 and a work space for the operator. A recorder 11207 is a device that can record various types of information regarding the surgery. A printer 11208 is a device that can print the various types of information regarding the surgery in various formats such as a test, an image, and a graph.

Note that the light source device 11203 that supplies the irradiation light in capturing the operation portion to the endoscope 11100 can be configured from a white light source configured from an LED, a laser light source, or a combination of the LED and the laser light source, for example. In a case where the white light source is configured from a combination of RGB laser light sources, output intensity and output timing of the respective colors (wavelengths) can be controlled with high accuracy. Therefore, adjustment of white balance of the captured image can be performed in the light source device 11203. Furthermore, in this case, the observation target is irradiated with the laser light from each of the RGB laser light sources in a time division manner, and the drive of the imaging element of the camera head 11102 is controlled in synchronization with the irradiation timing, so that images respectively corresponding to RGB can be captured in a time division manner. According to the method, a color image can be obtained without providing a color filter to the imaging element.

Furthermore, drive of the light source device 11203 may be controlled to change intensity of light to be output every predetermined time. The drive of the imaging element of the camera head 11102 is controlled in synchronization with change timing of the intensity of light and images are acquired in a time division manner, and the images are synthesized, so that a high-dynamic range image without clipped blacks and flared highlights can be generated.

Furthermore, the light source device 11203 may be configured to be able to supply light in a predetermined wavelength band corresponding to special light observation. In the special light observation, for example, so-called narrow band imaging is performed by radiating light in a narrower band than the irradiation light (in other words, white light) at the time of normal observation, using wavelength dependence of absorption of light in a body tissue, to capture a predetermined tissue such as a blood vessel in a mucosal surface layer at high contrast. Alternatively, in the special light observation, fluorescence imaging may be performed to obtain an image by fluorescence generated by radiation of exciting light. In the fluorescence imaging, irradiating the body tissue with exciting light to obtain fluorescence from the body tissue (self-fluorescence observation), or injecting a reagent such as indocyanine green (ICG) into the body tissue and irradiating the body tissue with exciting light corresponding to a fluorescence wavelength of the reagent to obtain a fluorescence image, for example, can be performed. The light source device 11203 can be configured to be able to supply narrow-band light and/or exciting light corresponding to such special light observation.

Figure 38:
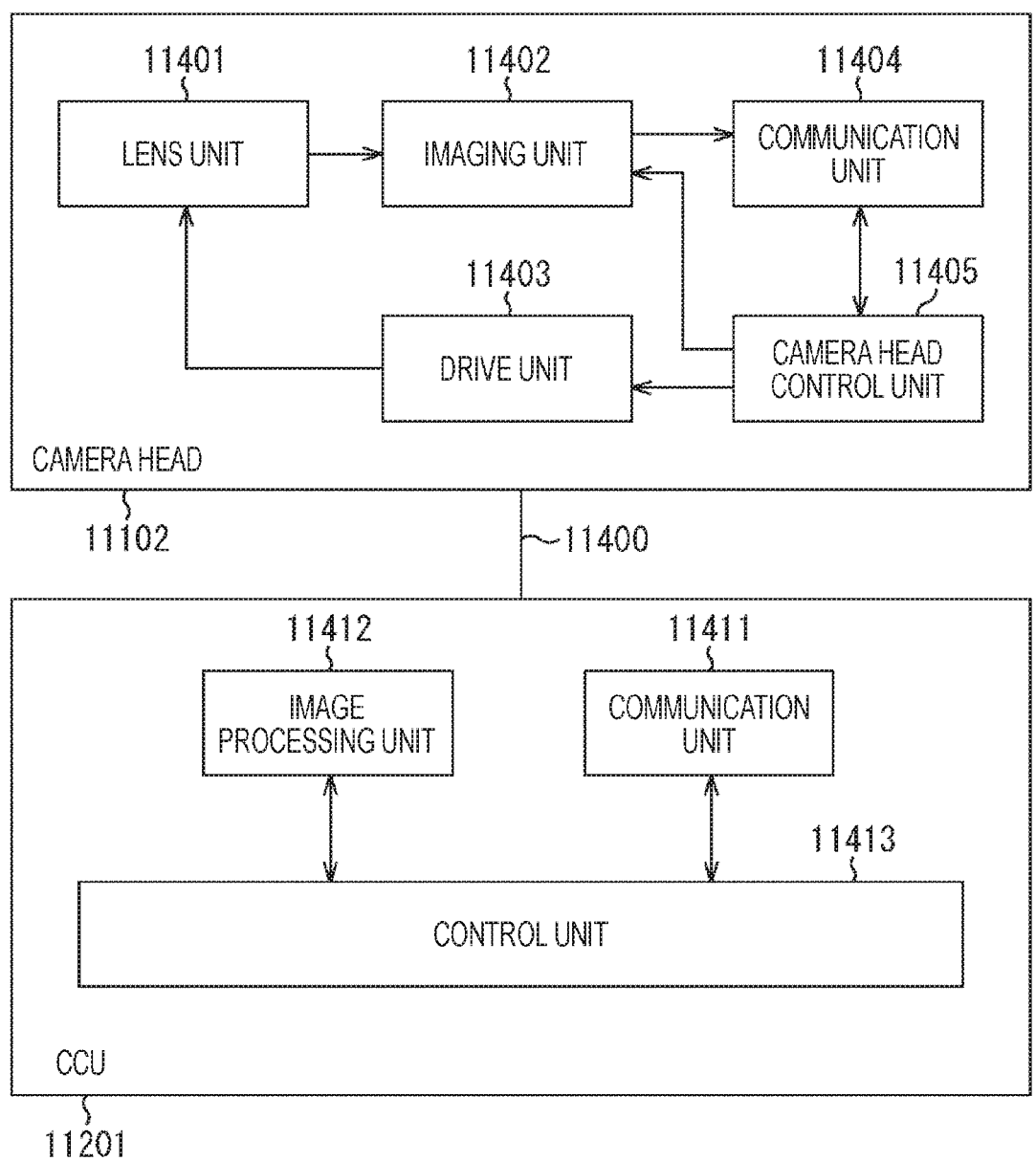
FIG. 38 is a block diagram illustrating an example of functional configurations of a camera head and a CCU.

FIG. 38 is a block diagram illustrating an example of functional configurations of the camera head 11102 and the CCU 11201 illustrated in FIG. 37.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicatively connected with each other by a transmission cable 11400.

The lens unit 11401 is an optical system provided in a connection portion between the camera head 11102 and the lens-barrel 11101. Observation light taken through the distal end of the lens-barrel 11101 is guided to the camera head 11102 and enters the lens unit 11401. The lens unit 11401 is configured by a combination of a plurality of lenses including a zoom lens and a focus lens.

The imaging unit 11402 is configured by an imaging element. The imaging element that configures the imaging unit 11402 may be one imaging element (so-called single imaging element) or may be a plurality of imaging elements (so-called multiple imaging elements). In a case where the imaging unit 11402 is configured by multiple imaging elements, for example, a color image may be obtained by generating image signals respectively corresponding to RGB by the imaging elements and synthesizing the image signals. Alternatively, the imaging unit 11402 may be configured by a pair of imaging elements for respectively obtaining image signals for right eye and for left eye corresponding to three-dimensional (3D) display. With the 3D display, the operator 11131 can more accurately grasp the depth of a biological tissue in the operation portion. Note that, in a case where the imaging unit 11402 is configured by the multiple imaging elements, a plurality of systems of the lens units 11401 may be provided corresponding to the imaging elements.

Furthermore, the imaging unit 11402 may not be necessarily provided in the camera head 11102. For example, the imaging unit 11402 may be provided immediately after the object lens inside the lens-barrel 11101.

The drive unit 11403 is configured by an actuator, and moves the zoom lens and the focus lens of the lens unit 11401 by a predetermined distance along an optical axis by control of the camera head control unit 11405. With the movement, a magnification and a focal point of a captured image by the imaging unit 11402 can be appropriately adjusted.

The communication unit 11404 is configured by a communication device for transmitting or receiving various types of information to or from the CCU 11201. The communication unit 11404 transmits the image signal obtained from the imaging unit 11402 to the CCU 11201 through the transmission cable 11400 as raw data.

Furthermore, the communication unit 11404 receives a control signal for controlling drive of the camera head 11102 from the CCU 11201 and supplies the control signal to the camera head control unit 11405. The control signal includes information regarding the imaging conditions such as information for specifying a frame rate of the captured image, information for specifying an exposure value at the time of imaging, and/or information for specifying the magnification and the focal point of the captured image, for example.

Note that the imaging conditions such as the frame rate, the exposure value, the magnification, and the focal point may be appropriately specified by the user or may be automatically set by the control unit 11413 of the CCU 11201 on the basis of the acquired image signal. In the latter case, so-called an auto exposure (AE) function, an auto focus (AF) function, and an auto white balance (AWB) function are incorporated in the endoscope 11100.

The camera head control unit 11405 controls drive of the camera head 11102 on the basis of the control signal received through the communication unit 11404 from the CCU 11201.

The communication unit 11411 is configured from a communication device for transmitting or receiving various types of information to or from the camera head 11102. The communication unit 11411 receives the image signal transmitted from the camera head 11102 through the transmission cable 11400.

Furthermore, the communication unit 11411 transmits a control signal for controlling drive of the camera head 11102 to the camera head 11102. The image signal and the control signal can be transmitted through telecommunication, optical communication, or the like.

The image processing unit 11412 applies various types of image processing to the image signal as a raw data transmitted from the camera head 11102.

The control unit 11413 performs various types of control regarding imaging of the operation portion and the like by the endoscope 11100 and display of the captured image obtained through imaging of the operation portion and the like. For example, the control unit 11413 generates a control signal for controlling drive of the camera head 11102.

Furthermore, the control unit 11413 displays the captured image of the operation portion or the like in the display device 11202 on the basis of the image signal to which the image processing has been applied by the image processing unit 11412. At this time, the control unit 11413 may recognize various objects in the captured image, using various image recognition technologies. For example, the control unit 11413 can recognize a surgical instrument such as forceps, a specific living body portion, blood, mist at the time of use of the energy treatment tool 11112, or the like, by detecting a shape of an edge, a color, or the like of an object included in the captured image. The control unit 11413 may superimpose and display various types of surgery support information on the image of the operation portion, in displaying the captured image in the display device 11202. The superimposition and display, and presentation of the surgery support information to the operator 11131 can reduce a burden on the operator 11131 and enables the operator 11131 to reliably proceed with the operation.

The transmission cable 11400 that connects the camera head 11102 and the CCU 11201 is an electrical signal cable corresponding to communication of electrical signals, an optical fiber corresponding to optical communication, or a composite cable thereof.

Here, in the illustrated example, the communication has been performed in a wired manner using the transmission cable 11400. However, the communication between the camera head 11102 and the CCU 11201 may be wirelessly performed.

An example of an endoscope surgery system to which the technology according to the present disclosure is applicable has been described. The technology according to the present disclosure is applicable to the imaging unit 10402 of the above-described configurations.

<Application Example to Moving Bodies>

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 39:
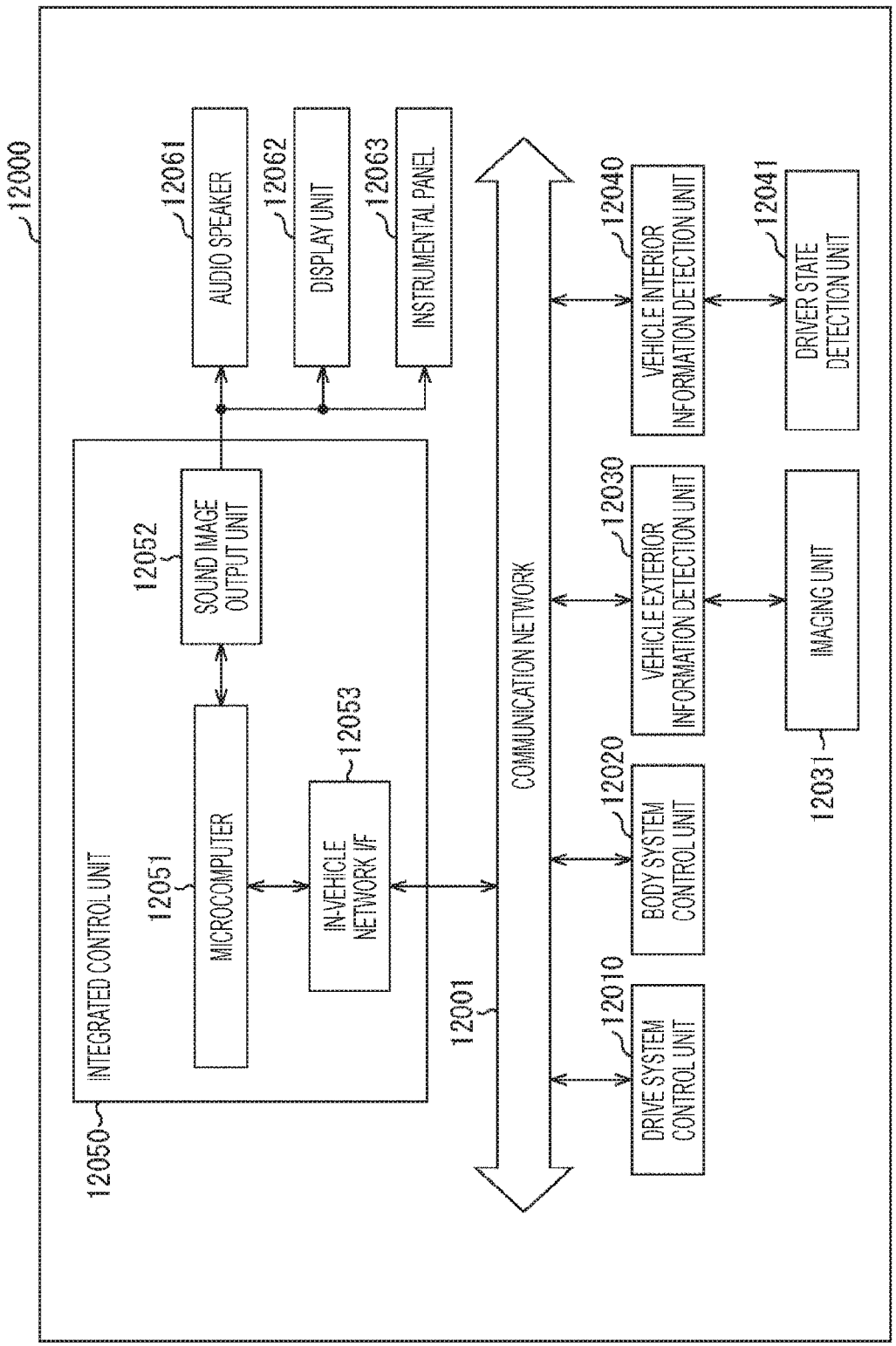
FIG. 39 is a block diagram illustrating an example of a schematic configuration of a vehicle control system.

FIG. 39 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 39, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to image an image outside the vehicle, and receives the imaged image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to the amount of received light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive power generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 39, as the output device, an audio speaker 12061, a display unit 12062, and an instrument panel 12063 are exemplarily illustrated. The display unit 12062 may include, for example, at least one of an on-board display or a head-up display.

Figure 40:
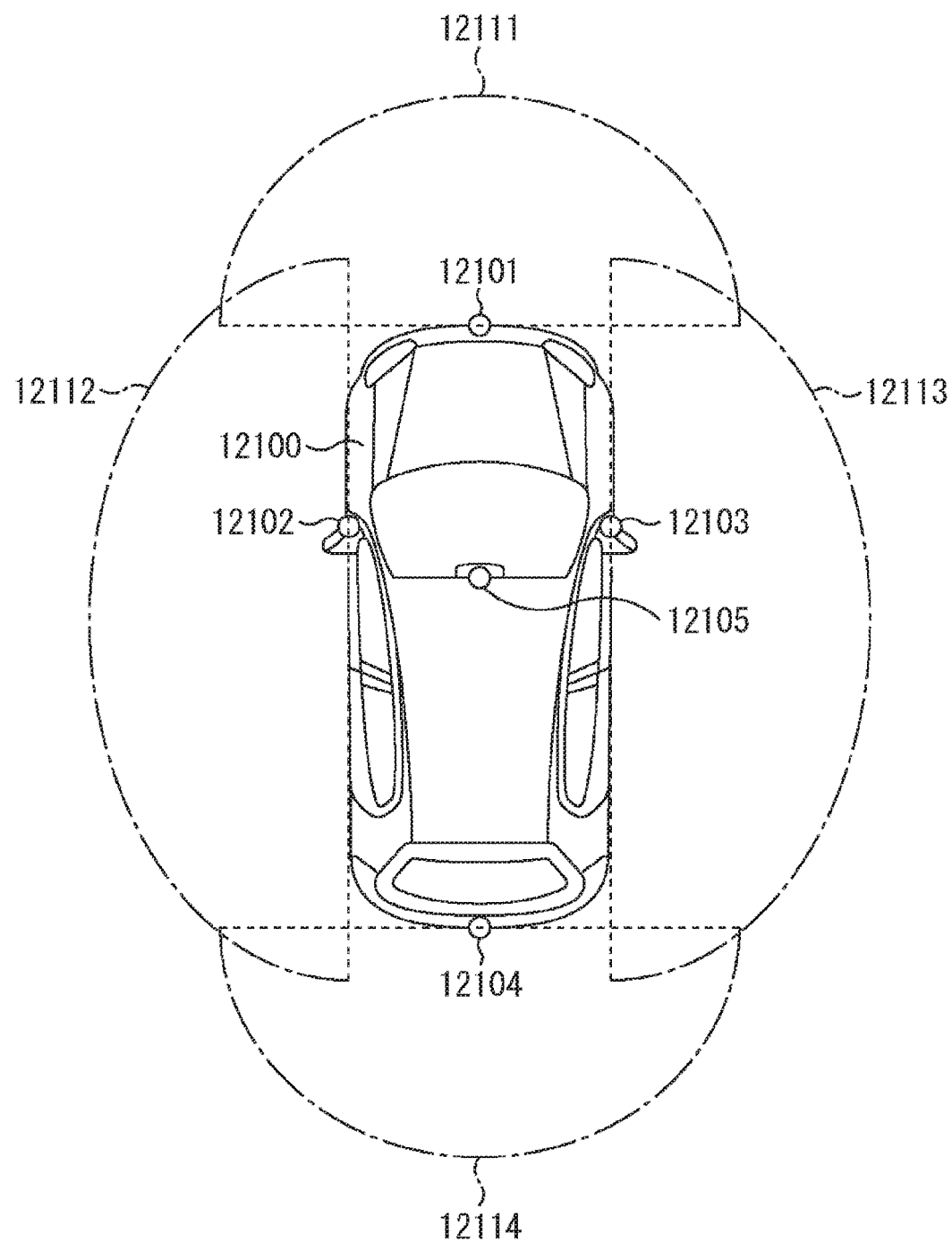
FIG. 40 is an explanatory diagram illustrating an example of installation positions of a vehicle exterior information detection unit and an imaging unit.

FIG. 40 is a diagram illustrating an example of an installation position of the imaging unit 12031.

In FIG. 40, a vehicle 12100 includes, as the imaging unit 12031, imaging units 12101, 12102, 12103, 12104, and 12105.

The imaging units 12101, 12102, 12103, 12104, and 12105 are provided at positions such as a front nose, side mirrors, a rear bumper or a back door, and an upper portion of a windshield in an interior of the vehicle 12100, for example. The imaging unit 12101 provided at the front nose and the imaging unit 12105 provided at an upper portion of the windshield in an interior of the vehicle mainly acquire front images of the vehicle 12100. The imaging units 12102 and 12103 provided at the side mirrors mainly acquire side images of the vehicle 12100. The imaging unit 12104 provided at the rear bumper or the back door mainly acquires a rear image of the vehicle 12100. The front images acquired in the imaging units 12101 and 12105 are mainly used for detection of a leading vehicle, a pedestrian, an obstacle, a traffic light, a traffic sign, a lane, or the like.

Note that FIG. 40 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an imaging element having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic drive of autonomous travel without depending on an operation of the driver or the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. Then, the microcomputer 12051 determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the imaged images of the imaging units 12101 to 12104, thereby to recognize the pedestrian. The recognition of a pedestrian is performed by a process of extracting characteristic points in the imaged images of the imaging units 12101 to 12104, as the infrared camera, for example, and by a process of performing pattern matching processing for the series of characteristic points indicating a contour of an object and discriminating whether or not the object is a pedestrian. When the microcomputer 12051 determines that a pedestrian exists in the imaged images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations.

Note that embodiments of the present technology are not limited to the above-described embodiments, and various modifications can be made without departing from the gist of the present technology.

The present technology can also have the following configurations.

(1)

A solid-state imaging device including:

a charge storage unit configured to store a charge generated by photoelectric conversion;

a charge-voltage conversion unit configured to convert the charge transferred from the charge storage unit into a voltage signal;

a transfer unit configured to transfer the charge stored in the charge storage unit to the charge-voltage conversion unit; and a switching unit configured to increase or decrease a capacitance of the charge-voltage conversion unit to switch a state to a low gain (LG) state or a high gain (HG) state, in which, before an A/D conversion operation for signal level acquisition, the switching unit is configured to switch the state to the LG state at least once and switch the state to the HG state at least once, the transfer unit is configured to transfer the charge stored in the charge storage unit to the charge-voltage conversion unit at least twice of when the state is being switched to the LG state and when the state is being switched to the HG state, and the charge-voltage conversion unit is configured to add the charge transferred when the state is being switched to the LG state and the charge transferred when the state is being switched to the HG state and convert the added charge into the voltage signal.

(2)

The solid-state imaging device according to (1), in which the switching unit includes an additional capacitance and a connection transistor that connects or disconnects the additional capacitance with respect to the charge-voltage conversion unit.

(3)

The solid-state imaging device according to (1) or (2), in which, before an A/D conversion operation for reset level acquisition, the switching unit is configured to switch the state to the HG state at least once, and the transfer unit is configured to transfer the charge stored in the charge storage unit to the charge-voltage conversion unit when the state is being switched to the HG state.

(4)

The solid-state imaging device according to any one of (1) to (3), in which the transfer unit is configured by a transfer transistor, and a parasitic capacitance between a gate of the transfer transistor and the charge-voltage conversion unit is larger than a parasitic capacitance between a gate of the connection transistor and the charge-voltage conversion unit.

(5)

The solid-state imaging device according to any one of (1) to (4), in which the transfer unit includes a transfer transistor, and a gate area of the transfer transistor is larger than a gate area of the connection transistor.

(6)

The solid-state imaging device according to any one of (1) to (5), in which an output of the charge storage unit is configured to be directly input to a comparator.

(7)

The solid-state imaging device according to (6), in which a reset level of the charge storage unit is configured to also serve as an initialization level of the comparator.

(8)

The solid-state imaging device according to any one of (1) to (7), in which the transfer unit is configured by a vertical transistor.

(9)

The solid-state imaging device according to any one of (1) to (8), in which
the charge storage unit is a photodiode (PD) that performs photoelectric conversion.

(10)
The solid-state imaging device according to any one of (1) to (8), in which
the charge storage unit is a memory unit that stores a charge generated by a photodiode (PD) that performs photoelectric conversion.

(11)
The solid-state imaging device according to any one of (1) to (10), in which
the charge-voltage conversion unit is shared by a plurality of the charge storage units, and
the transfer units are respectively provided between the plurality of charge storage units and the charge-voltage conversion unit.

(12)
An electronic device in which
the solid-state imaging device according to any one of (1) to (11) is mounted.

(13)
A solid-state imaging device including:
a sharing number of charge storage units configured to store charges generated by photoelectric conversion;
a charge-voltage conversion unit configured to convert the charges transferred from the sharing number of charge storage units into a voltage signal;
a sharing number of transfer units configured to transfer the respective charges stored in the sharing number of charge storage units to the charge-voltage conversion unit; and
a switching unit configured to increase or decrease a capacitance of the charge-voltage conversion unit to switch a state to a low gain (LG) state or a high gain (HG) state, in which,
when resetting the sharing number of charge storage units,
the switching unit is configured to switch the state to the LG state,
the sharing number of transfer units are configured to simultaneously transfer the charges stored in the corresponding charge storage units to the charge-voltage conversion unit, and
when reading the charges from the sharing number of charge storage units,
the switching unit is configured to switch the state to the HG state, and
the sharing number of transfer units are configured to sequentially transfer the charges stored in the corresponding charge storage units to the charge-voltage conversion unit.

(14)
The solid-state imaging device according to (13), in which
the switching unit includes an additional capacitance and a connection transistor that connects or disconnects the additional capacitance with respect to the charge-voltage conversion unit.

(15)
The solid-state imaging device according to (13) or (14), in which
a capacitance $D_{FD2}$ of the additional capacitance is (the sharing number−1) times a capacitance $C_{FD}$ of the charge-voltage conversion unit.

(16)
The solid-state imaging device according to any one of (13) to (15), in which
the charge storage unit is a memory unit that stores a charge generated by a photodiode (PD) that performs photoelectric conversion.

(17)
An electronic device in which
the solid-state imaging device according to any one of (13) to (16) is mounted.

(18)
A solid-state imaging device including:
a sharing number of charge storage units configured to store charges generated by photoelectric conversion;
a charge-voltage conversion unit configured to convert the charges transferred from the sharing number of charge storage units into a voltage signal; and
a sharing number of transfer units configured to transfer the respective charges stored in the sharing number of charge storage units to the charge-voltage conversion unit, in which
the sharing number of transfer units are configured to
sequentially transfer the charges stored in the corresponding charge storage units to the charge-voltage conversion unit when resetting the sharing number of charge storage units, and
sequentially transfer the charges stored in the corresponding charge storage units to the charge-voltage conversion unit when reading the charges from the sharing number of charge storage units.

(19)
The solid-state imaging device according to (18), in which
the sharing number of transfer units are configured to
transfer the charges stored in the corresponding charge storage units in an arbitrary order when resetting the sharing number of charge storage units, and
transfer the charges stored in the corresponding to the charge storage units in an arbitrary order when reading the charges from the sharing number of charge storage units.

(20)
An electronic device in which
the solid-state imaging device according to (18) or (19) is mounted.

REFERENCE SIGNS LIST

10 Pixel unit
21 Charge storage unit
22 Transfer transistor
23 FD
24 FD capacitance switching unit
25 FD transistor
26 Additional capacitance
27 A/D conversion unit
31 PD
32 Amplifier transistor
33 Selection transistor
34 Reset transistor
35 Vertical signal line
41 Memory unit
42 Transfer gate
51 Memory unit
52 Transfer gate
61 Comparator
62 Switch
100 Pixel array
101 Control wiring
112 Pixel drive unit
113 Horizontal scanning unit 111 Control timing generation unit
121 DAC
122 Counter control unit
131 Comparator
132 Counter
151 OPB region
200 Sharing pixel unit

The invention claimed is:

1. A solid-state imaging device comprising:
a charge storage unit configured to store a charge generated by photoelectric conversion;
a charge-voltage conversion unit configured to convert the charge transferred from the charge storage unit into a voltage signal;
a transfer unit configured to transfer the charge stored in the charge storage unit to the charge-voltage conversion unit; and
a switching unit configured to increase or decrease a capacitance of the charge-voltage conversion unit to switch a state to a low gain (LG) state or a high gain (HG) state, wherein,
before an A/D conversion operation for signal level acquisition,
the switching unit is configured to switch the state to the LG state at least once and switch the state to the HG state at least once,
the transfer unit is configured to transfer the charge stored in the charge storage unit to the charge-voltage conversion unit at least twice of when the state is being switched to the LG state and when the state is being switched to the HG state, and
the charge-voltage conversion unit is configured to add the charge transferred when the state is being switched to the LG state and the charge transferred when the state is being switched to the HG state and convert the added charge into the voltage signal.

2. The solid-state imaging device according to claim 1, wherein
the switching unit includes an additional capacitance and a connection transistor that connects or disconnects the additional capacitance with respect to the charge-voltage conversion unit.

3. The solid-state imaging device according to claim 2, wherein,
before an A/D conversion operation for reset level acquisition,
the switching unit is configured to switch the state to the HG state at least once, and
the transfer unit is configured to transfer the charge stored in the charge storage unit to the charge-voltage conversion unit when the state is being switched to the HG state.

4. The solid-state imaging device according to claim 2, wherein
the transfer unit is configured by a transfer transistor, and
a parasitic capacitance between a gate of the transfer transistor and the charge-voltage conversion unit is larger than a parasitic capacitance between a gate of the connection transistor and the charge-voltage conversion unit.

5. The solid-state imaging device according to claim 2, wherein
the transfer unit includes a transfer transistor, and
a gate area of the transfer transistor is larger than a gate area of the connection transistor.

6. The solid-state imaging device according to claim 2, wherein an output of the charge storage unit is configured to be directly input to a comparator.

7. The solid-state imaging device according to claim 6, wherein
a reset level of the charge storage unit is configured to also serve as an initialization level of the comparator.

8. The solid-state imaging device according to claim 1, wherein
the transfer unit is configured by a vertical transistor.

9. The solid-state imaging device according to claim 1, wherein
the charge storage unit is a photodiode (PD) that performs photoelectric conversion.

10. The solid-state imaging device according to claim 1, wherein
the charge storage unit is a memory unit that stores a charge generated by a photodiode (PD) that performs photoelectric conversion.

11. The solid-state imaging device according to claim 1, wherein
the charge-voltage conversion unit is shared by a plurality of the charge storage units, and
the transfer units are respectively provided between the plurality of charge storage units and the charge-voltage conversion unit.

12. An electronic device in which
the solid-state imaging device according to claim 1 is mounted.

13. A solid-state imaging device comprising:
a sharing number of charge storage units configured to store charges generated by photoelectric conversion;
a charge-voltage conversion unit configured to convert the charges transferred from the sharing number of charge storage units into a voltage signal;
a sharing number of transfer units configured to transfer the respective charges stored in the sharing number of charge storage units to the charge-voltage conversion unit; and
a switching unit configured to increase or decrease a capacitance of the charge-voltage conversion unit to switch a state to a low gain (LG) state or a high gain (HG) state, wherein,
when resetting the sharing number of charge storage units,
the switching unit is configured to switch the state to the LG state,
the sharing number of transfer units are configured to simultaneously transfer the charges stored in the corresponding charge storage units to the charge-voltage conversion unit, and
when reading the charges from the sharing number of charge storage units,
the switching unit is configured to switch the state to the HG state, and
the sharing number of transfer units are configured to sequentially transfer the charges stored in the corresponding charge storage units to the charge-voltage conversion unit.

14. The solid-state imaging device according to claim 13, wherein
the switching unit includes an additional capacitance and a connection transistor that connects or disconnects the additional capacitance with respect to the charge-voltage conversion unit.

15. The solid-state imaging device according to claim 14, wherein a capacitance $C_{FD2}$ of the additional capacitance is (the sharing number−1) times a capacitance $C_{FD}$ of the charge-voltage conversion unit.

16. The solid-state imaging device according to claim 13, wherein
the charge storage unit is a memory unit that stores a charge generated by a photodiode (PD) that performs photoelectric conversion.

17. An electronic device in which
the solid-state imaging device according to claim 13 is mounted.

18. A solid-state imaging device comprising:
a sharing number of charge storage units configured to store charges generated by photoelectric conversion;
a charge-voltage conversion unit configured to convert the charges transferred from the sharing number of charge storage units into a voltage signal; and
a sharing number of transfer units configured to transfer the respective charges stored in the sharing number of charge storage units to the charge-voltage conversion unit, wherein
the sharing number of transfer units are configured to
sequentially transfer the charges stored in the corresponding charge storage units to the charge-voltage conversion unit when resetting the sharing number of charge storage units, and
sequentially transfer the charges stored in the corresponding charge storage units to the charge-voltage conversion unit when reading the charges from the sharing number of charge storage units.

19. The solid-state imaging device according to claim 18, wherein
the sharing number of transfer units are configured to
transfer the charges stored in the corresponding charge storage units to the charge-voltage conversion unit in an arbitrary order when resetting the sharing number of charge storage units, and
transfer the charges stored in the corresponding charge storage units to the charge-voltage conversion unit in an arbitrary order when reading the charges from the sharing number of charge storage units.

20. An electronic device in which
the solid-state imaging device according to claim 18 is mounted.

\* \* \* \* \*